Nov. 26, 1968

C. E. FINE 3,413,607

REMOTE SUPERVISORY AND CONTROL SYSTEM

Filed March 31, 1965

INVENTOR.
Charles E. Fine
BY
Attys

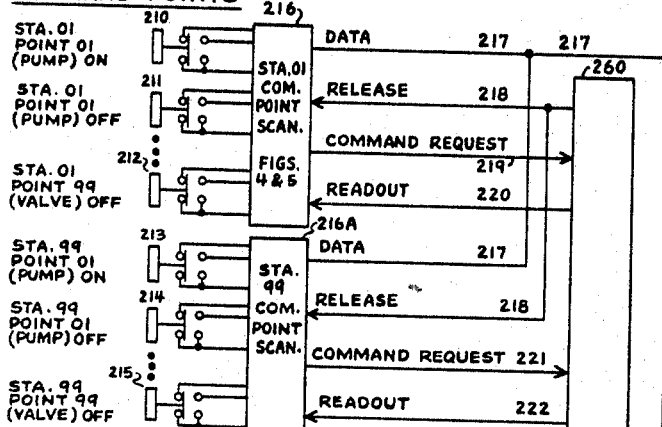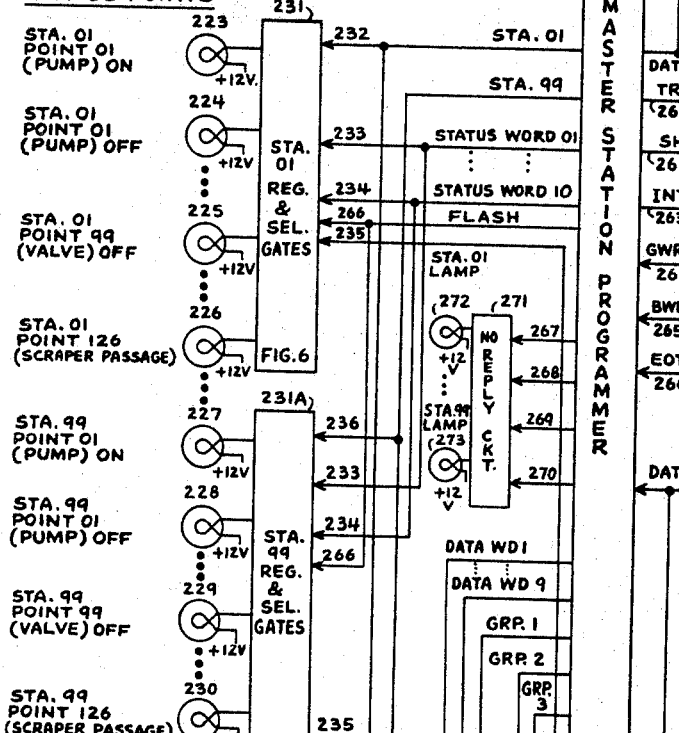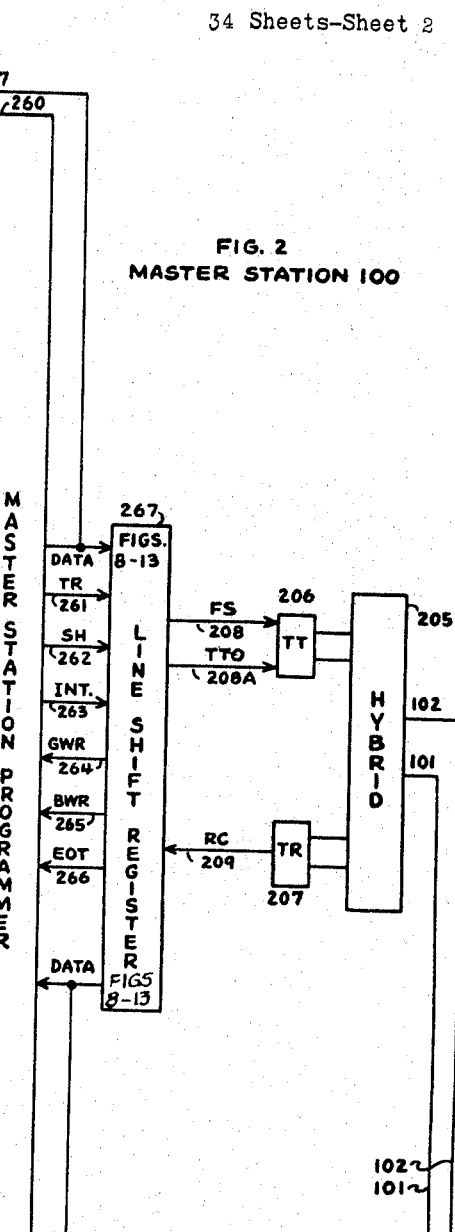
Nov. 26, 1968     C. E. FINE     3,413,607
REMOTE SUPERVISORY AND CONTROL SYSTEM
Filed March 31, 1965     34 Sheets-Sheet 2
FIG. 2
MASTER STATION 100
INVENTOR.
Charles E. Fine,
BY

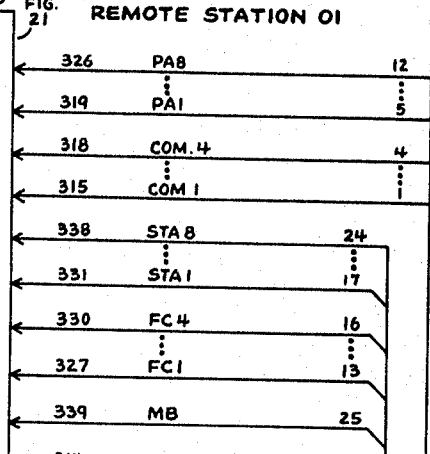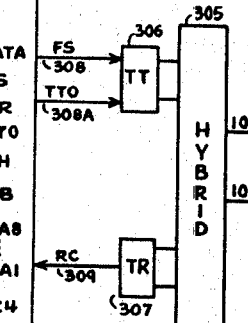
Nov. 26, 1968     C. E. FINE     3,413,607
REMOTE SUPERVISORY AND CONTROL SYSTEM
Filed March 31, 1965     34 Sheets-Sheet 3
FIG. 3
INVENTOR.
Charles E. Fine,
BY Nov. 26, 1968

C. E. FINE 3,413,607

REMOTE SUPERVISORY AND CONTROL SYSTEM

Filed March 31, 1965

COMMAND POINT SCANNER

Inventor
Charles E. Fine,

Nov. 26, 1968

C. E. FINE 3,413,607

REMOTE SUPERVISORY AND CONTROL SYSTEM

Filed March 31, 1965

COMMAND POINT SCANNER

Inventor:
Charles E. Fine,

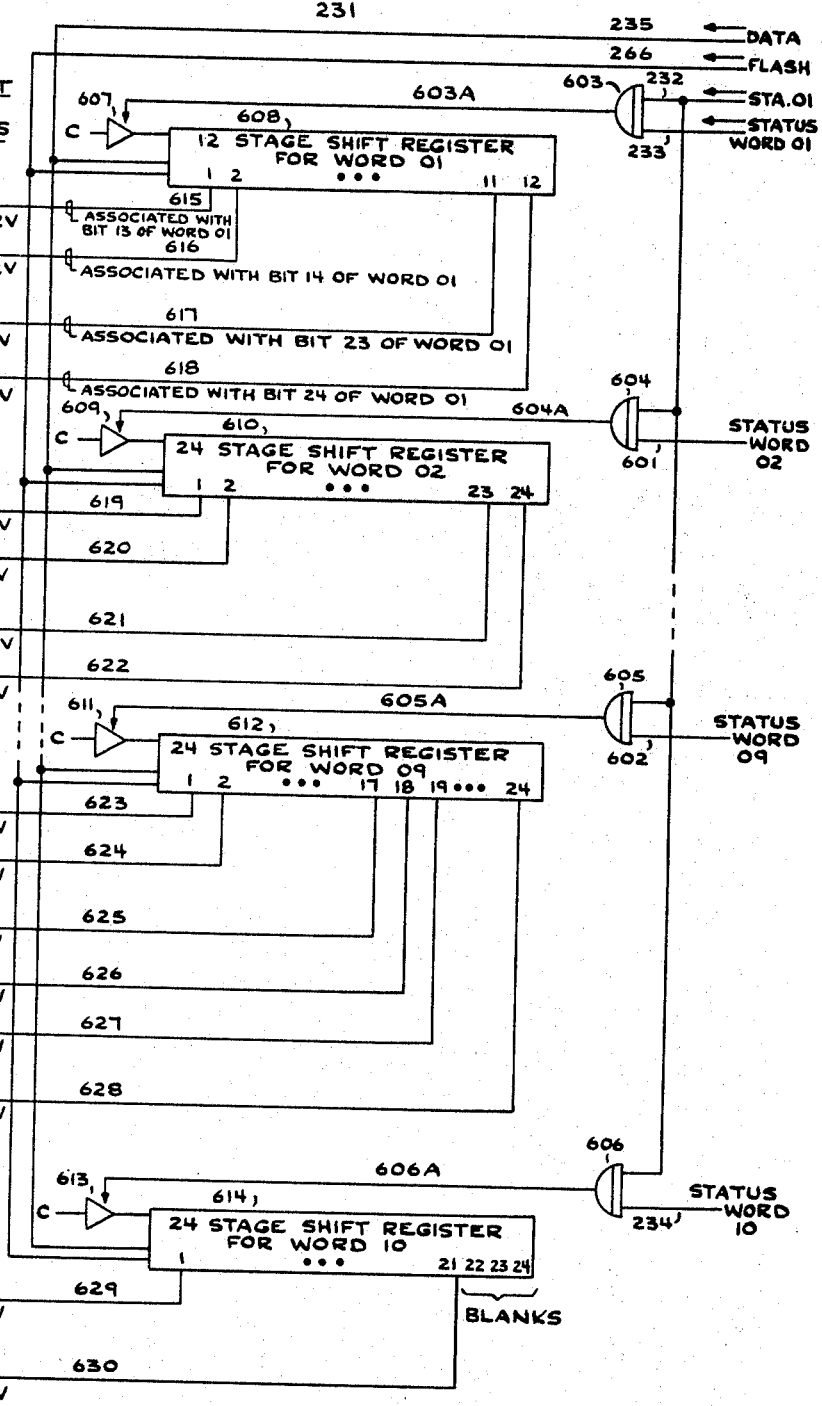

608

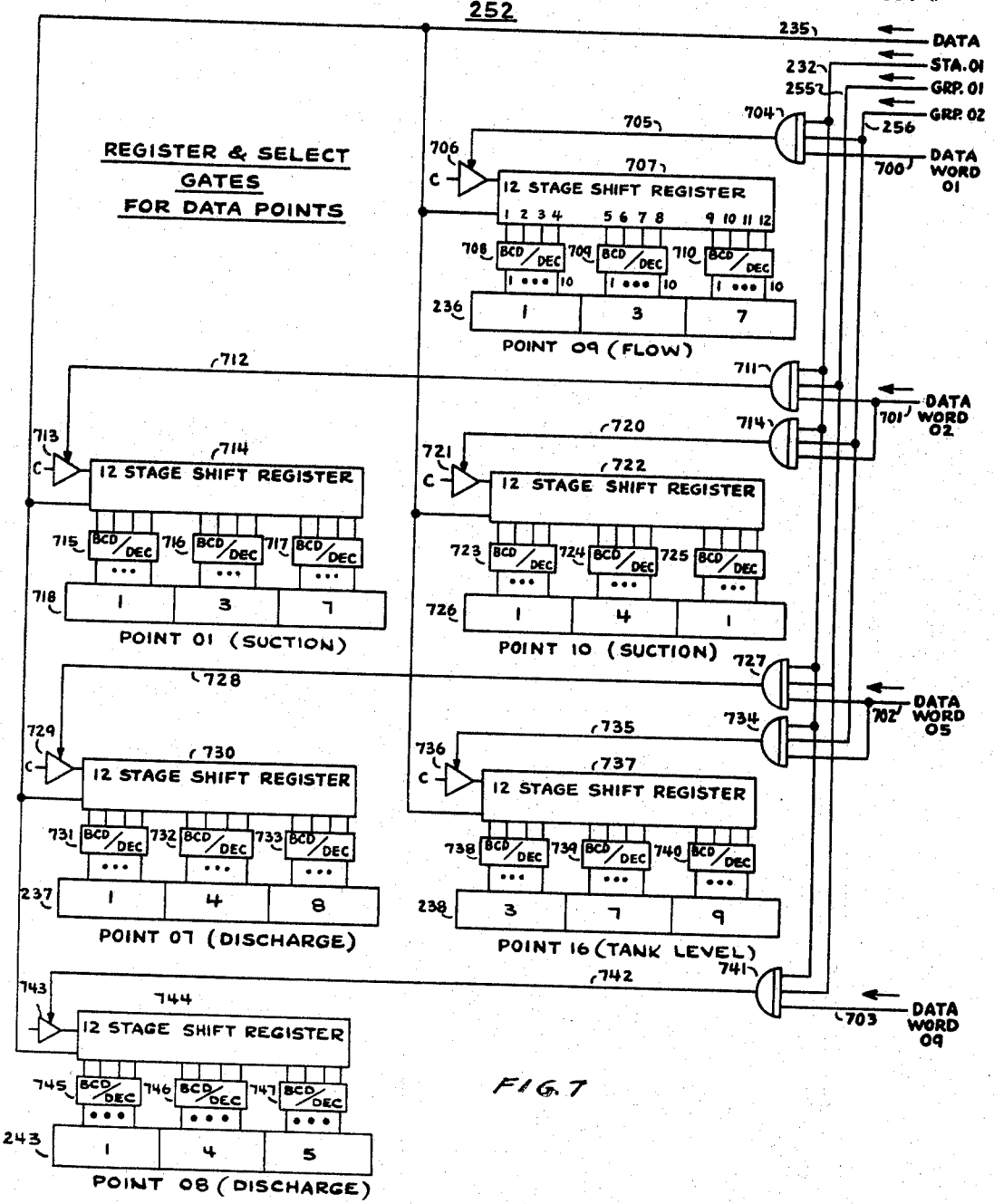

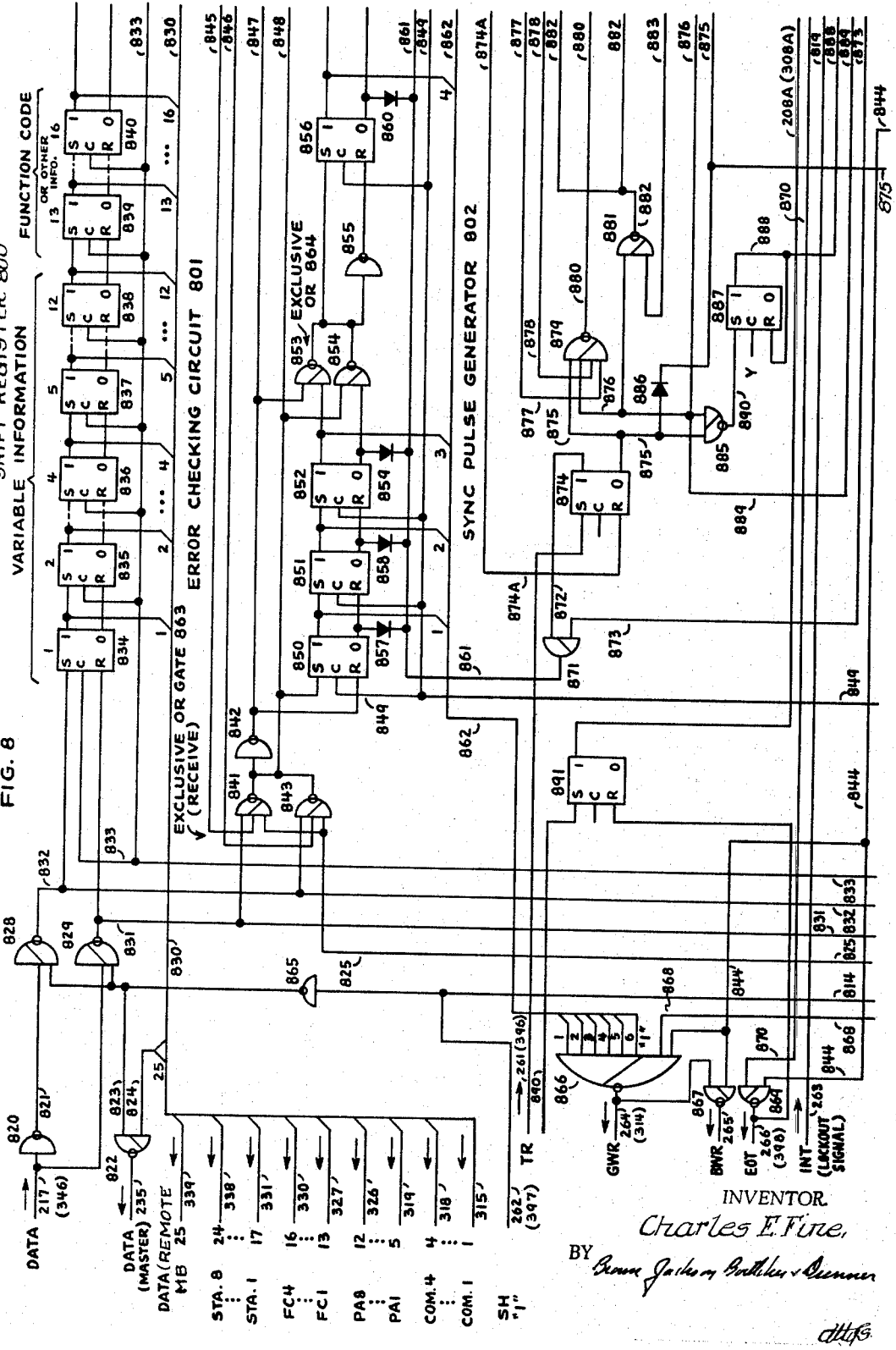

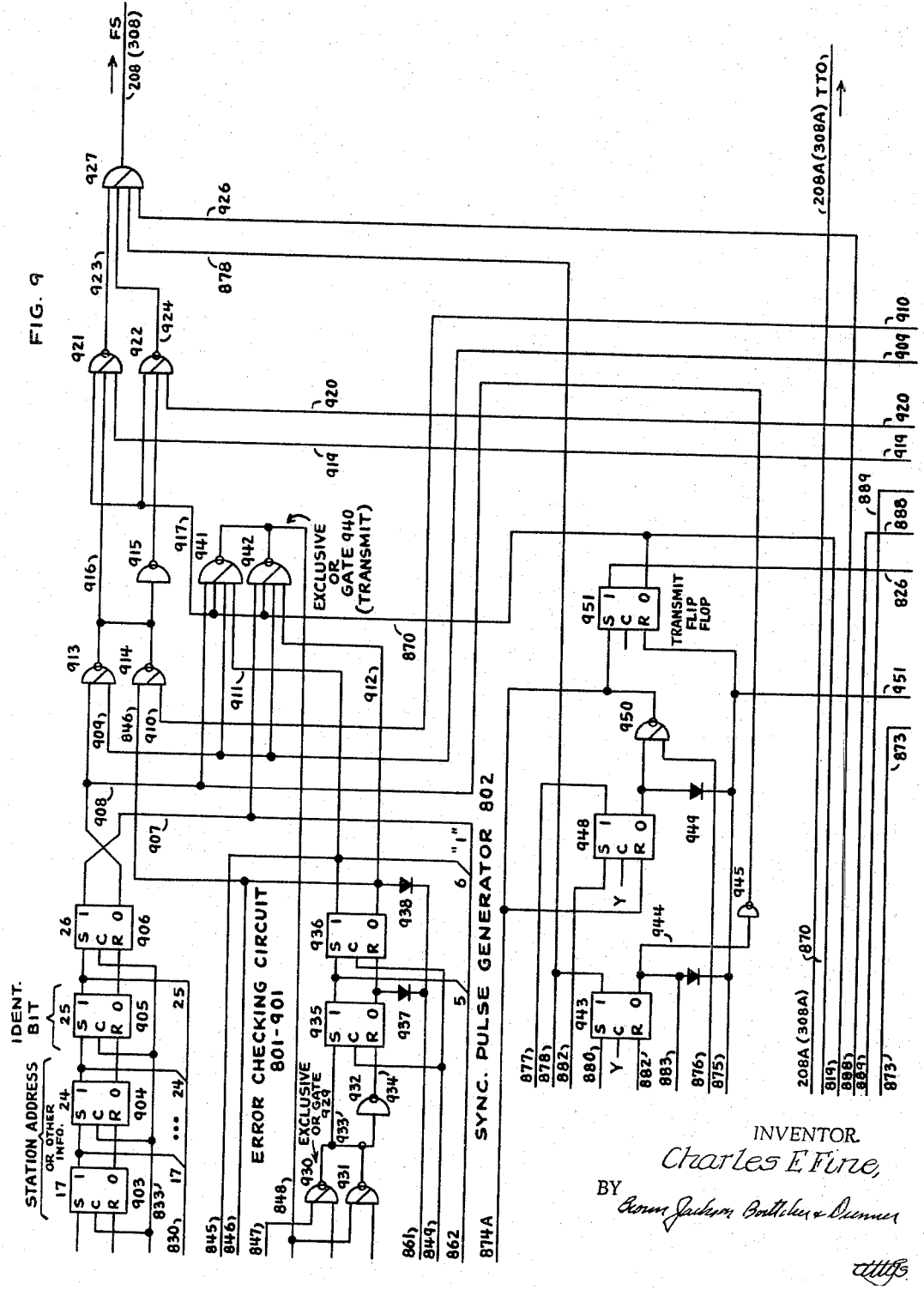

Nov. 26, 1968

C. E. FINE 3,413,607

REMOTE SUPERVISORY AND CONTROL SYSTEM

Filed March 31, 1965

MASTER STATION PROGRAMMER

Inventor:
Charles E Fine,

Nov. 26, 1968    C. E. FINE    3,413,607
REMOTE SUPERVISORY AND CONTROL SYSTEM
Filed March 31, 1965    34 Sheets-Sheet 16
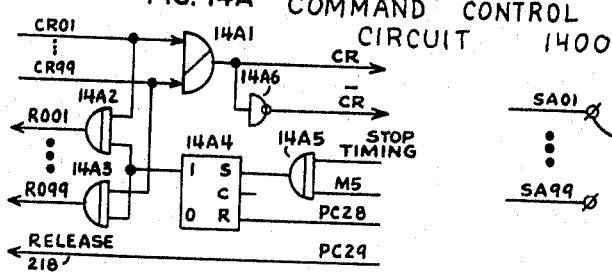
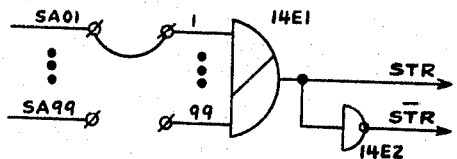
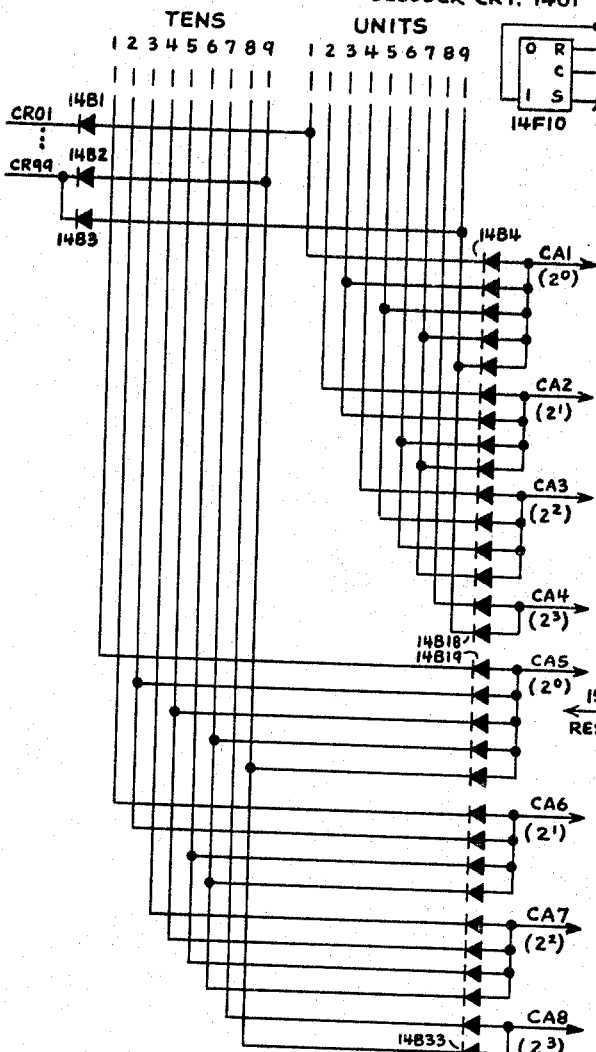
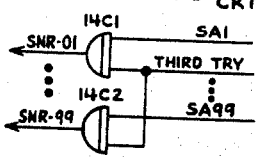
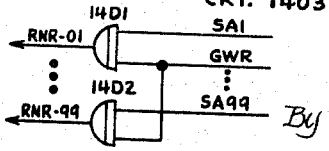
Inventor
Charles E. Fine,

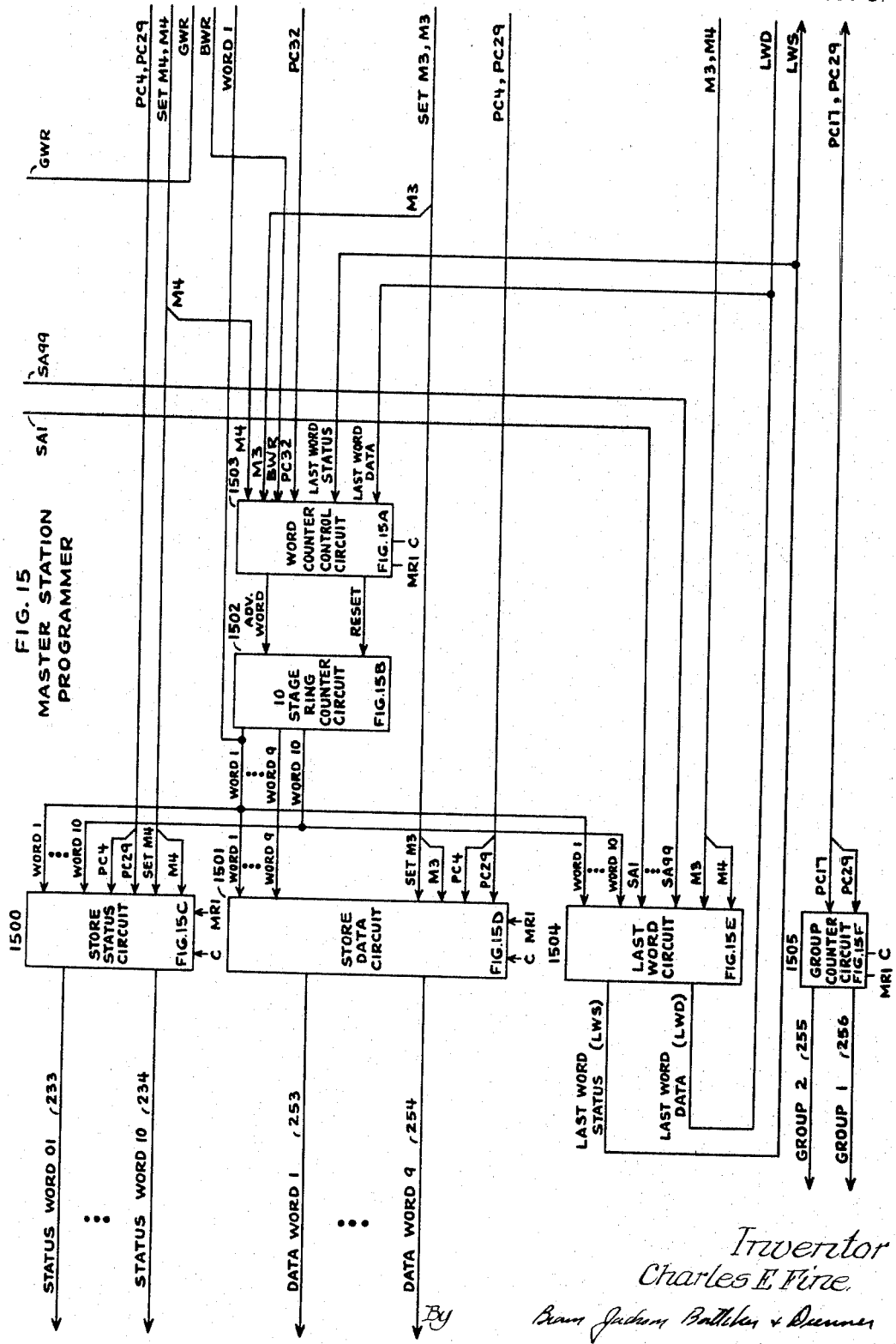

Nov. 26, 1968
C. E. FINE
3,413,607
REMOTE SUPERVISORY AND CONTROL SYSTEM
Filed March 31, 1965
34 Sheets-Sheet 18
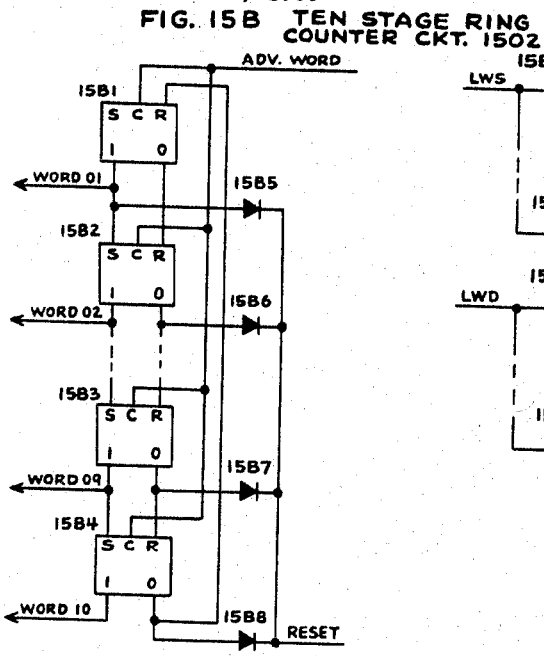
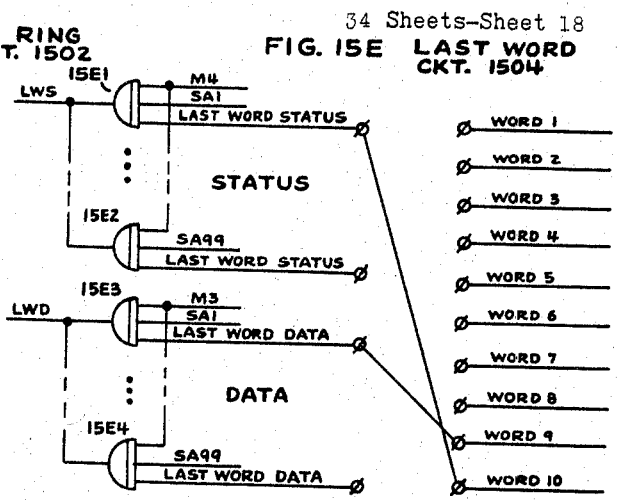
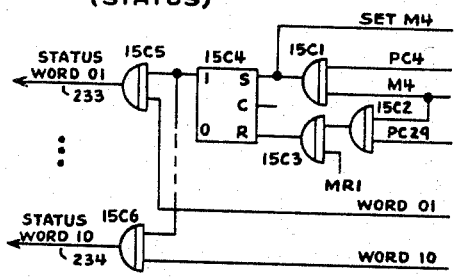
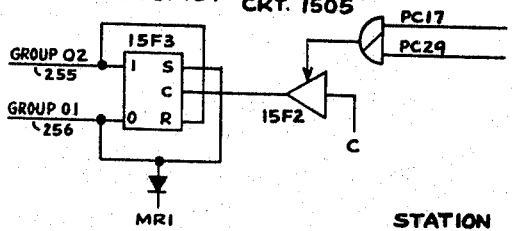
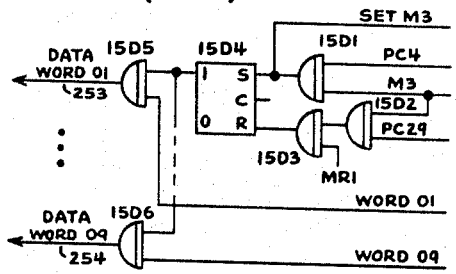
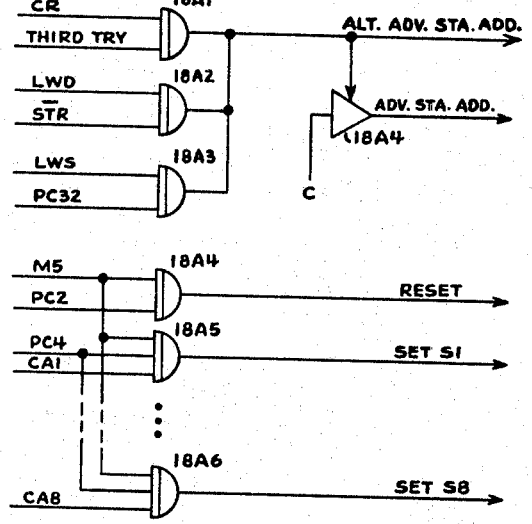
Inventor:
Charles E. Fine,
By
Attys.

MASTER STATION PROGRAMMER

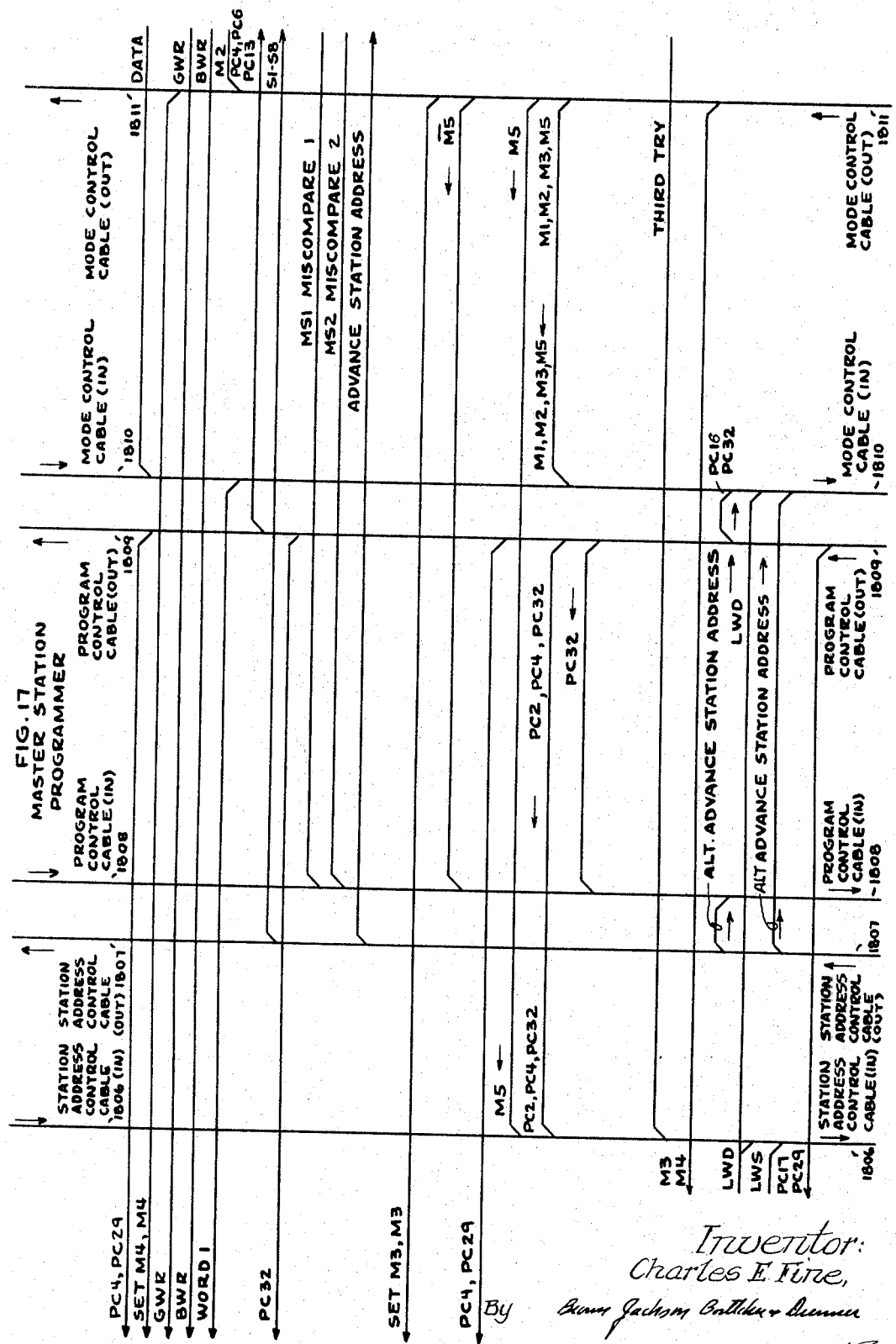

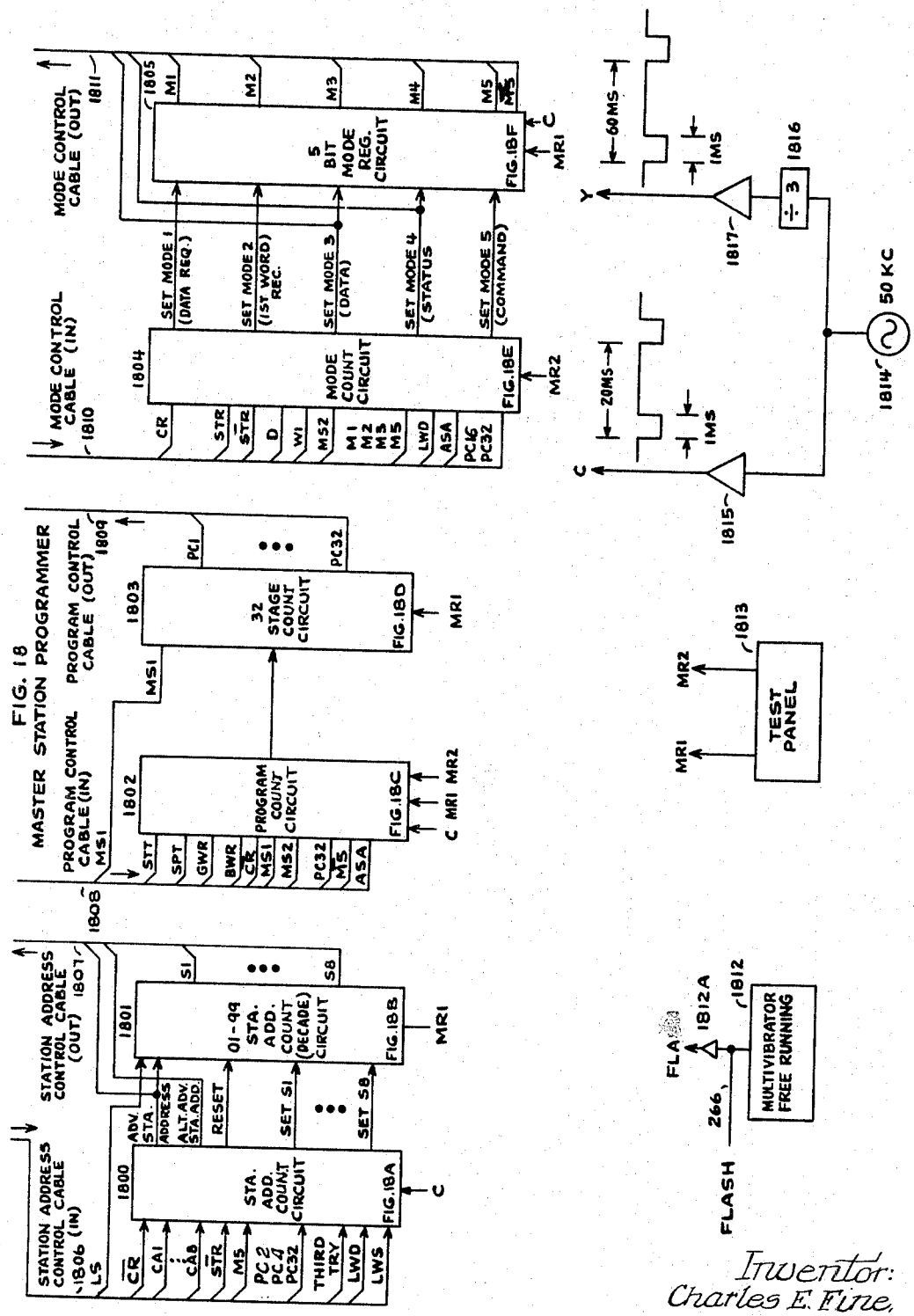

Nov. 26, 1968
C. E. FINE
3,413,607
REMOTE SUPERVISORY AND CONTROL SYSTEM
Filed March 31, 1965
34 Sheets-Sheet 22
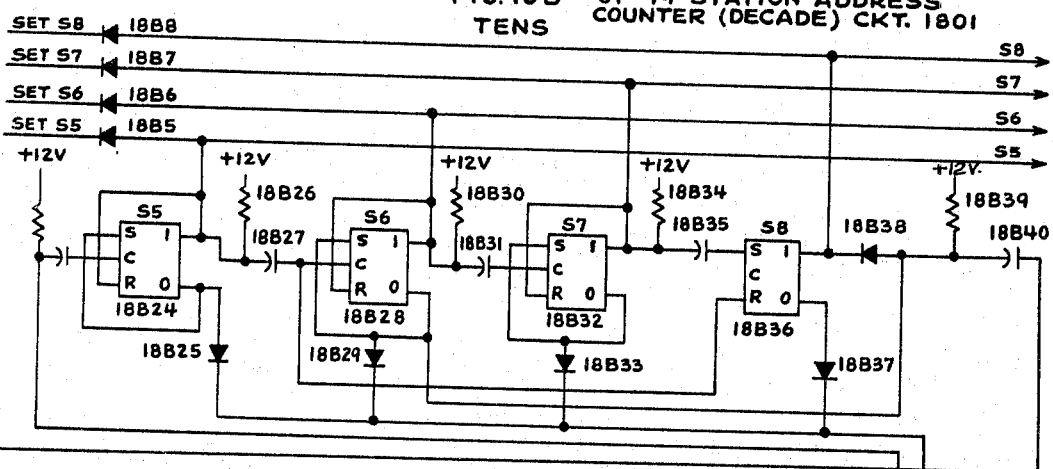
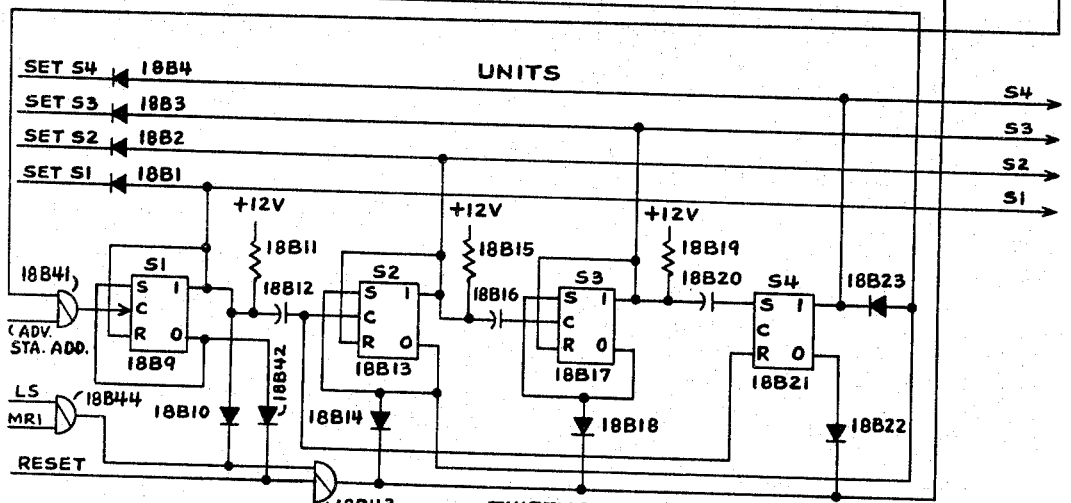
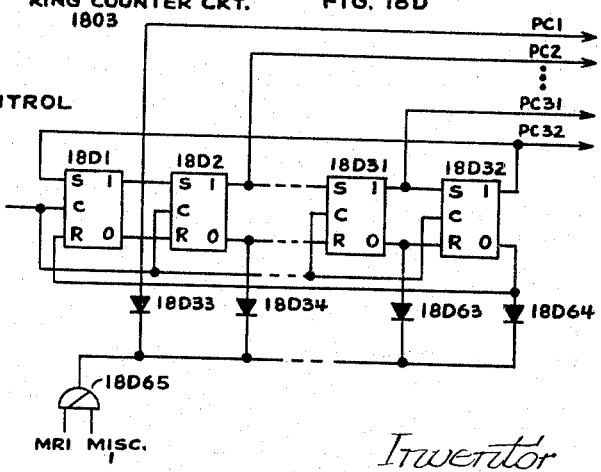
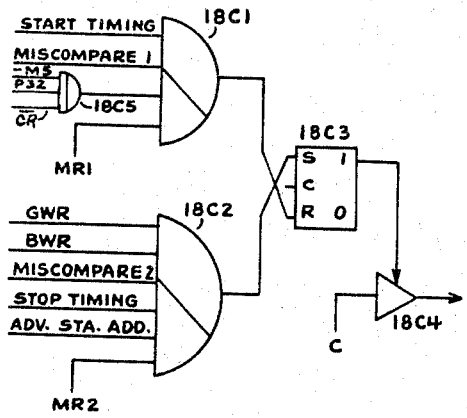
Inventor
Charles E. Fine.

Nov. 26, 1968
C. E. FINE
3,413,607
REMOTE SUPERVISORY AND CONTROL SYSTEM
Filed March 31, 1965
34 Sheets-Sheet 23
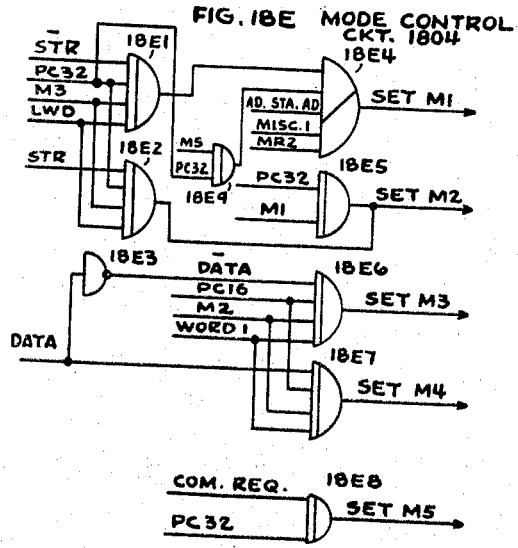
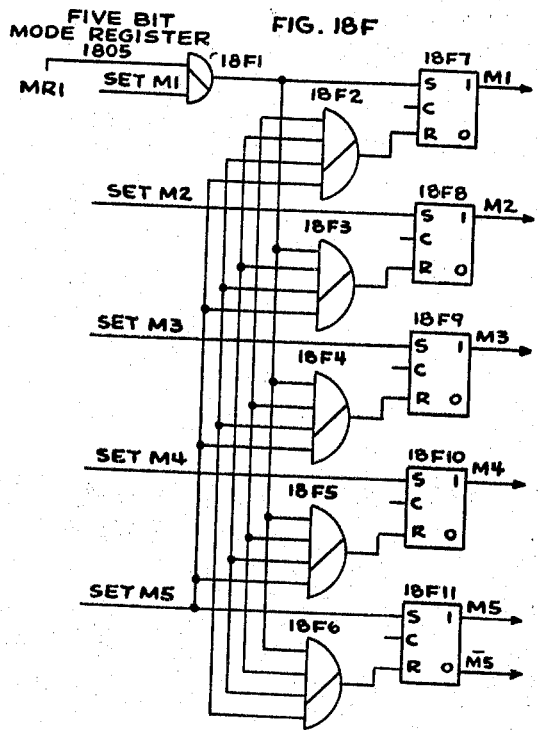
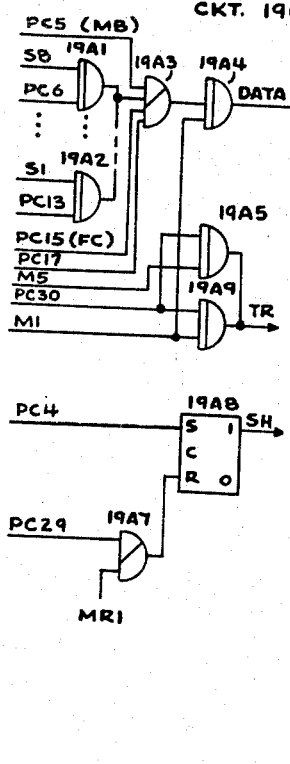
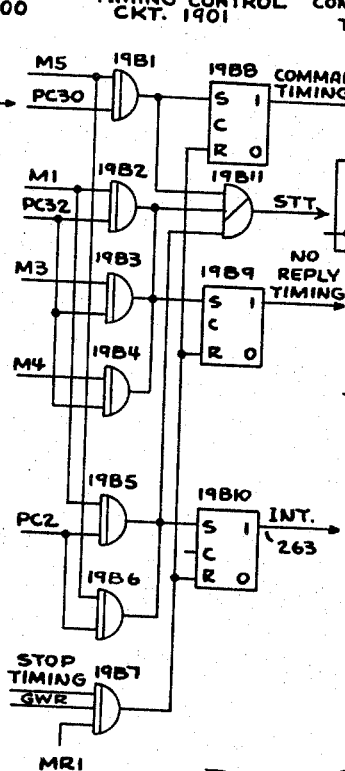
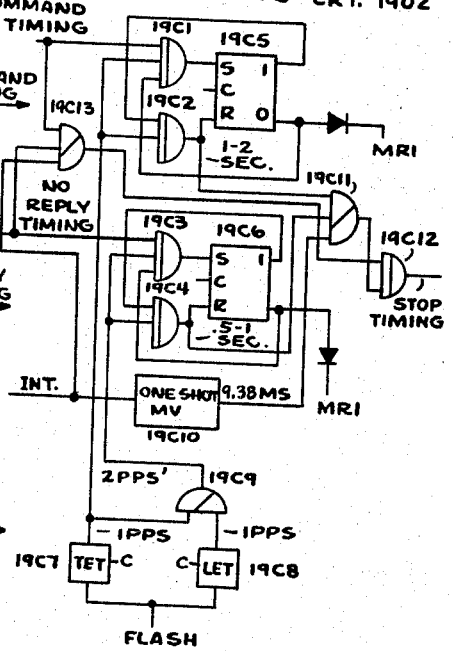
Inventor
Charles E. Fine,
By Burns, Jackson, Bulcher & Dunner
attys

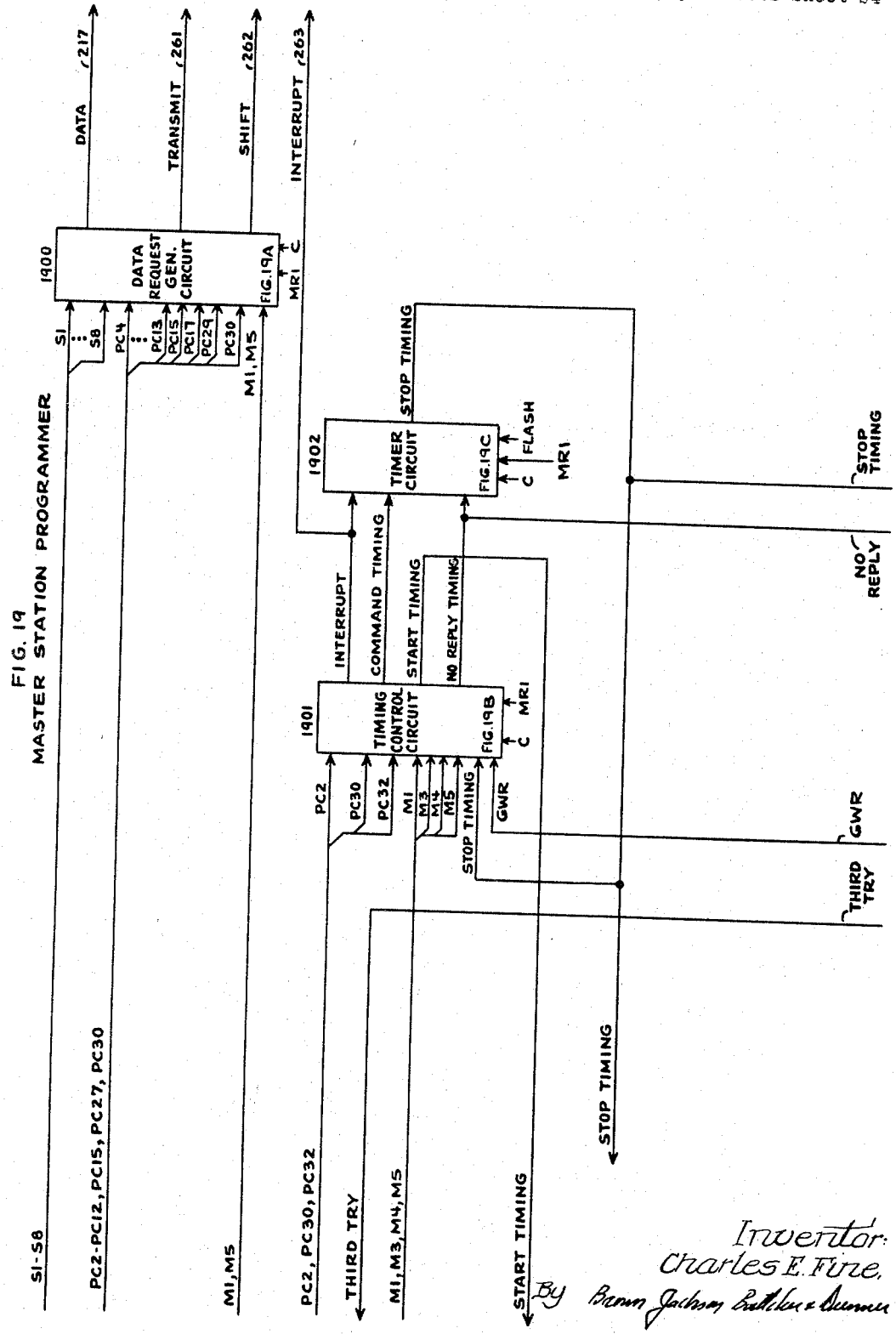

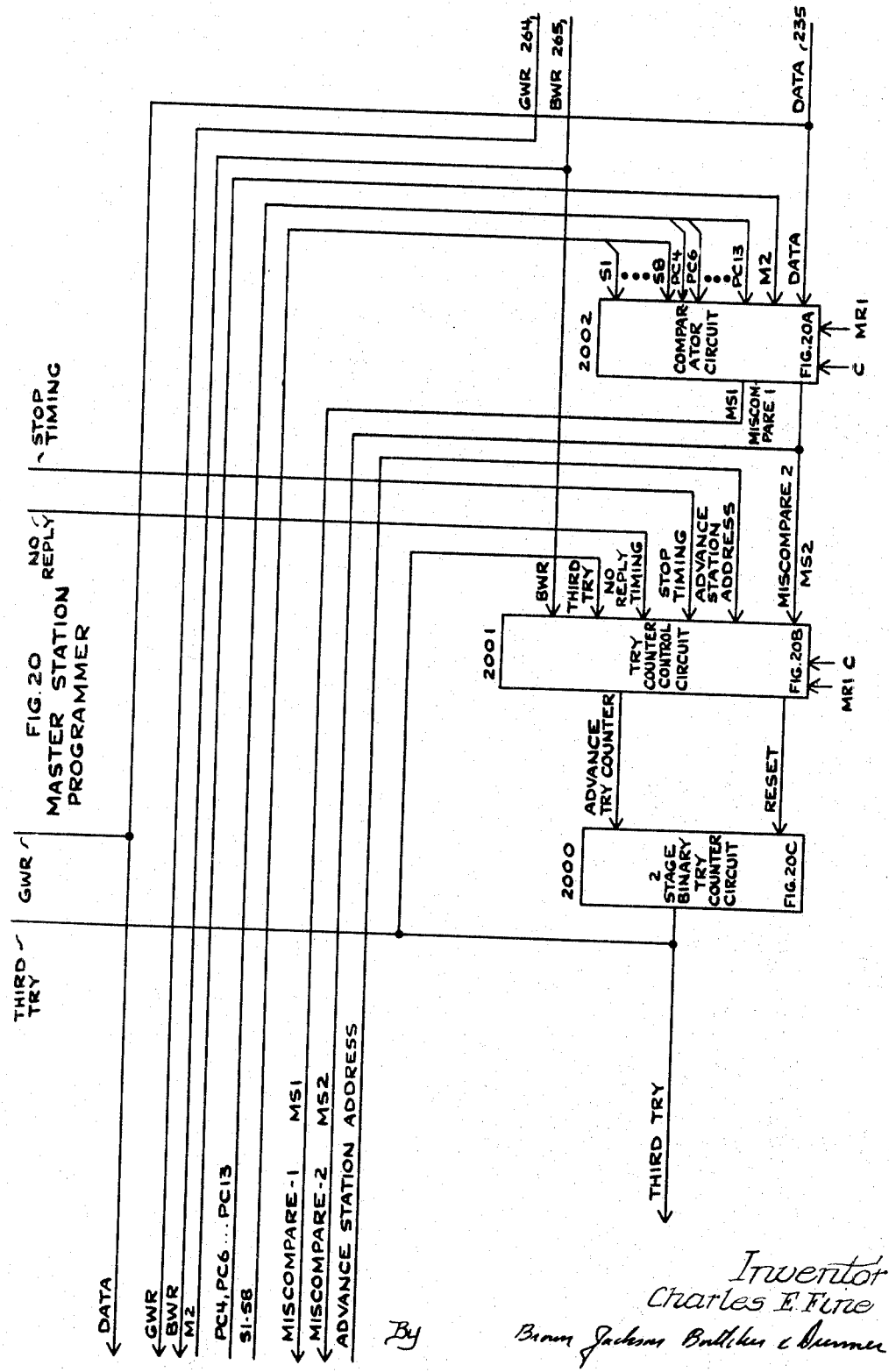

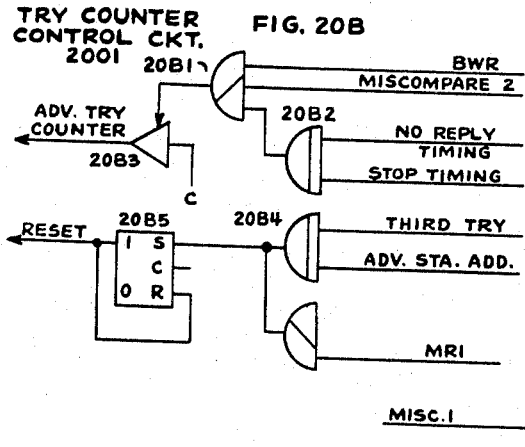

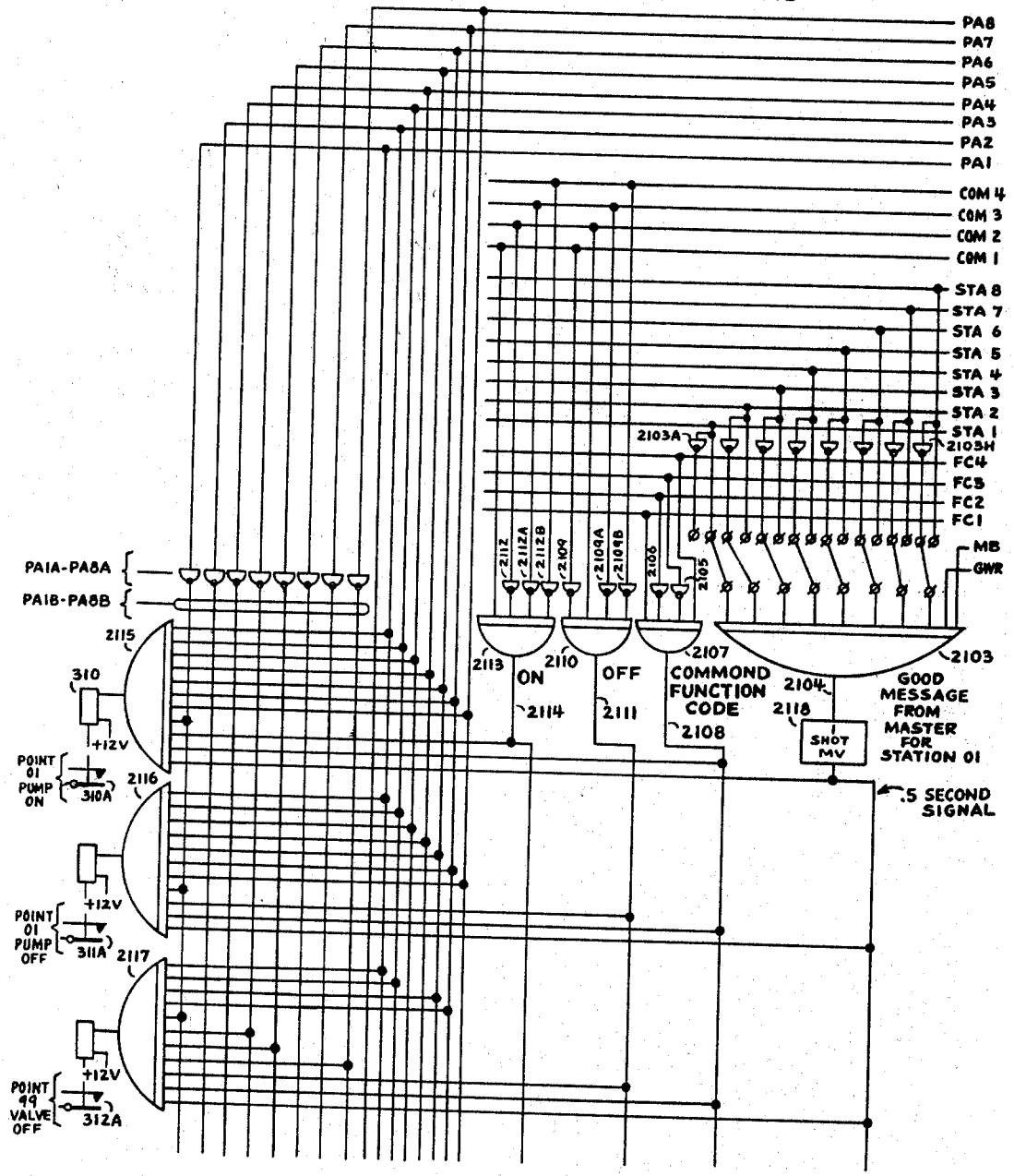

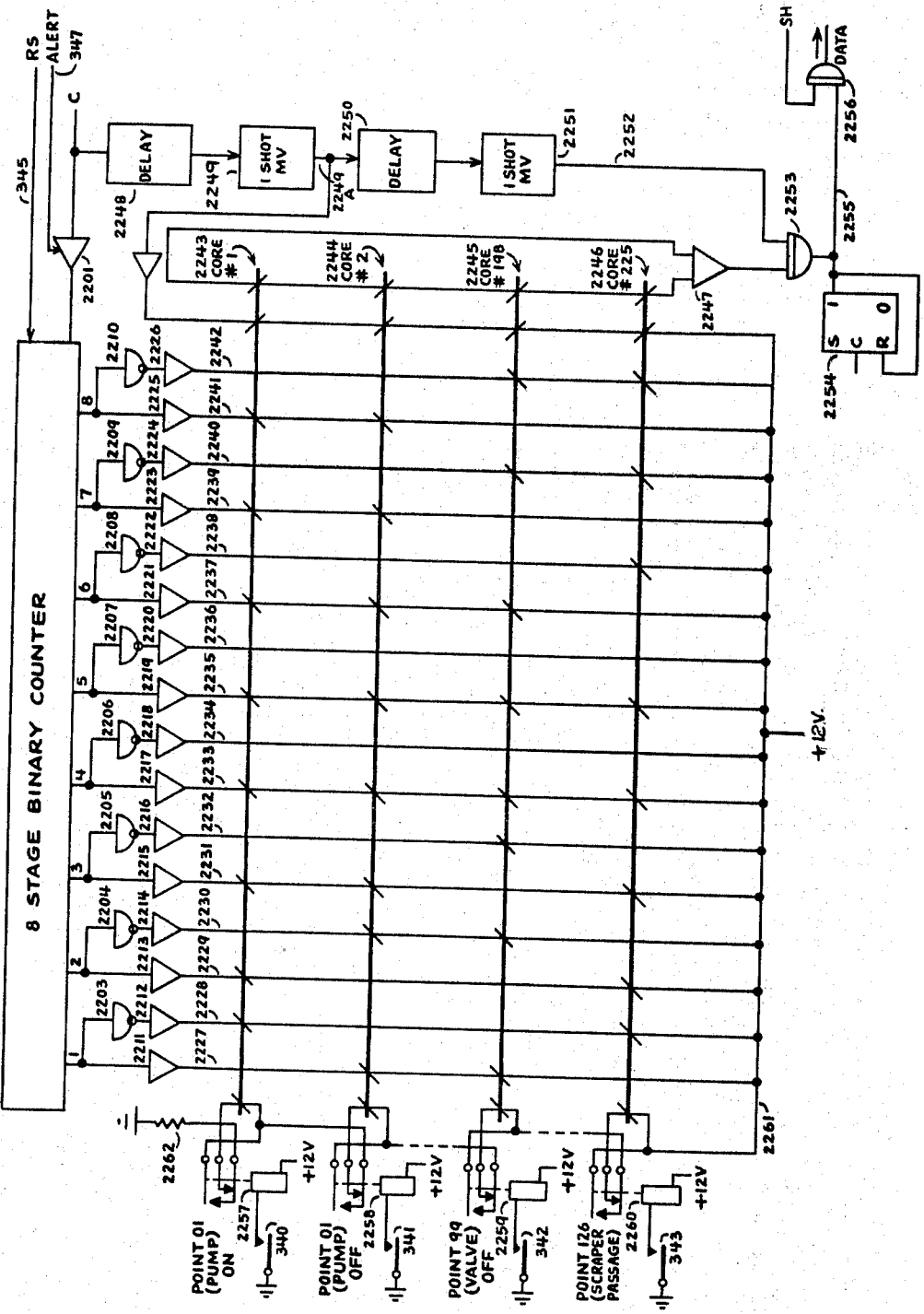

REMOTE STATION PROGRAMMER

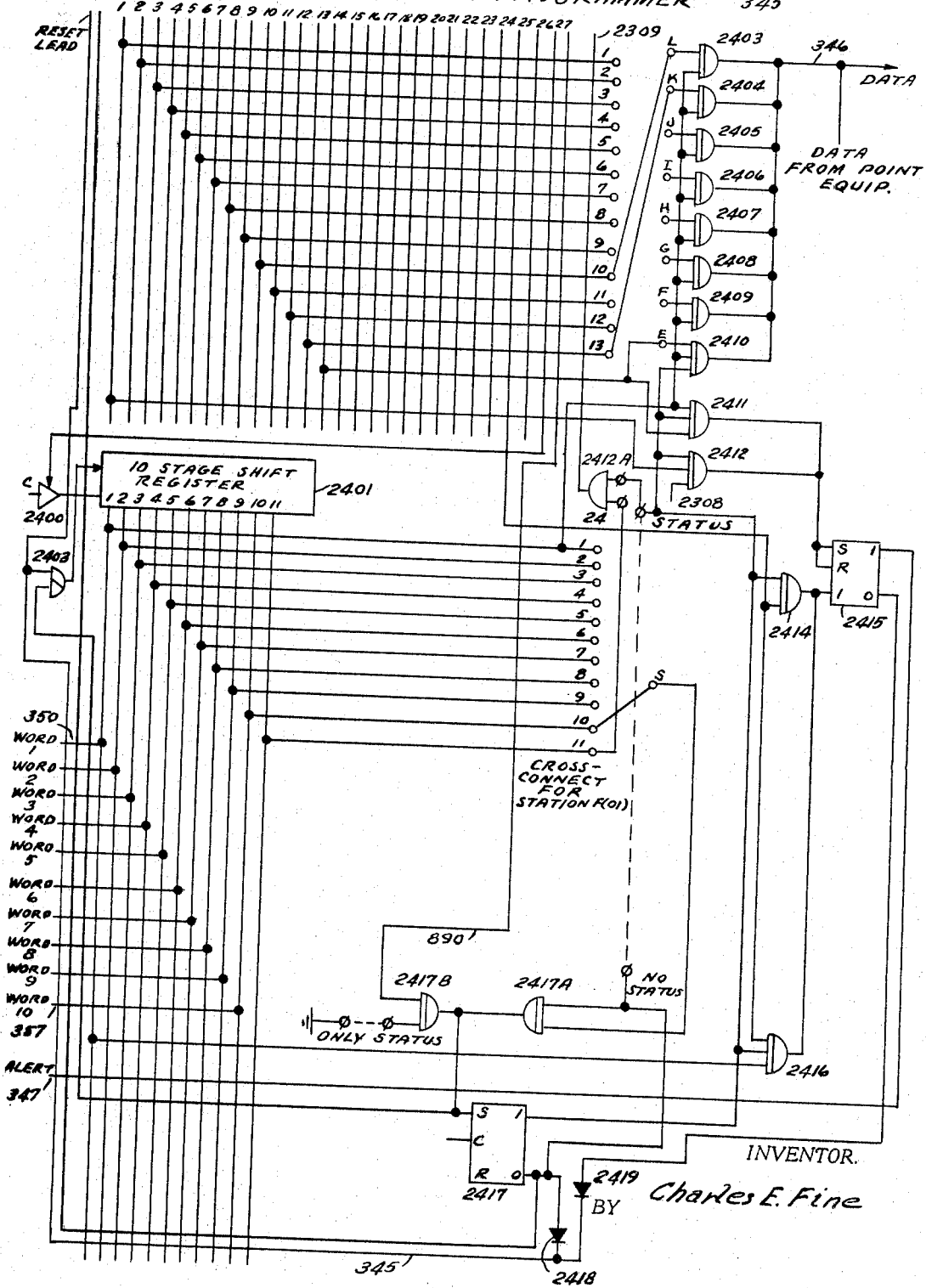

Nov. 26, 1968 C. E. FINE 3,413,607
REMOTE SUPERVISORY AND CONTROL SYSTEM
Filed March 31, 1965 34 Sheets-Sheet 31
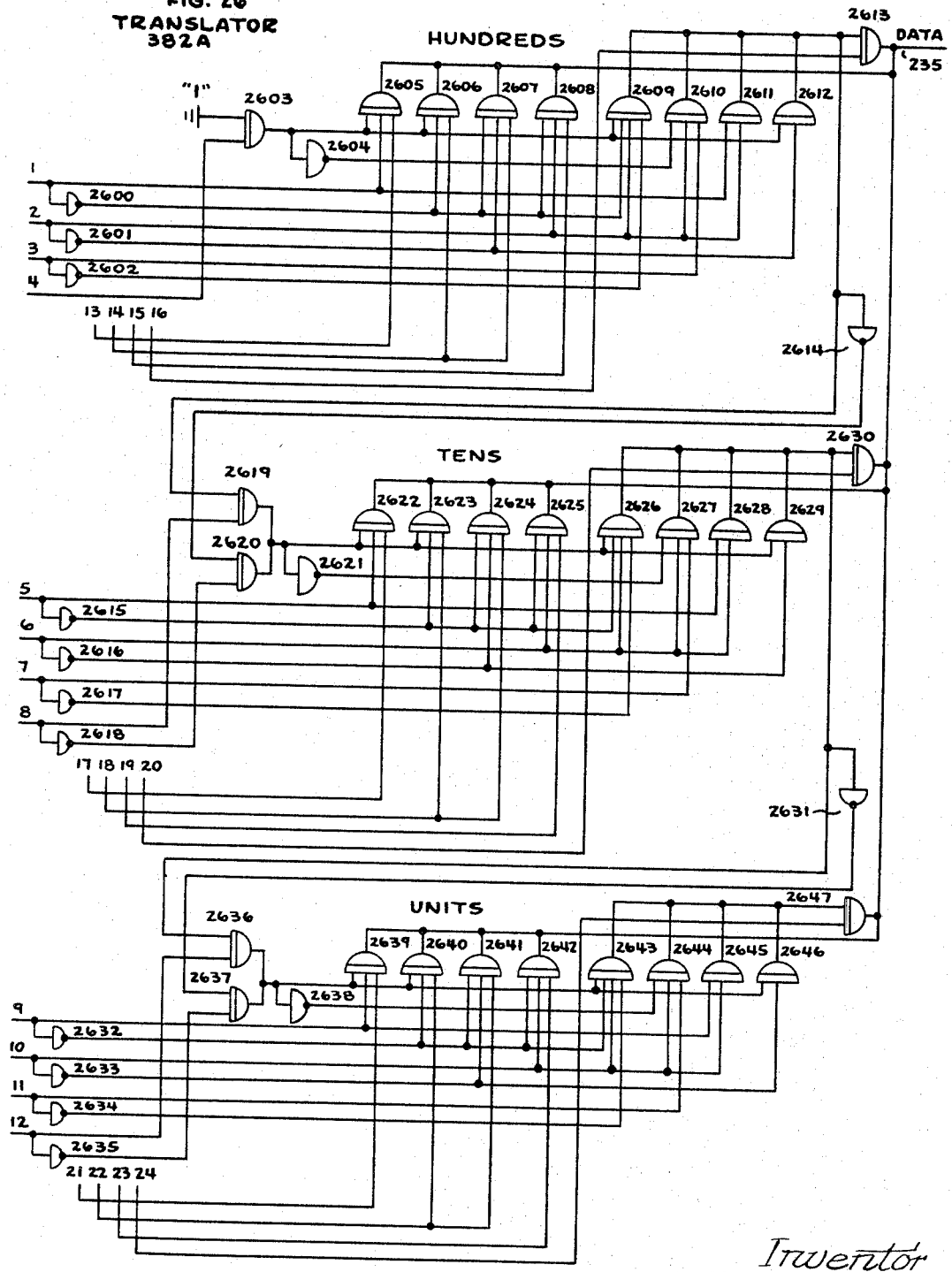
FIG. 26 TRANSLATOR 382A
Inventor
Charles E. Fine

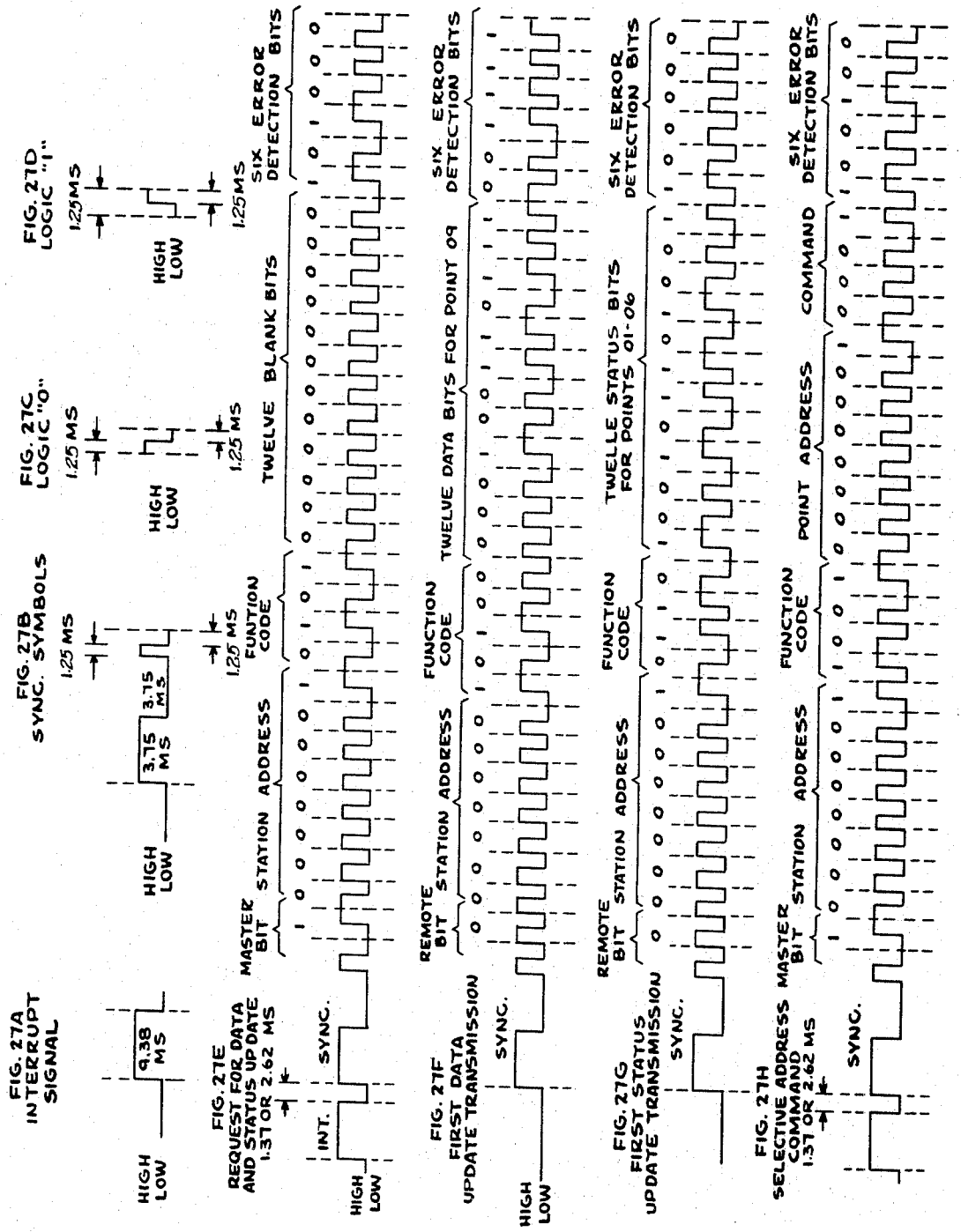

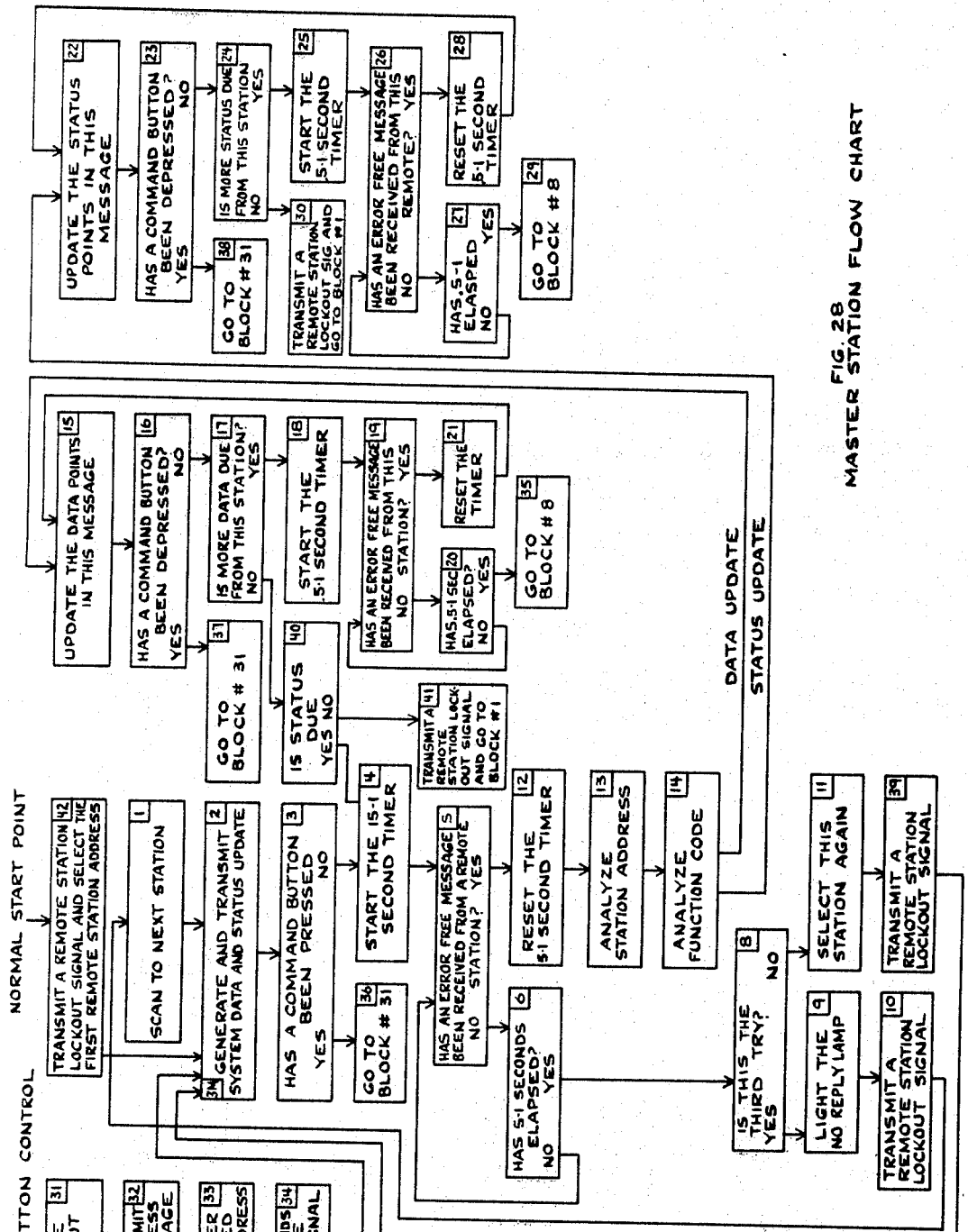

REMOTE STATION FLOW CHART

INVENTOR.
Charles E. Fine,
BY

United States Patent Office 3,413,607
Patented Nov. 26, 1968

3,413,607
REMOTE SUPERVISORY AND CONTROL SYSTEM
Charles E. Fine, Galion, Ohio, assignor to North Electric Company, Galion, Ohio, a corporation of Ohio
Filed Mar. 31, 1965, Ser. No. 444,231
9 Claims. (Cl. 340—163)

ABSTRACT OF THE DISCLOSURE

A nonquiescent remote supervisory control system having a master station and a plurality of remote stations in which word messages transmitted in both directions are of equal length and structure, the word messages including master station (or remote) identification bits and station addresses. Error means at each station drive a plurality of error detection bits from the information bits in each word message during transmission of the information bits, the derived error bits being transmitted after the information bits and being less in number than the information bits. Interrupt means at the master station permit interruption of the nonquiescent scanning for the purpose of transmitting a command to a remote station, and means at the master station thereafter request data and status update from the remote station to which the command was transmitted prior to initiation of the nonquiescent scanning from said station.

---

Figure 1:
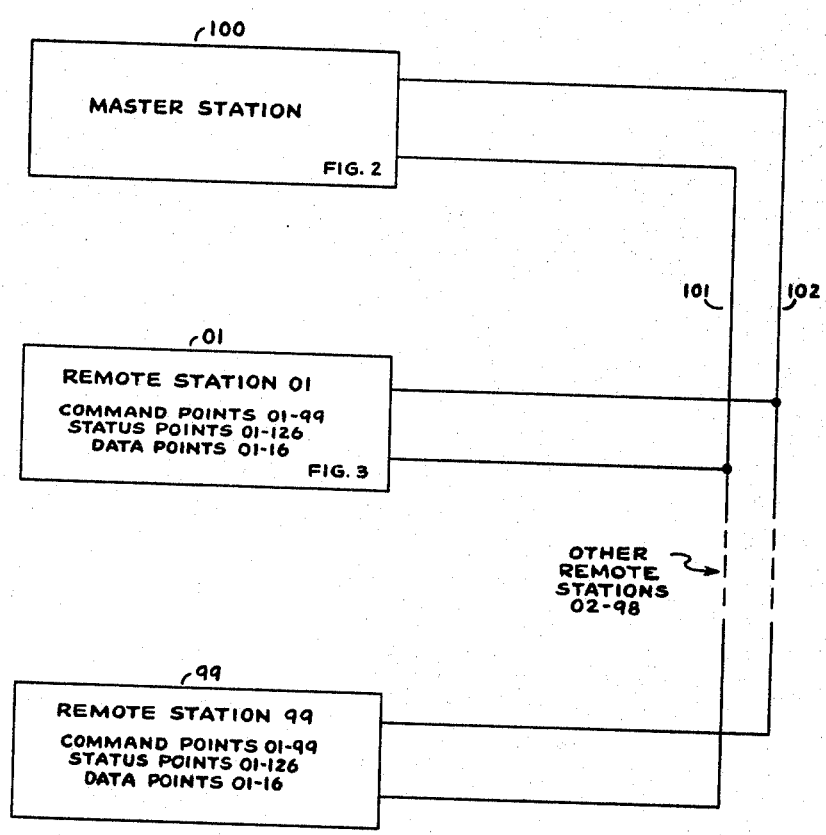

The present invention relates to remote supervision and control systems in which a master station controls equipment at one or more remote stations, and more specifically to a system of such type in which electronic switching circuits including solid state techniques and components are used to provide a new and an improved control arrangement.

The expanding need for increasingly larger volumes of fuel gas, oil, electrical power and the like in increasingly larger areas has in turn resulted in an increased requirement for improved supervisory systems which make possible control of the collection, transmission and distribution by a master station with greater efficiency and reliability while yet increasing the scope of control provided to the attendant at the master station of the system.

In a typical fuel gas control and supervision system, for example, the system may include a master station connected over channel means to a series of substations spaced at intervals of several hundred miles from each other in a pattern extending between the master station and the original source. Each substation may in turn include engines, compressors, valves, tanks, pumps, pipelines and the like, all of which must be controlled from the master station. Additionally the system must include the capability of ascertaining the condition of each of these devices at each of the remote stations and reporting such condition to the master station, such reporting to be effected without interfering with the control operations which are effected over the same channel means.

Communications channels linking the system may be a wire pair, switched circuits, microwave, or a combination of circuits. These channels are usually the weakest link in any system, not because the transmission equipment is faulty, but primarily because one requirement of the system is the propagation of minute amounts of power in an uncontrollable environment which introduces noise, interference, and attenuation.

Since many supervisory control systems depend upon the successful exchange of digital information over long distances by the transmission of pulses, the two most important design considerations for such systems are the selection of the coding method and the transmission scheme. Early systems utilized relays and operated over slow speed telegraph channels. Usually a metallic circuit existed between stations and was capable not only of transmitting a significant amount of power in the data bits, but also was able to transmit a continuous direct current level. This physical circuit made it possible to transmit an "OFF-ON" direct current code.

The induced noise and interference was usually several orders of magnitude below the level of the signal pulses and the duration of the noise pulses were not sufficient to have any appreciable effect on the signal pulses. Therefore, a simple pulse counting system provided adequate reliability; a code verification of "answer back" provided additional safety.

With the advent of electronically derived carrier channels, it became more difficult to transmit a binary signal containing a D.C. element. It was necessary to superimpose the direct current signal onto a tone carrier, which in turn was multiplexed onto the voice channel. Early multiplex channels were amplitude modulated or simply "tone on-tone off"; the power in the signal generated by these tone channels was considerably less than the former D.C. pulses. Hence, the induced noise and distortion in the channel began to have a pronounced effect upon the error rate.

Noise bursts could completely eliminate or add pulses which changed the pulse count with the result that systems which relied upon pulse count or pulse duration (long and shorts) were susceptible to transmission errors.

In one solution to the problem digital codes were transmitted in a "2 out of 5" combination which is completely checked to detect errors due to added pulses, deleted pulses, and distorted pulses. It provided several orders of magnitude more reliable than other conventional systems, and is still widely accepted as a highly reliable relay system.

An improvement in tone equipment came with the introduction of frequency shift keying, which was capable of operating under worse conditions (lower signal to noise ratio) and also permitted channel regulation and monitoring since the tone was always present. These tone units (FSK) are operable generally over the range of rates 30 p.p.s. to 600 p.p.s. Since several cycles of carrier are usually necessary to detect the frequency shift, this approaches the theoretical maximum when used on a voice channel.

At higher rates, however, the error rates in amplitude modulation and frequency shift keying transmission systems increase sharply, placing more and more demand on the error checking feature of the coding system. With larger control systems, an increase in digital telemetering, data logging, and computer control, the amount of transmission has multiplexed rapidly and the required system response time has decreased.

This demands that the coding scheme be highly efficient and reliable and that the transmission system make maximum use of the available bandwidth. The "bits per second" capability of a system are not controlling with respect to speed and reliability of performing functions and reporting data; systems which rely upon extra bits per digit, extra check words, complete check-back or double scan are wasteful of transmission time.

It is an object of the present invention therefore to provide a solid state control system which makes more efficient use of the transmission channel consistent with reliability and provide a data rate compatible with known requirements which is readily adaptable to much higher rates should they become necessary in the future.

It is a further object of the present disclosure to provide a novel system using solid state techniques and components having advantages over known types of systems including greater speed, greater compactness, greater flexibility, and accompanying ease of expansion to include additional features and controls.

It is a further object of the present invention to provide means for effecting non-quiescent scanning of remote stations including means at the master station for sending a word message to each remote station in succession, and means at each remote station responsive to the single word message for reporting back data and/or status for each point or unit associated with the reporting remote station.

It is yet another object of the invention to provide a non-quiescent system of such type which includes "butt-in" command means at the master station for interrupting the non-quiescent scanning and transmitting a command word message for effecting a control of equipment at a point in a selected one of the remote stations, including means for reinitiating the non-quiescent scan beginning with said selected remote station a predetermined time interval after the command signal transmission.

It is an additional object of the invention to provide a system of such type in which the transmitter means at a station includes error bit generation means for deriving a plurality of error detection bits from the information bits in each word message, and means for coupling the error bits to said transmitter means for transmission over said channel means after said information bits in the same word, and receiver means at each station for checking the received word including the error detection bits by error detection means before permitting response thereto by the equipment at the receiving station.

It is yet another object of the present invention to provide a system of such type which includes transmitter means at the master station and the remote station for transmitting composite word messages in each operation of the system which includes means for dividing the information bits of each message by a predetermined primitive polynomial to obtain error checking bits for transmission with the message word, and means at each station for checking the received composite message by dividing the bits of the message including the error checking bits by said primitive polynomial, and means for providing a no error signal only if the remainder is zero, to thereby provide a check before any action is taken by the receiving station in response to the received message.

It is a further object of the invention to provide means for generating a composite word message including an identification bit which indicates that the transmitting station is a master station or a remote station, bits identifying a station address, bits for a function code which indicates the function to be performed in response to receipt of the word message, and error detection bits.

It is still a further object of the invention to provide generating means of such type in a remote station which are operative responsive to reception by the remote station of such a word containing the address of the remote station and a function code requesting a reporting of conditions of the points at the remote station to provide a first message which includes a predetermined total number of bits including information bits identifying the remote station address, a function code indicating a point reporting operation, and bits providing a report for a point at the station, and thereafter a further word message which has the same number of bits as the first word and provides report for a plurality of points at said remote station.

It is an additional object of the present invention to provide means for providing word messages including sync signals, and level and time detection means at each station for detecting the time and level characteristics of the sync signal prior to enablement of further equipment at the receiving station.

It is another object of the invention to provide a novel means of encoding information bits for transmission over channel means and for decoding information bits received over channel means.

Figure 4:
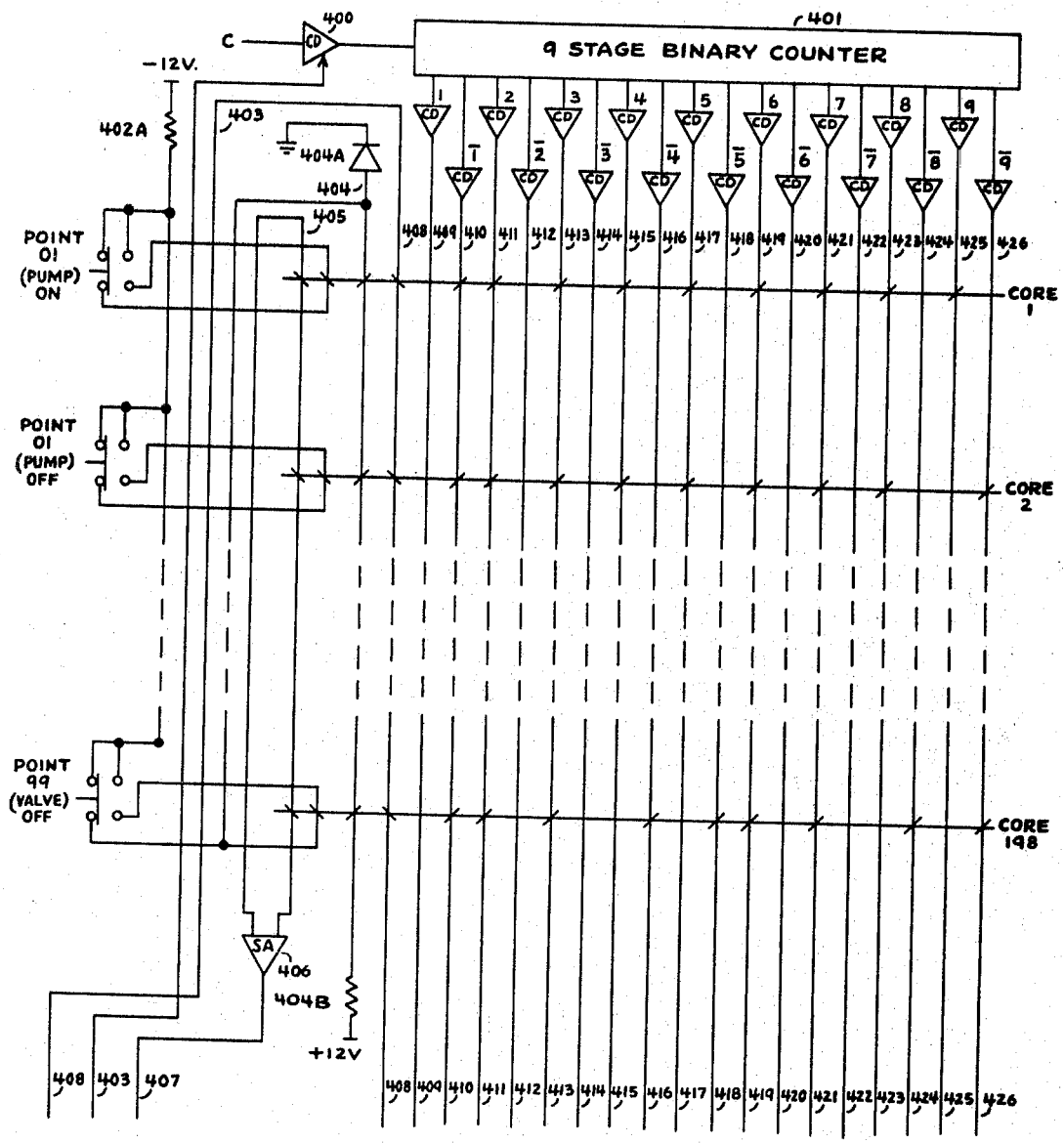
Figure 5:
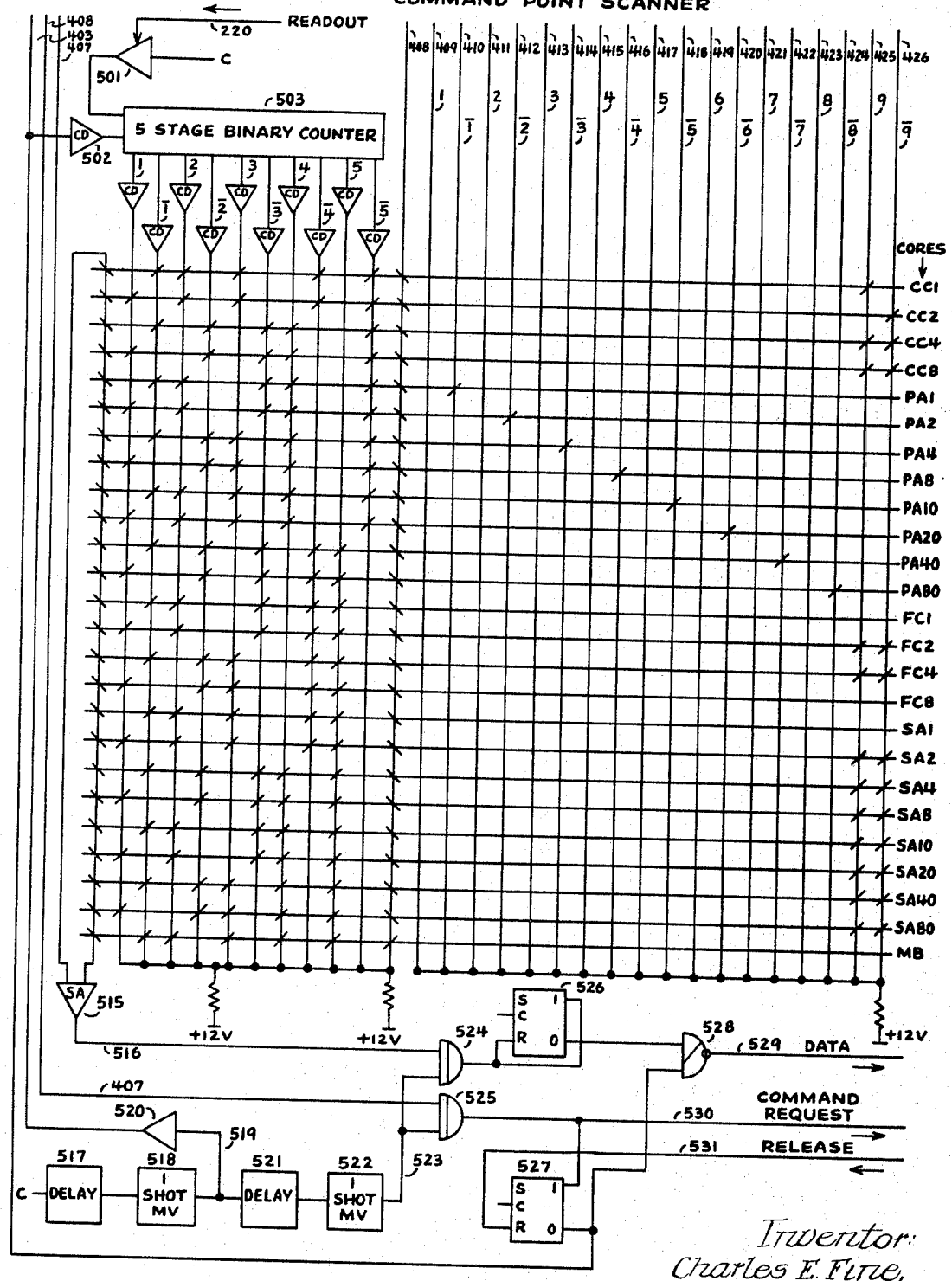
Figure 6A:
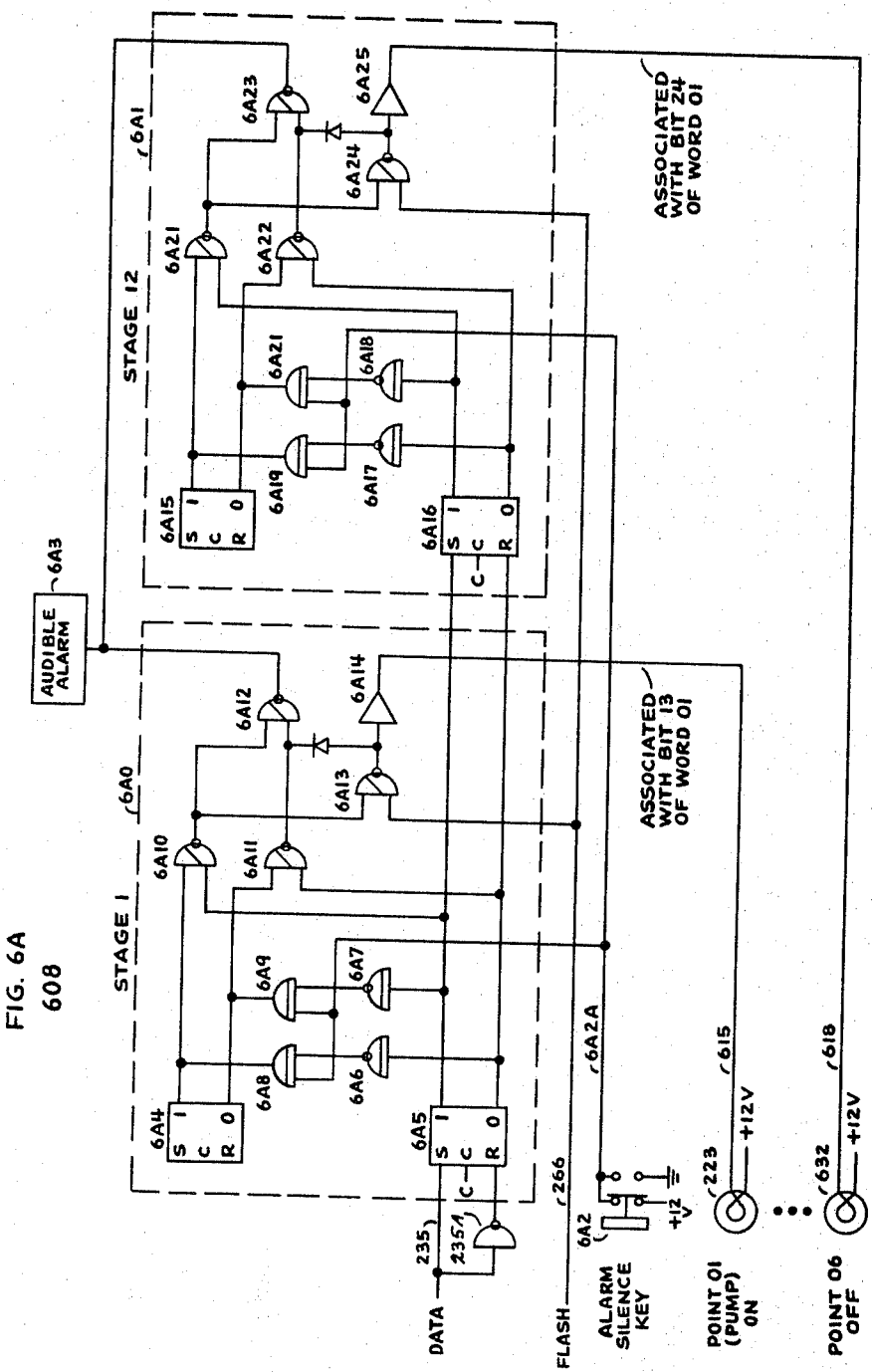
Figure 10:
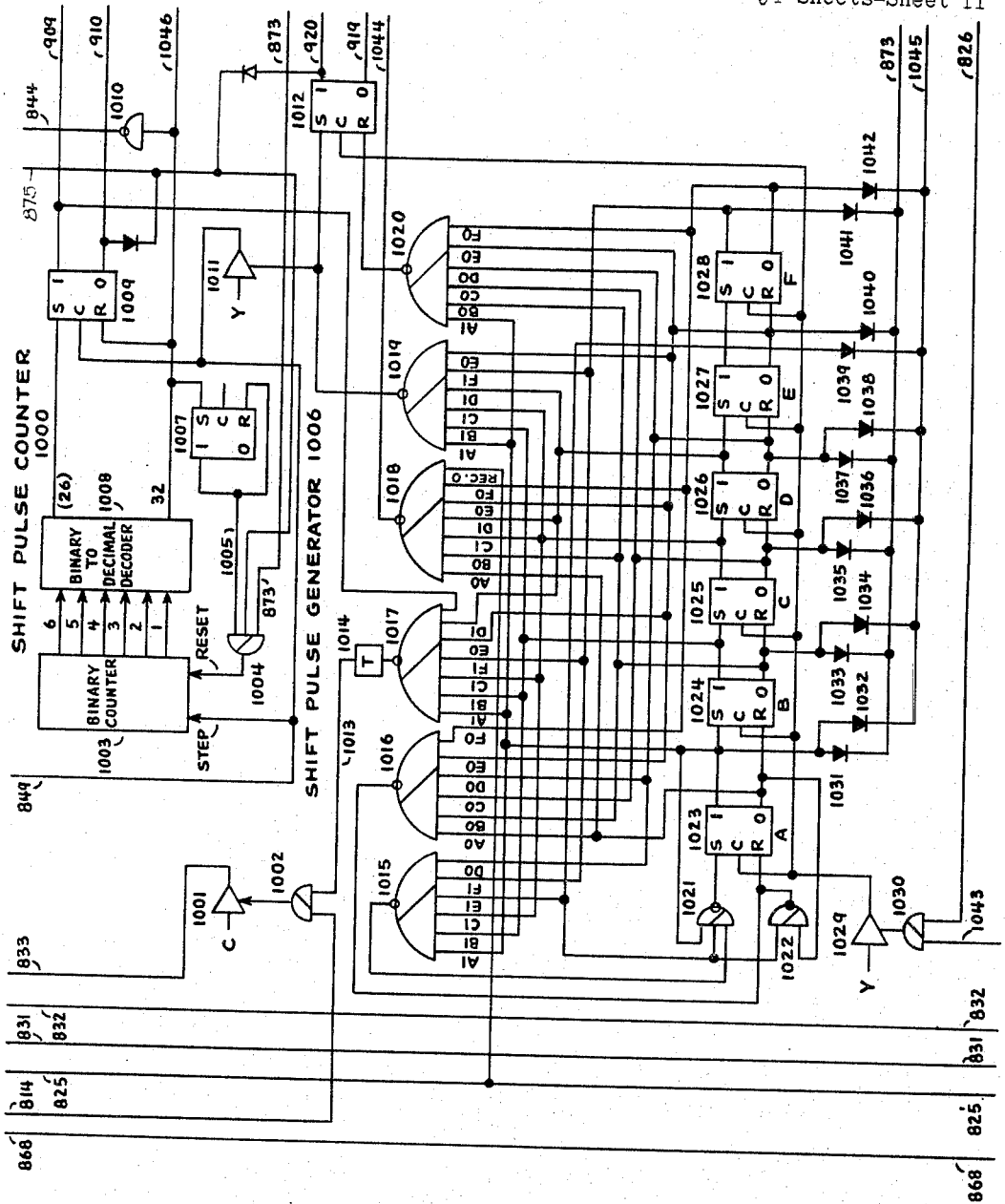
Figure 11:
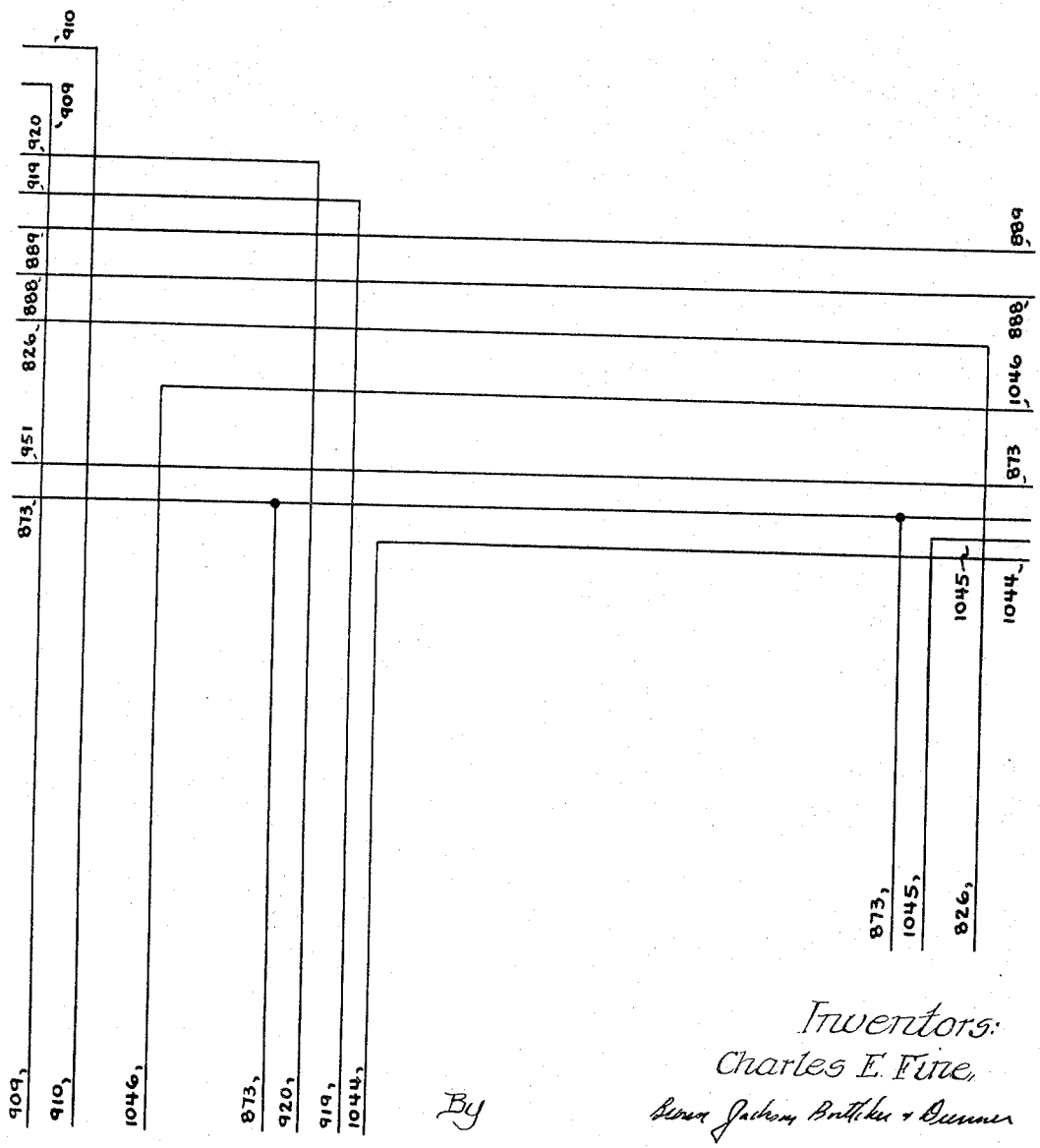
Figure 12:
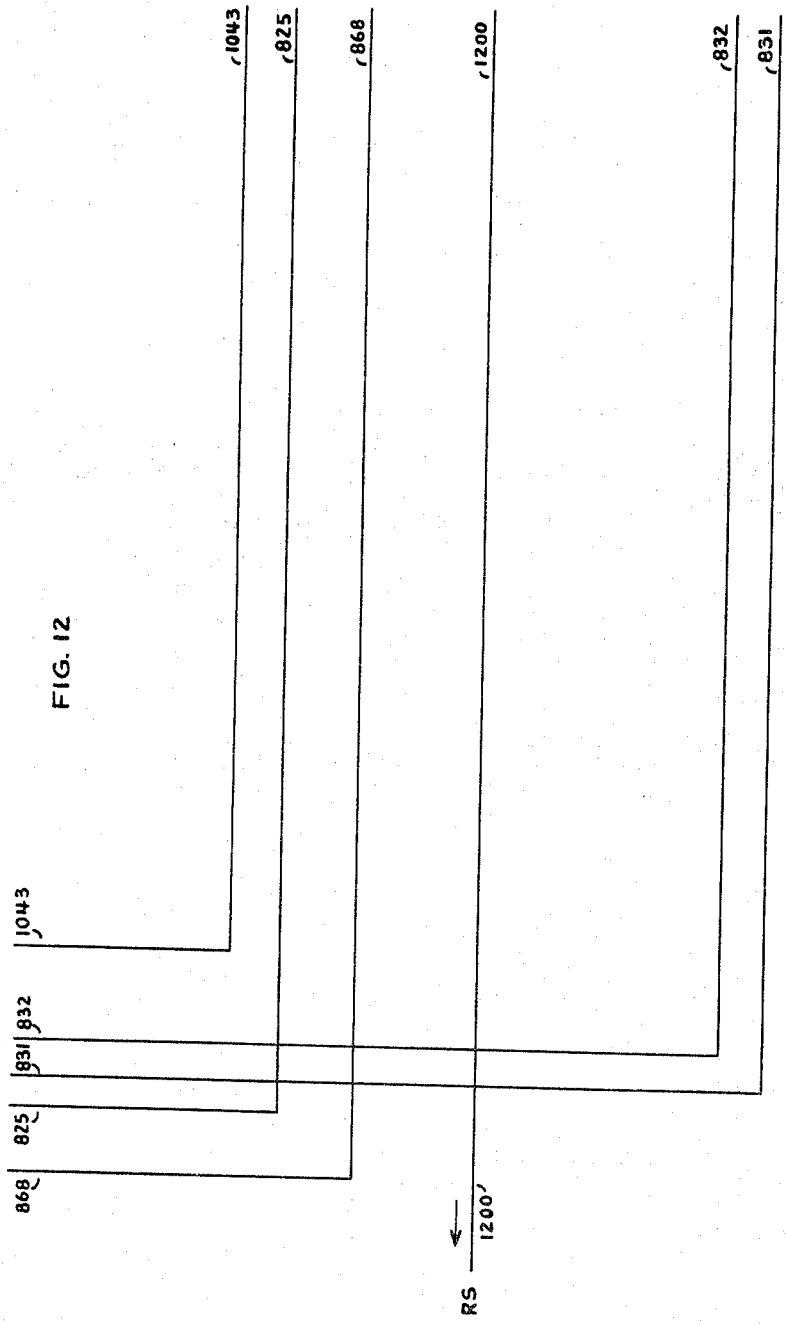
Figure 13:
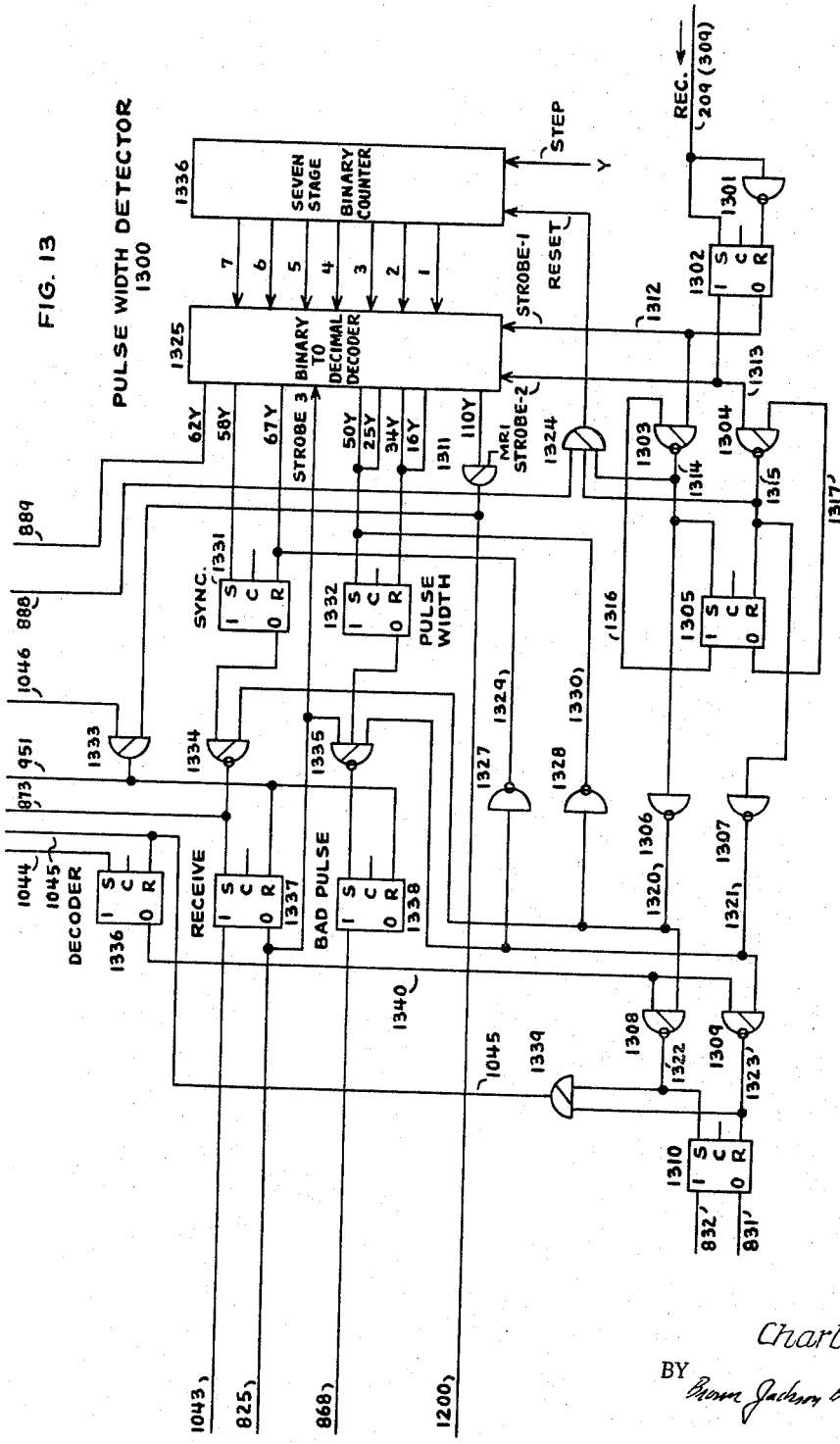
Figure 14:
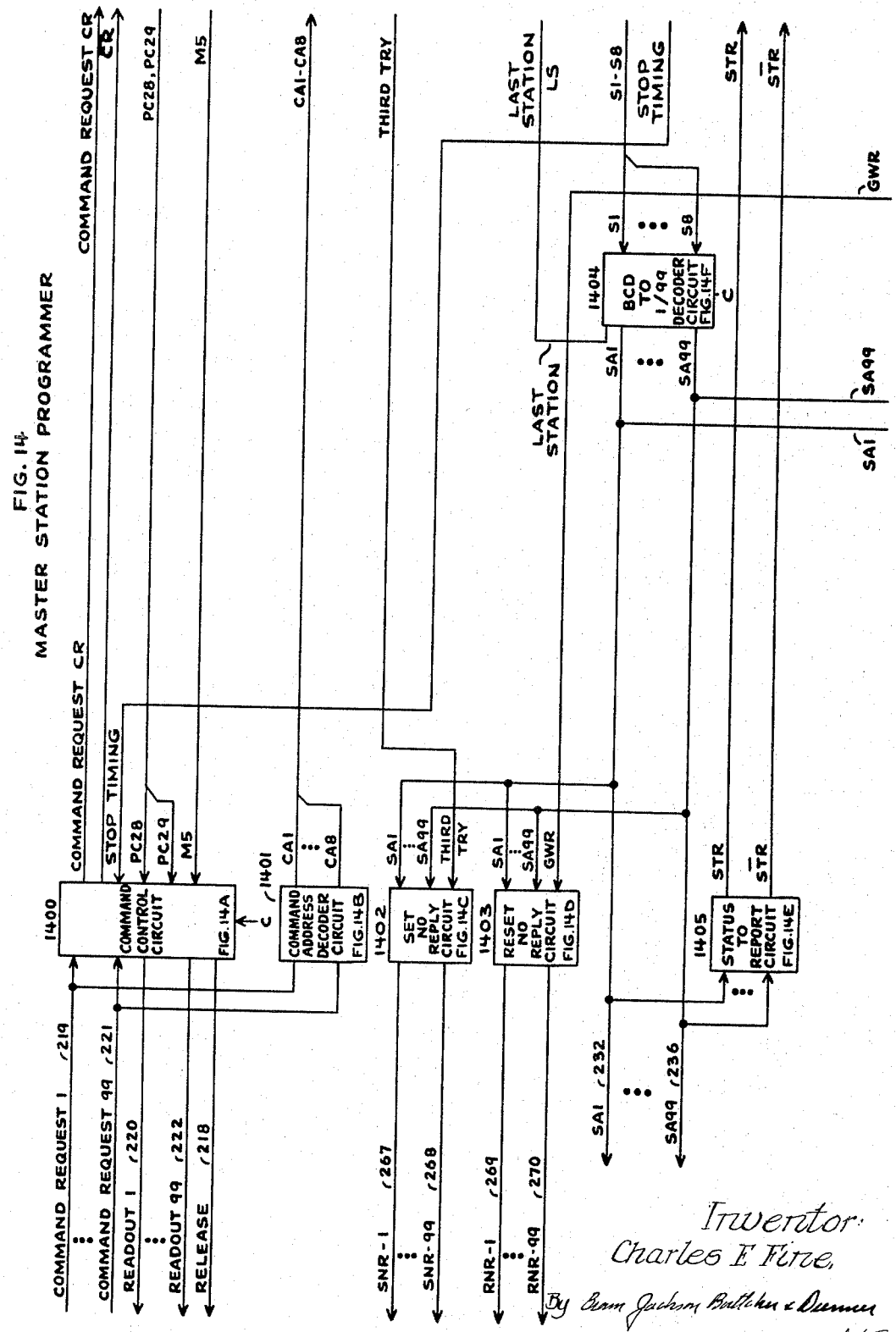
Figure 16:
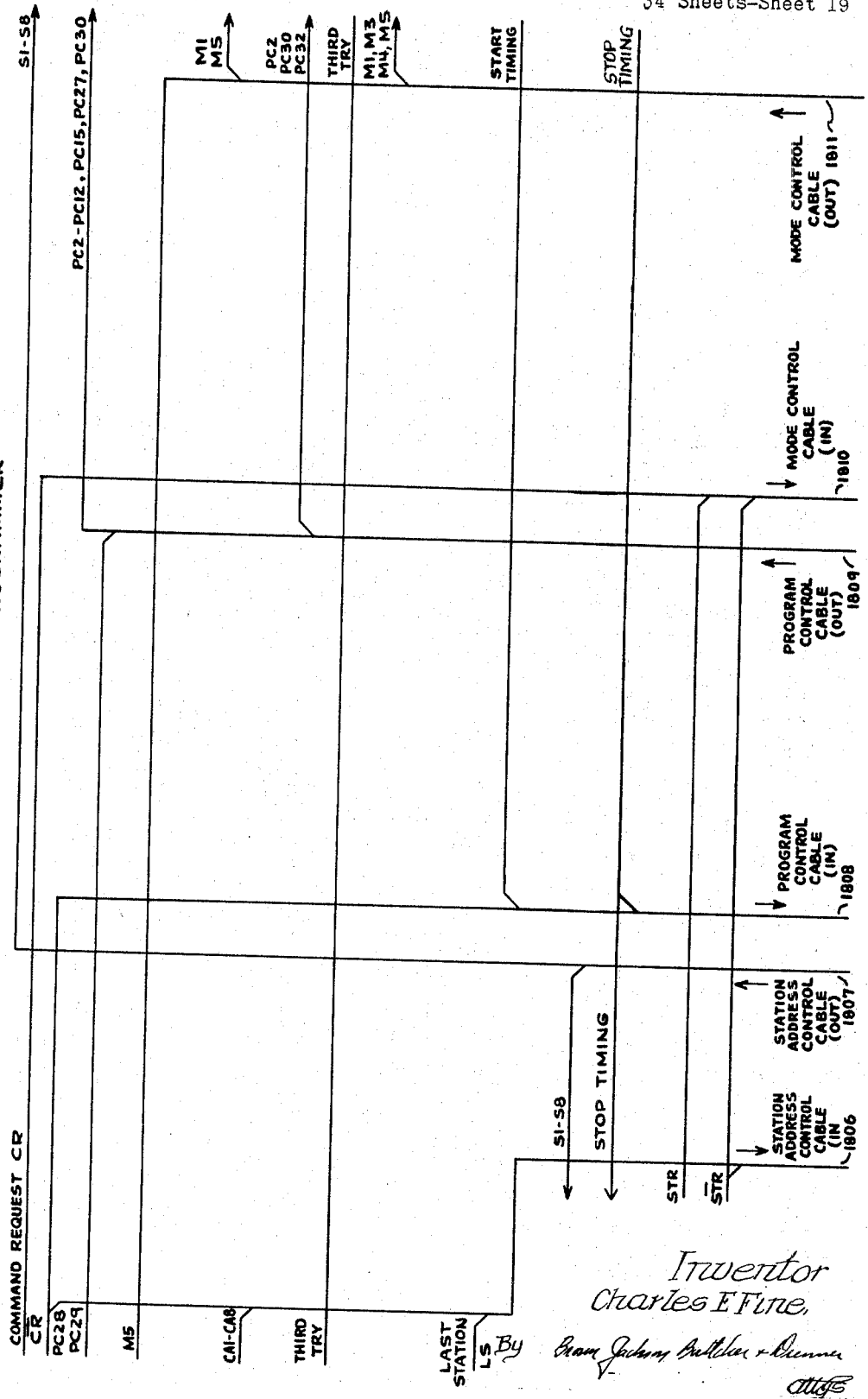
Figure 23:
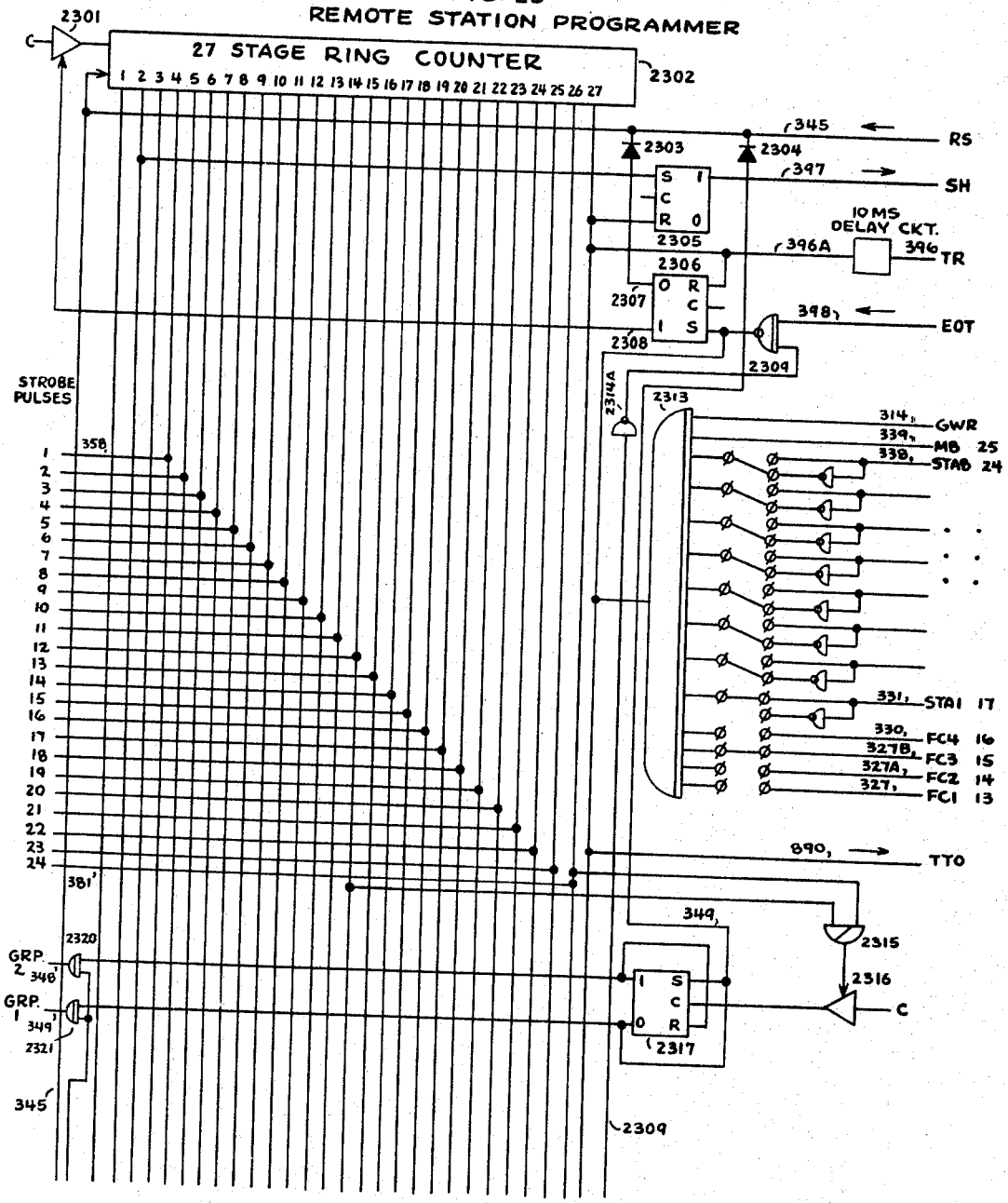
Figure 29:
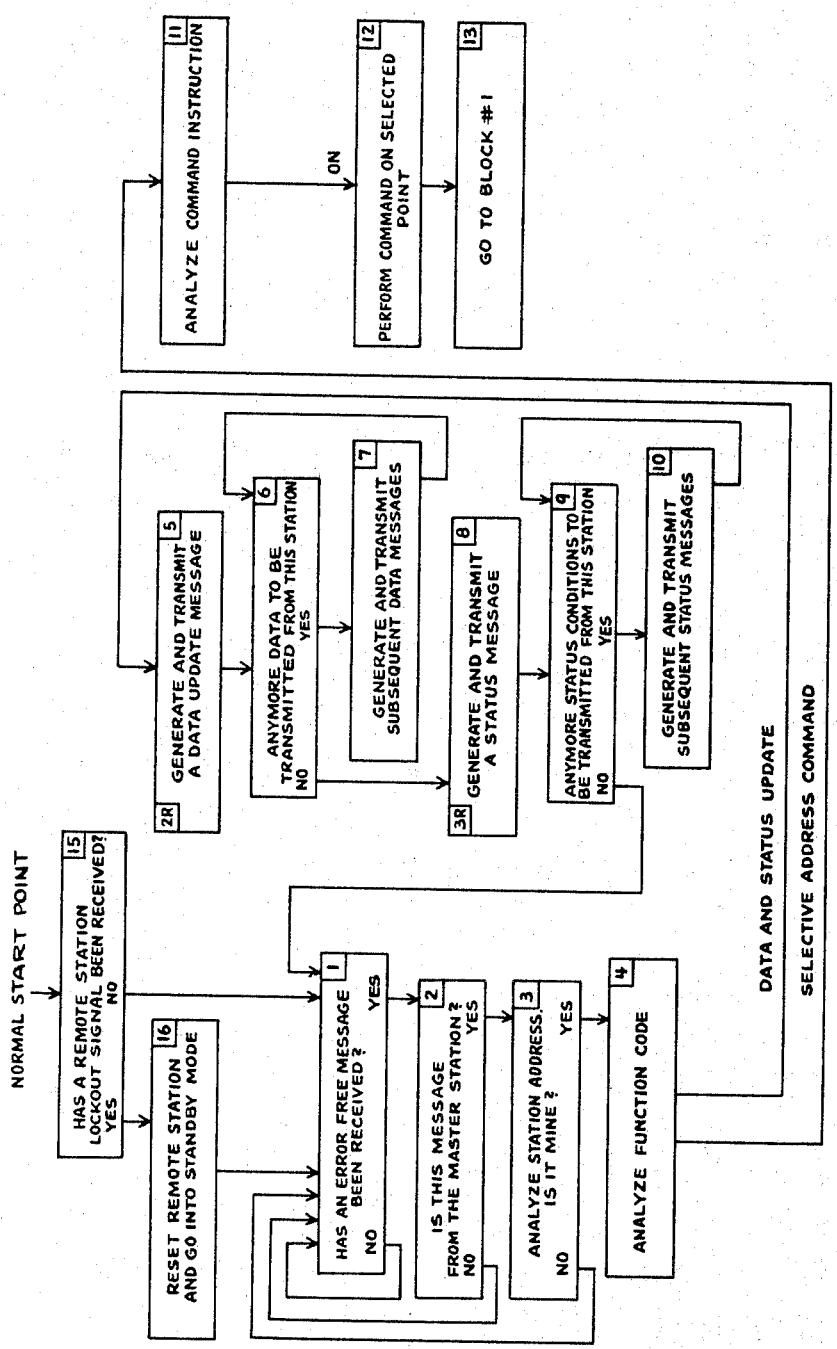

These and other advantages of the present invention will become apparent with reference to the following specification and accompanying drawings wherein basic embodiments of the structure are illustrated, and in which:

FIGURE 1 comprises a block diagram of the interconnected stations of the system;
FIGURE 2 is a block diagram of the master station;
FIGURE 3 is a block diagram of the remote station;
FIGURES 4 and 5 set forth a logic diagram of a command point scanner at the master station;
FIGURE 6 sets forth a logic diagram of register and select gates for status points at the master station;
FIGURE 6A sets forth a logic diagram of the shift register shown in FIGURE 6 at the master station;
FIGURE 7 sets forth a logic diagram of the register and select gates for data points at the master station;
FIGURES 8–13 set forth a logic diagram of the line shift register for master and remote stations;
FIGURES 14–20 set forth a block diagram of the master station programmer;
FIGURES 14A–14F, 15A–15F, 18A–18F, 19A–19C, and 20A–20C set forth logic diagrams of circuits in master station programmer;
FIGURE 21 sets forth a logic diagram of the command point decode and control circuit;
FIGURE 22 sets forth a logic diagram of the point scanner;
FIGURES 23 and 24 set forth a logic diagram of the remote station programmer;
FIGURE 25A illustrates the assembly pattern for FIGURES 2 and 3;
FIGURE 25B illustrates the assembly pattern for FIGURES 4 and 5;
FIGURE 25C illustrates the assembly pattern for FIGURES 8 through 13;
FIGURE 25D illustrates the assembly pattern for FIGURES 14 through 20;
FIGURE 25E illustrates the assembly pattern for FIGURES 23 and 24;
FIGURES 25F–25K illustrate and explain the symbols used in the various figures;
FIGURE 26 illustrates the logic diagram of the translator;
FIGURES 27A–27H illustrate code diagrams;
FIGURE 28 illustrates the flow chart for the master station; and
FIGURE 29 illustrates the flow chart for the remote station.

GENERAL DESCRIPTION

Referring to FIGURE 1, the system as there shown includes master station 100, a first remote station 01 and last remote station 99 interconnected by conductors 101 and 102; remote stations 02–98 being connected to conductors 101, 102 in the sections indicated by dotted line portions of conductors 101 and 102.

Each of the remote stations 01 and 99 are indicated as having command points 01–99, status points 01–126, and data points 01–16 associated therewith. The other stations 02–98 may be of a similar structure.

Referring now to FIGURES 2 and 3, these figures when placed with FIGURE 2 above FIGURE 3 constitute a more detailed block diagram of the system, FIGURE 2 being a block diagram of the master station 100 and FIGURE 3 being a block diagram of remote station 01, which stations are shown as interconnected by conductors 101 and 102. The other remote stations are indicated in FIGURE 3.

Conductors 101 and 102 terminate in hybrid circuit 205 at the master station and in hybrid circuit 305 at the remote station 01. At the master station 100 tone transmitter (TT) 206 and tone receiver (TR) 207 are connected to hybrid 205, and at the remote station 01 tone transmitter 306 and tone receiver 307 are connected to hybrid 305.

At the master station, line shift register 267 is connected to normally place a signal on lead 208A to turn on tone transmitter 206 which will thus normally transmit its lower frequency over hybrid 205 and the lines 101–102. At each remote station, such as illustrated station 01, the transmitter, such as 306, is normally turned off.

Signal transmissions from the master station 100 to the remote station 01 are effected by line shift register 267 which transmits signals over the frequency shift lead 208 to control the tone transmitter 206 to shift its frequency between the normal lower frequency (2440 c.p.s.) and a higher frequency (2760 c.p.s.) which frequencies are projected via the hybrid 205 over the metallic wires 101 and 102 to the remote stations 01–99. (2600 c.p.s.± 160 c.p.s.=2760 c.p.s. and 2440 c.p.s.) These signals arrive at the hybrid circuits at each of the remote stations, 01–99, such as at the hybrid circuit 305 of remote station 01. The frequency shift signals are transmitted over hybrid circuit 305 at remote station 01 to tone receiver 307 which responsively signals over the receive conductor 309 to the line shift register 399 by transferring conductor 309 between logic 1 and logic 0 signals.

In transmitting from the remote station 01 to the master station 100, line shift register 399 first transmits signals over path 308A to the tone transmitter which turns on to normally transmit a given lower frequency (3140 c.p.s.). Thereafter, the line shift register 399 signals over the frequency shift lead 308 to control the tone transmitter 306 to shift its output frequency between the normal lower frequency (3140 c.p.s.) and a higher frequency (3460 c.p.s.), which frequencies (3300 c.p.s.± 160 c.p.s.=3460 c.p.s. and 3140 c.p.s.) are projected via the hybrid circuit 305 over the metallic wires 101 and 102 to the master station 100, and to the other remote stations 02–99.

The transmission signals arrive at the hybrid circuit 205 of the master station 100 and the like hybrid circuit at the other remote stations 02–99. At the master station 100 (and similarly at the other remote stations) the frequency shift signals are transmitted via hybrid 205 to the tone receiver, such as 207, which signals over the receive conductor 209 to the line shift register 260 by transferring conductor 209 between logic 1 and logic 0 signals.

Referring briefly to FIGURES 27A–27D, four signals which are transmitted over conductors 101, 102 in the operation of the system are set forth thereat.

As shown in FIGURE 27A, an "interrupt signal" comprises shift for 9.38 milliseconds from the lower tone to the higher tone, and back to the lower tone. The "interrupt signal" is the first signal sent from the master station to cause all remote stations to reset to start position in preparation to receive a message from the master station.

In FIGURE 27B, sync signals of the time and value there shown are transmitted from the master station and remote stations at the beginning of each transmission, the sync signals following the interrupt signal in transmissions from the master station.

As shown in FIGURE 27C, logic 0 on the transmission channel as transmitted from a master station or remote station comprises essentially a shift from the higher frequency to the lower frequency.

As shown in FIGURE 27D, logic 1 on the transmission channel as transmitted from master station or remote station comprises essentially a shift from the lower frequency to the higher frequency.

Referring now once more to the upper left hand portion of FIGURE 2 the master station as there shown includes command points 01–99 including command point push buttons 210, 211 . . . 212 for controlling, via the system equipment, the selective operation of relays 310, 311 . . . 312 and their associated make contacts at remote stations 01, shown in the upper left of FIGURE 3. Associated with push buttons 210, etc. (FIGURE 2) is a command point scanner 216 which continually scans these push buttons, as set forth hereinafter. A command point decode and control circuit 313 (FIGURE 3) is connected to control relays 310 . . . 312 in a manner to be described more fully hereinafter.

The master station further includes command point push buttons 213, 214 . . . 215 for controlling, via the system, command points 01–99 at remote station 99, not shown but of structure similar to that illustrated at station 01. Command point scanner 216A is associated with push buttons 213, 214 . . . 215. It should be understood that other groups of push buttons and command point scanners are located at the master station for remote stations 02–98. Each remote station includes similar command point relays and an associated command point decode and control circuit similar to that shown in FIGURE 3.

A set of status points located below the command point push buttons in FIGURE 2 include lamps 223, 224 . . . 225 . . . 226 for indicating, via the system, the condition of status points 01–126 of station 01, shown in FIGURE 3, as determined by the operated or non-operated condition of associated equipment contacts 340, 341 . . . 342 . . . 343 at the remote station. A register and selection gate circuit 231 is associated with lamps 223, 224 . . . 225 . . . 226 (FIGURE 2) for a purpose to be disclosed, and a point scanner which continually scans status points 01–126 associated with contacts 340, 341 . . . 342, 343 (FIGURE 3).

A further group of lamps 227, 228 . . . 229 . . . 230 (FIGURE 2) is provided for indicating, via the system, the status of status points 01–126 of station 99, not shown, but as would be understood. A register and selection gate circuit 231A is associated with lamps 227, 228 . . . 229 . . . 230. It should be understood that other groups of lamps and register and selection gate circuits are located at the master station for remote stations 02–98, and similar status point contacts and an associated point scanner are included at each remote station. A plurality of data point three-digit decimal indicators 236 . . . 237, 238 . . . 239 are shown below the status point lamps in FIGURE 2, each of which has a BCD to decimal converter, such as 244, for giving, via the system, decimal readings corresponding to values of certain quantities provided by data points 01 . . . 08, 09 . . . 16 at station 01, FIGURE 3, by means of transducers 348 . . . 349 and DATEX code discs 350 . . . 351 associated therewith.

A register and selection gate circuit 252 is associated with decimal indicators 236 . . . 237, 238 . . . 239 and BCD to decimal converters 244 . . . 245, 246 . . . 247 for use in providing such information to the converters 244–247.

At the remote station relays 353 . . . 355, gates 352 . . . 354, and A to D converter 382 with its associated twelve gates 382–1 to 382–12 are associated with transducers 348 . . . 349 and gates 356, 357 . . . 358, 359, and translator 382A are associated with DATEX code discs 350 . . . 351.

Another group of data point three-digit decimal indicators 240 . . . 241, 242 . . . 243 are shown below the decimal indicators 236, etc., in FIGURE 2 for giving, via the system, decimal readings corresponding to values of certain quantities of data points 01 . . . 08, 09 . . . 16 at station 99, not shown, but apparent from the structure shown in FIGURE 3.

In some cases, a fourth decimal indicator with a wired in "0" as the last significant digit is positioned to the right of the three decimal indicators 236, etc., shown in FIGURE 2.

As noted above, the master station programmer 260, shown in FIGURE 2, will, in normal operation, repeatedly address each remote station 01–99 in turn via the line shift register asking for a report as to the condition of the data and status points thereat. As the line shift register, such as 399, FIGURE 3, of each remote station, such as station 01, receives the request for data and status update, the line shift register, such as 399, cooperates with the remote station programmer, such as 395 thereat, to effect a roll call, reporting to the master station the information relating to each data and status point thereat.

Such routing operation, which is designated "non-quiescent scanning" over the remote stations, continues until a command point button, such as 210, etc., is depressed. When a command point button, such as 210 is depressed, contacts associated therewith signal the associated station command point scanner 216. As indicated in FIGURE 2, there is a command point scanner at the master station 100 for each remote station 01-99, and these command point scanners are continually scanning their associated push buttons.

If, for example, push button 210 is depressed, the actuated contacts associated therewith signal command point scanner 216 which detects the closed contacts as it arrives at this point in its scan. Thereupon, scanner 216 signals the programmer 260 over command request path 219 of the operated condition of a set of contacts at a command point associated therewith.

As a result thereof, master station programmer 260 interrupts the normal data and status point routine, and with the aid of line shift register 267, and associated channel signalling equipment 206, 205, transmits a signal to line shift register 399 to control the remote station programmer 395, and command point decode and control circuit 313 to operate relay 310 to turn the pump on at point 01.

The programmer 260 then waits one second and sends a request for data and status update from station 01. After receipt of data and status update from station 01, programmer 260 causes the system to continue its non-quiescent scan operation with the next station, i.e., station 02 in this case, as will be disclosed in more detail hereinafter.

*Signalling between stations*

In signalling between the stations, the four signals shown in FIGURES 27A-27D are put together in various combinations to provide "word" messages. As will be shown, only four types of word messages are employed in the system, two of the four types of word messages being transmitted by the master station and two of the four types being transmitted by the remote stations.

The first type of word message which is sent by the master station as a request to an addressed remote station for data and status update is shown in FIGURE 27E. As there shown, a typical message of this type comprises the following elements which are transmitted from the master station in the order indicated: an interrupt signal, a set of sync signals, a master station indicating a bit comprising the logic "1" signal, the station address comprising eight bits, the function code comprising four bits, twelve blank bits comprising twelve logic 0's, and six error detection bits. It should be noted that the interrupt signal is separated from the sync signals by a pause (lower frequency tone) of 1.37 or 2.62 milliseconds. It should also be noted that recognition circuitry, in receiving logical bits, looks at the action occurring at the center of the bit and disregards transitions up or down between bits, as for example, between two 0's.

In the particular station address shown, i.e., station 01 for the first station, shown in FIGURE 3, the first four bits, i.e., 0000, represent the decimal digit 0 in binary coded decimal (BCD) notation; and the last four bits, i.e., 0001, represent the decimal digit 1 in BCD notation. The station address for station 99, although not shown, would be 10011001 as would be understood. The BCD function code 0101 represents function 5 which is a request for data and status update. The twelve blank bits, all 0's, are used as fill ins for the shift register flip flops at transmitting and receiving stations since no point address and command codes are necessary in this type of message in which individual points are not addressed as they are in a selective address command message (i.e., FIGURE 27H). Rather, the remote station programmer 395 upon receipt of the function code via the line shift register 399 initiates a routine in which each point reports to the master station.

The master bit, the station address, the function code, and the twelve blank bits comprises a 25 logic bit block. As will be described in more detail hereinafter, six error detection bits are derived from the 25 logic bit block to form the last six bits of the message. These six bits are derived by adding six 0's to the 25 logic bit block and dividing this by a primitive polynomial 1011001 using the modulo 2 operation, the six bit remainder constituting the six error detection bits.

As a result of receipt of the message shown in FIGURE 27E, station 01 (FIGURE 3) sends the word message, shown in FIGURE 27F, comprising the first data update transmission. As shown, a typical message of this type comprises the following elements which are transmitted from remote station 01 in the order given: a set of sync signals, a remote station indicating bit "0," which locks out other remote stations, the station 01 address comprising eight BCD, bits 0000 0001 to apprise the master station that station 01 is reporting, the function code 4 comprising four BCD bits 0100 to apprise the master station that the message pertains to data updating, twelve data BCD bits for point 01, and six error detection bits. The twelve data bits comprise three groups, the first group 0001 representing decimal digit 1, the second group 0011 representing decimal digit 3, and the last group 0111 representing decimal digit 7 to give a report of 137. The reason for a first data transmission for point 09 rather than point 01 will be set forth more fully hereinafter. Station 01 continues reporting until all data points have been reported. It should be appreciated that after transmission of the first data word, the station address and function code are not necessary and therefore point reporting bits are substituted in place thereof.

A resume of data word reporting is as follows, using the above example as data word 1:

DATA WORD 1

Sync + Remote + 8 Station + 4 Function + 12 Data Bits + 6 Error
Sig.      Bit       Add. Bits    Code Bits     For Point 09    Det. Bits
 0         0000 0001       0100          000100110111      001111

DATA WORD 2

Sync + Remote + 12 Data Bits + 12 Data Bits + 6 Error
Sig.      Bit      For Point 01   For Point 10   Det. Bits
 0         000100110111    000101000001     000110

DATA WORD 3

Sync + Remote + 12 Data Bits + 12 Data Bits + 6 Error
Sig.      Bit      For Point 02   For Point 11   Det. Bits

DATA WORD 4

Sync + Remote + 12 Data Bits + 12 Data Bits + 6 Error
Sig.      Bit      For Point 03   For Point 12   Det. Bits

DATA WORD 5

Sync + Remote + 12 Data Bits + 12 Data Bits + 6 Error
Sig.      Bit      For Point 04   For Point 13   Det. Bits

DATA WORD 6

Sync + Remote + 12 Data Bits + 12 Data Bits + 6 Error
Sig.      Bit      For Point 05   For Point 14   Det. Bits

DATA WORD 7

Sync + Remote + 12 Data Bits + 12 Data Bits + 6 Error
Sig.      Bit      For Point 06   For Point 15   Det. Bits

DATA WORD 8

Sync + Remote + 12 Data Bits + 12 Data Bits + 6 Error
Sig.      Bit      For Point 07   For Point 16   Det. Bits

DATA WORD 9

Sync + Remote + 12 Data Bits + 12 Blank Bits + 6 Error
Sig.      Bit      For Point 08                      Det. Bits See also data points 1-16, Figures 2, 3, and 7.

If the remote station has status points upon which reporting is required, it immediately sends the word message shown in FIGURE 27G which constitutes the first status update transmission comprising the following signals, sent in the following order: sync signals, the remote bit 0, the station BCD code 0110 representing status update, twelve status bits 100101101001 for status points 01-06, and six error detection bits 100000.

Referring to "status point 01 (pump) on" in FIGURE 3, if contacts 340 are closed, indicating that the pump is on (or is in the process of being turned on), the first of the twelve bits will be "1" as shown and lamp 223 in FIGURE 2 will be lighted. Also in this case contacts 341 will be open and the second of the twelve bits will be "0" as shown, and lamp 224 would be extinguished. Alternately, if contacts 340 had been open and contacts 341 closed, indicating that the pump is turned off (or is in the process of being turned off), the first of the twelve bits would have been "0" and the second of the twelve bits would have been "1," in which case lamp 223 would be extinguished and lamp 224 would be lit.

The other status points of the group 01–06 are similarly operative. As the next status word message does not require station address and function code, the succeeding twelve bit positions are available for reporting status points.

Using the above example as status word 1, a resume of status point reporting is as follows:

STATUS WORD 01

Sync+Remote+ 8 Station +4 Function +12 Status Bits+ 6 Error
Sig. Bit Add. Bits Code Bits For Points Det. Bits
 01–06
 0 0000 0001 0110 100101101001 1000000

STATUS WORD 02

Sync+Remote+ 24 Status Bits + 6 Error
Sig. Bit For Points 07–18 Det. Bits

STATUS WORD 03

Sync+Remote+ 24 Status Bits + 6 Error
Sig. Bit For Points 19–30 Det. Bits

STATUS WORD 04

Sync+Remote+ 24 Status Bits + 6 Error
Sig. Bit For Points 31–42 Det. Bits

STATUS WORD 05

Sync+Remote+ 24 Status Bits + 6 Error
Sig. Bit For Points 43–54 Det. Bits

STATUS WORD 06

Sync+Remote+ 24 Status Bits + 6 Error
Sig. Bit For Points 55–66 Det. Bits

STATUS WORD 07

Sync+Remote+ 24 Status Bits + 6 Error
Sig. Bit For Points 67–78 Det. Bits

STATUS WORD 08

Sync+Remote+ 24 Status Bits + 6 Error
Sig. Bit For Points 79–90 Det. Bits

STATUS WORD 09

Sync+Remote+ 24 Status Bits + 6 Error
Sig. Bit For Points 91–105 Det. Bits

STATUS WORD 10

Sync+Remote+ 3 Blank + 21 Status Bits + 6 Error
Sig. Bit Bits For Points 106–126 Det. Bits In the last illustration, the three blank bits, i.e., 000, are sent before the 21 status bits to provide an expeditious arrangement for feeding into and reading out of a twenty-four stage shift register. (See also FIGURES 2, 3, and 6.) Status points 01–99 are related to command points 01–99 as illustrated, but status points 100–126 are not related thereto as will be apparent.

Thereupon having noted receipt of all data and status reporting for station 01, the master station programmer next sends the request for data and status update from the next station, i.e., station 02, as shown in FIGURE 27E except that the station address sent is 0000 0010 for station 02. In this manner all stations 01–99 are interrogated and the master station starts over again, interrogating station 01.

Non-quiescent scanning continues indefinitely until a command point button is depressed. At such time, at a predetermined appropriate point in the data and status scan, the master station 100 sends a selective address command signal as illustrated in FIGURE 27H which comprises the 9.38 millisecond interrupt signal which causes all remote stations to reset. This is followed by the sync signals, the masted bit signal, the station address signal which, as illustrated is 0000 0001 for station 01, the function code 9 as BCD code 1001 which marks station 01 that the message pertains to a selective address command, the point address code 0000 0001 which selects point 01 as determined by the depression of button 210 in FIGURE 2, the command code 1 as BCD code 0001 which marks the remote station 01 to turn the device ON at point 01, followed by six error detection bits.

If button 211 has been depressed instead of button 210, the command code 2 as BCD code 0010 would have been sent to mark the remote station 01 to turn the device OFF at point 01.

*At master station*

With the foregoing background, the functions of the following components illustrated in FIGURES 1–2 will be more fully identified.

Master Station Programmer 260
 (a) Determines what type of message shall be sent;
 (b) Determines the particular controlled station to which the message shall be addressed;
 (c) Generates Interrupt signal, Master bit, Station address, Function code;
 (d) Addresses each remote station in sequence with the function code requesting data and status update, unless the operator pushes a command point button, whereupon a function code apprises the addressed controlled station that a control is to be effected;
 (e) Instructs line shift register as to the routing of incoming messages.
Line Shift Register 267
 (a) Generates the sync signals;
 (b) Performs the division to provide the error-detection bits for outgoing messages;
 (c) Accepts incoming messages, checking the same for error;
 (d) Routes incoming messages as instructed by the master programmer.
Register and Select Gates 252 . . . 259 for Data
 (a) Receive data bits from line shift register;
 (b) Outputs of the display shift registers are paralleled, 4-bit groups corresponding to the decimal digits comprising the data which are fed to the decoders;
 (c) The BCD to decimal decoders light the correct lamps.
Register and Select Gates 231 . . . 231A for Status
 (a) Amplify incoming status bits;
 (b) Distribute the amplified bits to corresponding point indicator lamps;
 (c) Flashing lamp indicates that status of the point has changed.
Command Point Scanner 216
 (a) Monitors command point buttons;
 (b) Informs line shift register when a command has been keyed;
 (c) Command point buttons key a selective address command.

*At remote station*

Remote Station Programmer 395
 (a) Analyzes each message received;
 (b) Determines whether or not the message is addressed to that controlled station;
 (c) Controls the routing of incoming messages;
 (d) Generates Remote bit, Station address, Function code;
 (e) Originates Data update messages and Status update messages.
Line Shift Register 399
 (a) Accepts incoming messages, checking same for error;
 (b) Generates the sync pulses;

(c) Performs the division to provide the error-detection bits for outgoing messages;
(d) Routes incoming messages as instructed by remote programmer.

Command Point Decoded and Control Circuit 313
  Distributes incoming commands to addressed point.

Point Scanner 344
  When directed by the remote programmer, the point scanner scans each point and sends a binary indication of the status of each to the line shift register.

The master station line shift register circuit 267 and the remote station line shift register circuit 399 are substantially similar and FIGURES 8–13 have therefore been marked with identifying numerals to illustrate both circuits as will be shown.

Referring to FIGURES 8 and 9, and more specifically to the shift register 800 briefly and error circuit 801, the operation thereof is set forth hereat.

At the Transmitting Station, Whether Master or Remote
  (a) Twenty-five bits of information or blanks enter the shift register 800;
  (b) As these twenty-five bits go out into the channel, the error checking circuit 801 divides them by the selected primitive polynomial in a modulo 2 operation, thus providing a six bit remainder;
  (c) This six bit remainder is transmitted over the channel.

Following is a mathematical illustration of the derivation of the error code for FIGURE 27E at the transmitting end. In performing the various steps of the modulo 2 operation, which is well known in the art, if two bits are alike the resulting bit is 0; whereas if two bits are unlike the resulting bit is 1.

```
1011001 | 1000000010101000000000000000000
          1011001
          -------
          1100101
          1011001
          -------
          1111000
          1011001
          -------
          1000011
          1011001
          -------
          1101001
          1011001
          -------
          1100000
          1011001
          -------
          1110010
          1011001
          -------
          1010110
          1011001
          -------
          1111000
          1011001
          -------
          1000010
          1011001
          -------
          1101100
          1011001
          -------
          1100110
          1011001
          -------
          1111110
          1011001
          -------
          1001110
          1011001
          -------
          1011100
          1011001
          -------
          101000 = Error Checking Bits
```

At the Receiving Station, Whether Master or Remote
  (a) As the twenty-five bits of information or blanks and the six error checking bits enter the shift register 800 the error checking circuit divides them by the selected primitive polynomial in a modulo 2 operation; also the error checking circuit continues to divide into the error checking bits.
  (b) If the remainder is zero, it is assumed that no error in transmission occurred.
  (c) Following is a mathematical illustration of the checking of the code for FIGURE 27E at the receiving end:

```
1011001 | 1000000010101000000000000101000
          1011001
          -------
          1100101
          1011001
          -------
          1111000
          1011001
          -------
          1000011
          1011001
          -------
          1101001
          1011001
          -------
          1100000
          1011001
          -------
          1110010
          1011001
          -------
          1010110
          1011001
          -------
          1111000
          1011001
          -------
          1000010
          1011001
          -------
          1101100
          1011001
          -------
          1101010
          1011001
          -------
          1100110
          1011001
          -------
          1111110
          1011001
          -------
          1001111
          1011001
          -------
          1011001
          1011001
          -------
          000000 = Error Checking Bits
```

A description of the specific structure for and the manner of accomplishing such checking operation is set forth hereinafter.

*Master station sends signal to remote station for non-quiescent scanning*

With reference to FIGURES 2 and 3 the manner of operation of the master station in effecting the non-quiescent scanning of the remote stations is now set forth. Master station programmer (MSP) 260, FIGURE 2, initially places logic 1 signal on the INT lead 263, and the line shift register (LSR) 267 via the frequency shift lead 208 (FS) effects a frequency shift of the tone transmitter 206 to send the interrupt signal (see FIGURE 27A) over the line wires 101–102 to the remote stations.

At the remote stations, as for example, at station 01 (FIGURE 3) the interrupt signal is received by tone receiver 307 and receiver 307 responsively places a 9.38 millisecond logic 1 signal on the receive lead 309 (RC) to the remote line shift register 399 (LSR), which in turn signals the remote station programmer 395 (RSP) and the point scanner 344 over conductor 345 (RS), thus resetting the remote station 01 to the idle state with all flip-flops in the correct condition.

Master station programmer 260 MSP next prepares the line shift register 267 to receive data by placing logic 1 on the shift lead 262 (SH) and, via the data lead 217 stores twenty-five bits, shown in FIGURE 27E, in the shift register of the line shift register circuit 267 in the following order: master bit, station address bits, function code bits, and twelve blank bits.

Master station programmer MSP then signals line shift register LSR over the TR lead to start transmitting, and to start the .5–1 second timer to time the interval in which a reply is expected.

Thereupon, the line shift register 267 (LSR) (1) generates and transmits the sync signals; (2) encodes and sends the twenty-five bits over the line in the order given above; (3) on the basis of the bits being transmitted, generates the six-bit error code; and (4) sends these error bits over the line.

Remote station receives, analyzes and sends to master station

Each remote station receives the sync signals as transmitted, and the line shift register, such as 399, analyzes the received signals and the sync pattern. If the sync pattern is not received, the remote station bars the registration of message and error bits in its line shift register. If the sync pattern is detected, the remote line shift register circuit, such as 399, decodes and steers the 25 bits of the incoming message into its shift register, the error checking circuit checking these bits as received, and continuing to check the following six error checking bits by the modulo 2 division process.

The remote line shift register, such as 399, checks the position of the flip-flops in the error checking circuit. If it finds all of these flip-flops in the reset condition indicating that the remainder in the division process is zero, it sends the "good-word received" signal via lead GWR to the remote station programmer RSP.

As a result, the station addressed (01, FIGURE 3, for example) will turn on its tone transmitter, such as 306, the remote station programmer RSP signalling over the "turn transmitter on" lead 308A (TTO) to line shift register 399 (LSR) which in turn signals the tone transmitter TT over lead 308. The tone transmitter TT thereupon transmits its lower frequency over conductors 101, 102 to the master station. The remote station programmer at each of the stations which were not addressed recognizes that its station has not been addressed, and blocks any further operation.

Assuming station 01 was addressed, the remote station programmer RSP signals the line shift register LSR via shift lead 397 (SH) preparatory to loading the shift register with data. At the same time that the shift signal is sent, remote station programmer RSP via the "data" lead 346 loads the remote bit, the address for station 01, and the function code for "data word" into the shift register of LSR 399.

Thereupon, remote station programmer RSP signals the twelve gates 356 . . . 357 for point 09 via the paths "data word 1" (350), "group 2" (349), and at the same time begins the transmission of the first of twelve strobe signals 13-24 to translator 382A, whereby the twelve DATEX code signals from the code disc for point 09 are fed in parallel to translator 382A. The translator 382A by means of the sequential strobe signals 13-24, translates the information into a three digit BCD code, and feeds it out in serialized form over the data lead 346 into the shift register of LSR 399, with the most significant bit of the most significant digit being sent and registered first. Remote station programmer RSP thereupon sends the "transmit" signal over lead 396 (TR) to LSR 399.

Line shift register 399 (LSR) responsively generates and transmits sync signals, encodes the twenty-five bits and sends the same, and sends the error checking code which the error checking circuit in the line shift register 399 has generated.

With the receipt of the sync signals the line shift register 267 at the master station 100 goes into the receive condition, and routes the twenty-five bits of the message into its shift register. At the same time the error checking circuit in line shift register LSR checks for errors, and if no errors are detected transmits the "good-word received" signal over lead GWR to the master station programmer MSR to reset the "no reply" timer.

MASTER STATION ANALYZES AND STORES

Now, except for any time period occasioned by line delay, certain operations occur concurrently at the master station and the addressed remote station.

At the master station

As a result of the "good-word received" GWR signal received by MSP, the master station programmer MSP gives the shift SH signal to LSR, and the line shift register LSR sends the twenty-five bits of the first data word message over the data lead 235 to the master station programmer. The remote bit signal enables the master station programmer MSP to proceed, and the station address is compared with the address which was sent. If the station address is found to be correct, the master station programmer MSP analyzes the function code to determine whether information is data or status, there being the possibility of a variation in this respect in signals transmitted from the remote station to the master station.

Since data is received, master station programmer MSP now signals over the "group 2" lead and the "data word 1" lead, and the last 12 bits are routed via the select gates of circuit 252 to the BCD to DEC converter 246 which decodes the three groups of four bits into a three digit decimal reading. Ten leads extend from 246 to each decimal display unit and one lead of each group is activated to display the appropriate decimal value. In the example given, the display for data point 09 (flow), as shown, is 137, with the most significant digits reading from left to right.

Master station programmer MSP thereupon starts its no reply timer.

At the remote station

Remote station sends data words to master station

As a result of the receipt by the remote station programmer 395 (FIGURE 3) from line shift register 399 of a signal over the "end-of-transmit" lead 298 (EOT), remote station programmer RSP sends the shift signal over conductor SH to line shift register LSR and activates the "group 1" lead, "data word 2" lead and "strobe" leads 1–12. Strobe pulses 1–12 serialize the BCD code, and transmit the serialized bits over data lead 346 for storage in line shift register LSR 399.

Thereupon, remote station programmer RSP removes the signal on the "group 1" lead and places a select signal (logic 1) on the "group 2" lead and activates strobes 13–24 (lead 358–381A).

With the "data word 2" lead and the "group 2" lead energized, twelve data bits from point 10, indicated but not shown, are fed into the line shift register by strobes 13–24. Thus word 02 is loaded into the line shift register.

Thereupon remote station programmer RSP gives the transmit signal to LSR–2 which empties its line shift register over the line into the main station line shift register 267. At the end of transmit, the remote station LSR sends the EOT signal to the remote station programmer RSP.

The master station receives and stores the transmitted word. As a result of the "good word received" signal, the master station programmer MSP gives the shift signal over shift lead SH to the line shift register 267 at the master station which shifts the bits of data out on the data lead 235 to the register and select gate circuit 252 which actuates the decimal indicators for point 10.

Data words 03–09 are successively sent from the remote station 01 to the master station 100 in a similar manner.

As the master station programmer MSP (which knows how many data words to expect from each remote station, i.e., in this case station 01), recognizes the last word of data, it seeks to determine if there are any status words yet to be reported. If this particular remote station, as evidenced by patching on a patching panel associated with the master station programmer MSP, is found to have status to report the master station programmer MSP waits.

When the remote station, such as 01, has sent the last word of data and there is status to report, the remote station programmer RSP knowing which data word is the last data word and receiving the end of transmit signal EOT from its line shift register 399, starts the report of the status program.

Remote station sends status words to master station

Upon the receipt of the end of transmit signal EOT remote station programmer RSP by means of the shift lead SH and data lead 346 causes the station address and status function code to enter the line shift register 399 and sends the alert signal over lead 347 to the point scanner 344 which reads out the status of points 01–06 as 12 bits which also enter the line shift register LSR via the data lead 346. Thereafter remote station programmer 395 (RSP) removes the shift signal SH and sends the transmit signal (TR) to line shift register LSR which sends the first status word to the master station 100.

Upon receipt of the sync signals the line shift register 267 at the master station 100 goes into the receive condition, and the error detection circuit checks the message bits and error code bits. If no errors are found, the line shift register LSR gives the "good-word received" signal GWR to the master station programmer which resets the "no-reply" timer.

Simultaneously, except for a small difference in time caused by line delay, two operational sequences occur at the master and remote stations.

*At master station*

The master station programmer 260 gives the shift signal to line shift register 267 which thereupon shifts twenty-five bits of the message over the data lead 235.

The remote bit received by the master station programmer MSP conditions the line shift register LSP to continue. The station address code received by the master station programmer MSP is compared with the station address expected, and if correct, the function code received by the master station programmer MSP is analyzed to detect whether the information received is data or status. (Status information is expected at this time.)

Since the function code, as analyzed, indicates that the word received contains status information, master station programmer MSP gives the shift signal to line shift register LSR, and signals the register and select gates circuit 231 over leads designated "Sta. 01" and "status word 01" whereby the bits 13–24 on data lead 235 enter circuit 231 which reacts to these bits to adjust the lamps for points 01–06 to indicate the condition of points 01–06 at the remote station 01.

Thereupon master station programmer MSP starts the no reply timer.

*At the remote station*

As a result of receipt of the "end of transmit" signal EOT, the remote station programmer RSP initiates the operational sequence for sending the next status word. More specifically, remote station programmer 395 sends a signal over the shift lead 397 to the line shift register 399, and a twenty-four bit signal over the ALERT lead 347 to the point scanner 344 which forwards bits indicative of the conditions of points 07–18 over the data lead 346 into the shift register in the line shift register circuit 399.

Thereupon, remote station programmer RSP removes the shift signal and extends the transmit signal TR to line shift register LSR 399 which generates and transmits the sync signal pattern, encodes the twenty-five bit message, and sends the same over conductors 101, 102 to master station 100 and generates the error detection bits and sends the same to master station 100. Thereupon line shift register 399 sends the end of transmit signal EOT to remote station programmer RSP.

The line shift register 267, upon receipt of the sync signal pattern goes into the receive condition. The error detection circuit checks the message and error code for a valid word (all zero remainder). As a result of a zero remainder, line shift register LSR sends the "good word received" signal GWR to master station programmer MSP which resets the "no reply" timer.

Thereupon master station programmer MSP gives the shift signal to line shift register 267 and signals the circuit 231 over leads designated "STA. 01" and "status word 02" whereby the bits 1–24 on the data lead 235 enter circuit 231 which is responsive to these bits to adjust the lamps for points 07–18 to indicate the condition of points 07–18 at the remote station.

This procedure repeats until the last status word has been sent and received, and the corresponding lamps adjusted.

Thereupon master station programmer MSP adds "1" to the station address and sends the request for data and status update to station 02.

*Selective address command*

If a selective address command button is depressed, as for example button 210 (FIGURE 2) contacts on button 210 mark "station 01" for the command point scanner 216 which in its scanning detects such marking. The circuit 16, as a result thereof, places a command request on conductor 219 to the master station programmer 260.

At an appropriate point in its non-quiescent scanning routine, which is always at the end of the processing of a word received, master station programmer stops the non-quiescent scanning and causes the interrupt signal to be sent over the line, and sends the shift signal and master bit 1 to the line shift register 267. Master station programmer then places the readout signal on the readout conductor 220 which causes the circuit 216 to place bits serially in the following order on data lead 217 which enter the shift register of LSR: station address code 000 0001, function code 1001, point address code 000 0001, command code 0001.

Thereupon master station programmer MSP gives the transmit signal to line shift register 267 which sends the command message out on the line, with error detection bits derived and added. Master station programmer also puts the station address of the commanded station into its station address counter.

The master station programmer MSP then sends the release signal via lead 218 to the command point scanner 216; and starts the command 1–2 second timing interval in master station programmer MSP which constitutes the "wait" interval.

At the remote station 01, the line shift register 399 upon receiving the correst sync signal, passes the 25 bit message into its shift register, its error checking circuit checking these bits and the six error checking bits. If the remainder is zero the line shift register 399 gives the "good word received" signal, the master bit signal, the station address bits, the function code bits, the point address bits, and the command code bits, (i.e. all 25 bits) to the command point decode and control circuit 313 which decodes the information, and operates relay 310 which closes its controls to turn on the pump at point 01. As the pump turns on, contacts 340 associated with this "pump ON" operation close to extend ground to the point scanner 344.

At the expiration of the "wait" interval which has been running to allow relay 310 to initiate the "pump ON" operation, the master station programmer resumes non-quiescent scanning, sending the request for data and status update to the station which has just been commanded, in this case, station 01. As a result of receipt of this request at station 01, the remote station programmer 395 causes the closed condition of contacts 340 to be reported during the 14th and 15th bits of the status word transmission. After all data and status are received from station 01, the master station programmer causes the master station to request data and status update from station 02 in the non-quiescent scanning procedure.

A summary of line shift register loading and unloading for data and status reporting is now set forth, the line shift register LSR–1 being used to designate the line shift register circuit 267 at the master station, and LSR–2 being used to designate the line shift register circuit 399 at the remote station.

(1) A master station shift pulse loads LSR–1 with master station data (i.e., a message as shown in FIGURE 27E).

(2) A master station transmit pulse unloads the data in LSR–1 at the master station which goes over the line and loads LSR–2. As LSR–1 unloads, the flip-flops of its line shift register proper each assume the reset condition.

(3) A remote station shift pulse loads LSR–2 with remote station data (i.e., a message as shown in FIGURE 27F). As LSR–2 loads, the previous data is automatically drives out but is without effect as it beats against closed gates.

(4) A remote station transmit pulse unloads the data in LSR–2 which goes over the line and loads LSR–1. As LSR–2 unloads the flip-flops in its line shift register proper each assume the reset condition.

(5) At master and remote station, action thereupon takes place essentially simultaneously as follows:
   (a) A master station shift pulse unloads LSR–1 into master station equipment.
   (b) A remote station shift pulse loads LSR–2 with the next word.

(6) Steps 4 and 5 repeat for data and status word reporting until the last word of status has been loaded into LSR–2.

(7) Step 4 then follows.

(8) Step 5a then follows.

A charted summary of this timewise from left to right is as follows relative to the shift and transmit signals:

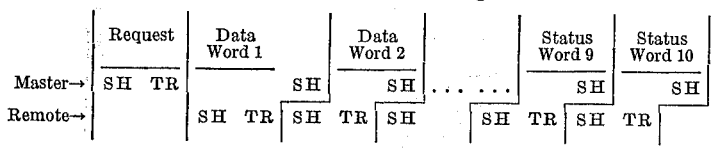

A similar summary for a command operation is as follows:

(1) A master station shift pulse loads LSR–1 with master station data, (i.e., a message as shown in FIGURE 27H).

(2) A master station transmit pulse unloads LSR–1 which goes over the line and loads LSR–2.

(3) Steps 1–8 as set forth in the previous outline then occur.

A charted summary is as follows:

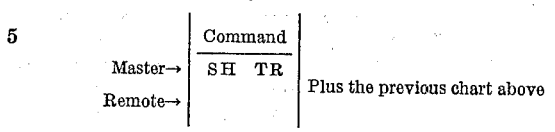

It should be appreciated that the shift signal initiates a fast operation at the 50 kc. rate; whereas the transmit initiates an operation at the 400 p.p.s. rate.

A résumé of function codes for the four types of words shown in FIGURES 27E–27H is as follows:

Request for Data and Status Update _____ 0101
Data Update _____ 0100
Status Update _____ 0110
Selective Address Command _____ 1001

A résumé of command codes is as follows:
ON _____ 0001
OFF _____ 0010

As will become clearer hereinafter, the master station programmer establishes five modes in which the system operates as follows:

M1=Data request mode involves loading LSR–1, and transmitting the request to LSR–2 up to the beginning of timing M2=First word mode extends from the beginning of the timing until the first word has been received, the remote bit and station address processed, and the function code analyzed. If the function code is 0100, indicating data update, the next mode will be mode 3. If the function code is 0110, indicating status update, the next mode will be mode 4

M3=Data update mode
M4=Status update mode
M5=Command mode

The following chart ties a number of these considerations together:

| Steps | Message | Master Station LSR | | | Remote Station LSR | | | Mode | Remarks |
|---|---|---|---|---|---|---|---|---|---|
| | | Load | Trans. | Rec. | Load | Trans. | Rec. | | |
| 1 | Request 01 | x | | | | | | 1 | Master loads. |
| 2 | | | x | | | | x | 2 | Master sends & times.* Remote analyzes. |
| 3 | Data Word 1 | | | | x | | | | Remote loads. |
| 4 | | | | x | | x | | 3 | Remote sends. Master analyzes,* stores, times. |
| 5 | Data Word 2 | | | | x | | | | Remote loads. |
| 6 | | | | x | | x | | | Remote sends. Master stores & times. |
| 7 | Data word 3 | | | | x | | | | Remote loads. |
| 8 | | | | x | | x | | | Remote sends. Master stores & times. |
| 9 | Data Word 4 | | | | x | | | | Remote loads. |
| 10 | | | | x | | x | | | Remote sends. Master stores & times. |
| 11 | Data Word 5 | | | | x | | | | Remote loads. |
| 12 | | | | x | | x | | | Remote sends. Master stores & times. |
| 13 | Data Word 6 | | | | x | | | | Remote loads. |

See footnote at end of table.

| Steps | Message | Master Station LSR | | | Remote Station LSR | | | Mode | Remarks |
|---|---|---|---|---|---|---|---|---|---|
| | | Load | Trans. | Rec. | Load | Trans. | Rec. | | |
| 14 | | | | x | | x | | | Remote sends. Master stores & times. |
| 15 | Data Word 7 | | | | x | | | | Remote loads. |
| 16 | | | | x | | x | | | Remote sends. Master stores & times. |
| 17 | Data Word 8 | | | | x | | | | Remote loads. |
| 18 | | | | x | | x | | | Remote sends. Master stores & times. |
| 19 | Data Word 9 | | | | x | | | | Remote loads. |
| 20 | | | | x | | x | | 2 | Remote sends. Master stores & times. |
| 21 | Status Word 1 | | | | x | | | | Remote loads. |
| 22 | | | | x | | x | | 4 | Remote sends. Master analyzes,* stores, times. |
| 23 | Status Word 2 | | | | x | | | | Remote loads. |
| 24 | | | | x | | x | | | Remote sends. Master stores & times. |
| 25 | Status Word 3 | | | | x | | | | Remote loads. |
| 26 | | | | x | | x | | | Remote sends. Master stores & times. |
| 27 | Status Word 4 | | | | x | | | | Remote loads. |
| 28 | | | | x | | x | | | Remote sends. Master stores & times. |
| 29 | Status Word 5 | | | | x | | | | Remote loads. |
| 30 | | | | x | | x | | | Remote sends. Master stores & times. |
| 31 | Status Word 6 | | | | x | | | | Remote loads. |
| 32 | | | | x | | x | | | Remote sends. Master stores & times. |
| 33 | Status Word 7 | | | | x | | | | Remote loads. |
| 34 | | | | x | | x | | | Remote sends. Master stores & times. |
| 35 | Status Word 8 | | | | x | | | | Remote loads. |
| 36 | | | | x | | x | | | Remote sends. Master stores & times. |
| 37 | Status Word 9 | | | | x | | | | Remote loads. |
| 38 | | | | x | | x | | | Remote sends. Master stores & times. |
| 39 | Status Word 10 | | | | x | | | | Remote loads. |
| 40 | | | | x | | x | | | Remote sends. Master stores & times. |
| 41 | Request 02 | x | | | | | | 1 | Master loads. |
| 42 | | | x | | | | x | 2 | Master sends & times.* Remote analyzes. |
| 43 | Data Word 1 | | | | x | | | | Remote loads. |
| 44 | | | | x | | x | | 3 | Remote sends. Master analyzes,* stores, times. |
| 45 | Data Word 2 | | | | x | | | | Remote loads. |
| 46 | | | | x | | x | | | Remote sends. Master stores. |
| 47 | Command | x | | | | | | 5 | Master loads. |
| 48 | | | x | | | | x | | Master sends & waits. Remote analyzes & performs. |
| 49 | Request 02 | x | | | | | | 1 | Master loads. |
| 50 | | | x | | | | x | 2 | Master sends & times.* Remote analyzes. |
| 51 | Data Word 1 | | | | x | | | | Remote loads. |
| 52 | | | | x | | x | | | Remote sends. Master analyzes,* stores & times. |
| Etc. | | | | | | | | | |

*Indicates change to new mode.

Message flow diagram

Before providing a more detailed description, flow charts shown in FIGURES 28 and 29 which illustrate general procedures for alternative situations will be described. As will be seen, FIGURE 28 is the flow chart for the master station and FIGURE 29 is the flow chart for each of the remote stations.

Logical sequences of the master and remote stations under three conditions which can exist in the system are shown in FIGURES 28 and 29. First, the normal, trouble-free, non-quiescent scanning operation of the master and remote station is given. Second, the operation of the master station receiving no message, or of receiving a message containing an error, is described. Finally, the logical sequence of a command is set forth. The emphasis in the logic sequence is on the logic and decision making aspects which structurally are primarily the function of the programmers.

The flow throughout the charts is determined mainly by a yes or no answer to a question represented by each block.

Normal logical flow

As mentioned previously, the system normally runs through a continual sequence with the master station requesting data and status update from each remote station in turn. The following description assumes a case of this type in which no commands are executed and no erroneous codes are received. The sequence starts at the master station when power is turned on, and master reset has been accomplished, or after a command has been executed (see "normal start point" in FIGURE 28). Thereafter, as long as no command or erroneous code is received, the master station cycle starts with the remote station lockout signal (i.e., the INTERRUPT signal) and "Scan to next station" (Block 1–FIGURE 28).

Master station

When power is applied to the master station and master reset effected, provision is made to set the functional units to a start condition. The last step of this operation is the initiation of the order of block 42, which is to transmit a remote station lockout signal and select the first remote station address. Hereafter, reference to a block on the logic flow diagrams will be made by enclosing the block number in parentheses, as (42).

The lockout signal (INTERRUPT) is a relatively long (9.38 ms.) pulse (see FIGURE 27A) which causes all remote stations to go into the standby condition. At this point, the selection of the first remote station address consists of placing the code for the address in the line shift register 267 in FIGURE 2. At the completion of this step, the master programmer 260 proceeds as shown in (2) and the function code for the data and status update request is placed in the line shift register of LRS–1. The completed message proceeded by the sync pattern is then transmitted.

The master programmer immediately looks at the command point scanners 216 . . . 216A to get an answer to the question of (3): "Has a command button been pressed?" The assumption is that no command has been initiated, i.e. a NO answer; hence, the programmer goes to (4).

At (4), the programmer starts a .5–1 second timer. During this interval, an error-free message should be received from the remote station. With the start of the time, the question of (5) is asked repeatedly at the master clock rate (50 kc.), which is much faster than the rate at which the message exchange takes place. Therefore, for some part of the .5–1 second interval a NO answer is received. The NO answer to (5) causes the programmer to ask, in (6) "Has the .5–1 second interval elapsed?" As long as the answer to (5) and (6) remains NO, the subroutine (5), (6), (5), (6), etc. continues. When the YES answer is received to (5), it means that the first message from the remote station is in the master station LSR–1. Therefore, the timer is reset (12) and the action of (13) starts.

The programmer analyzes the station address (13) which identifies the transmitting remote station. From this information the particular group of displays on the control panel is chosen.

The programmer next analyzes the function code (14) to determine whether data (pressure, flow, tank level, etc.) or status is contained in the message. From this operation the programmer routes the codes either to the data display units or to the status lamp units through the point indicator cards. It is assumed that the function code is for data, and the programmer therefore proceeds to perform the action of (15).

At (15), the data codes are sent to the register and selection gates circuit, such as 252, which processes the codes and updates the appropriate decimal display. As soon as the codes are transferred to the register circuit, such as 252, the programmer looks at the command point scanners to see if a command button has been pressed (16). Since it is assumed that no command is being initiated in this example, a NO answer tells the programmer to proceed to (17). The programmer knows how much data is to be received from each remote station and, by checking circuits within itself, can tell whether or not more data is due from the remote station. So that the complete flow diagram will be described, it is now assumed that more data is due and the YES answer to (17) causes the programmer to proceed to (18) and start the .5–1 second timer.

Note that no other immediate action is necessary by the programmer. The next data message is sent from the remote programmer without any initiating signal from the master station. The timing subrouting alternates between (19) and (20) until the message is received. When the message is received, the YES answer to (19) causes the timer to be reset (21) and the programmer goes back to (15), which is to record the data by means of a register and selection gate circuit. Once again the master programmer checks to see if a command button has been pressed, (16), and then proceeds to (17). This time it is assumed that no more data is due from the remote station. The NO answer to (17) causes the programmer to proceed to (40) and assuming the answer to the question of 40 is YES (i.e., status is due), the .5–1 second timer is started.

The master station now awaits the receipt of a message which contains the status of points at the remote station. The subrouting of (5) and (6) continues until the message is received. The timer is then reset, (12), and the master programmer causes the station address to be analyzed, (13). This address is the same as the one which preceded the first data message and selects the station 01 group of displays on the control panel. In (14), the function code is analyzed. This time the code indicates that status is to follow and the master programmer proceeds to (22). At (22) the status code for each point is routed to the appropriate point indicator circuits and causes the condition of each point indicator lamp to be updated.

When the status lamps have been updated, the programmer looks to see if a command button has been pressed (23). The assumption is still NO, so the programmer proceeds to (24). If more status is due, the programmer proceeds through the procedures of (25), (26), (27), (28), and (22), continuing the process of updating the status lamps. When the NO answer obtains in (24), this causes the programmer to proceed to block 1 as indicated in (30). The address of the next station is placed in LSR–1, the system data and status update request is added to the message, and the procedure begins again for the next remote station.

Remote station

A typical remote station shown in FIGURE 3 is but one of a plurality of remote stations connected to the line wires. Hence, a particularly remote station will be addressed only once during the scan of the remote stations even though the messages from the master station are received by each remote station. The following description of the normal logic flow in a remote station will therefore first explain the logic flow when a message is received, but the message is for another remote. The flow is next described for the case in which the message is for the remote which received the message.

Once the power has been turned on at the remote station, the remote programmer 395 conditions the station for operations to begin with the point labeled "normal start point." Thereupon the remote programmer asks the question, "Has a remote station lockout signal been received?" (15). We shall assume that the answer at this time is NO, thus causing the programmer to go to (1). Thereupon, the programmer continuously checks the answer to (1) at the 50 kc. rate. As long as no message is transmitted from the master station or from another remote station, the answer remains NO. Now assuming that the master station sends a request for data and status update to a remote station other than the remote stations under discussion, the message is received by the remote station under discussion, and is checked to see that it is error free. Since it is assumed to be error free, the answer to (1) becomes YES, and the programmer proceeds to (2); "Is this message from the master station?" The identification bit (master bit logic 1) indicates that the message is from the master station and the answer to (2) is YES. The programmer then causes the station address part of the message to be checked (3). Since in this case it was assumed that the message is for another remote, the NO answer at (3) tells the programmer to return to (1) and wait for another message.

The next message detected is the message from the other remote unit answering the master station. When this message is received, the answer to (1) is YES, and the programmer then determines whether the message is from the master station or a remote station. This time the identification bit (remote bit 0) indicates that the message is from another remote, the answer to (2) is NO, and the programmer returns to (1). This process continues as the master station scans around the loop. Each time the master station requests an update from some other remote the answer to (3) is NO and each time another remote sends data or status the answer to (2) is NO.

When the master station addresses the remote station of this discussion, the station address code is recognized as being for this station and, this time, the answer to (3) is YES. Therefore, the programmer proceeds to (4) which is to analyze the function code. Since this is the normal request for data and status update, the programmer proceeds to (5).

Under the instructions of (5), the station identification bit for a remote station, the station address of this remote, the function code and data are placed in remote station line shift register circuit 399 (i.e. LSR–2). This message is transmitted to the master station, including the sync pulse and the error checking bits (see FIGURE 27F). The programmer then checks the answer to (6), "Anymore data to be transmitted from this station?" Assuming that at least one other message is required to complete the data transmission, the answer to (6) is YES and the programmer goes to (7); "Generate and transmit subsequent data messages." As described previously, subsequent data messages do not require the station address and function code and thus can accommodate mode data bits. This data message is placed in LSR–2 and transmitted. The programmer returns to (6) and, since the data transmission is now complete, the programmer receives a NO answer.

The NO answer from (6) tells the programmer to perform the function of (8), "Generate and transmit a status message." The identification bit, the station address code, and a status bit for each status point in the remote station is placed in the LSR and transmitted to the master station. Thereupon the programmer at (9) asks itself the question, "Any more status conditions to be transmitted from this station?" Assuming that there are more, the answer is YES and the programmer goes to 10. Items (9) and (10) repeat until the last message reporting status has been sent. Thereupon, the answer to (9) is NO and the programmer proceeds to (1) and resumes the action of rejecting further received massages until the master station returns to this station.

No reply logic flow
Master station

The following paragraphs describe the effect of the partial or complete loss of a message, or of a message in which code bits have been changed in generation or transmission, resulting in a NO answer from (5) at the master station (FIGURE 28).

The message transmitted from the master station and from the remote stations contain an error checking code. Certain error checking operations referred to hereinbefore are performed by the error checking code equipment at the receiving station which permit very high reliability in detection of a code containing an error. Error consists of changes in the bit structure of the code in the station transmitting equipment or, more likely, to changes of code bits due to noise on the transmission line. A physical failure of the transmission line will prevent the message from being transmitted at all. In this latter case, it is necessary to time the interval during which the message should be received at the master station, and so prevent the master station from waiting indefinitely for an answer.

Beginning with the logical flow diagram at position (4), the programmer 260 starts the .5–1 second timer. This begins a .5–1 second interval during which a message should be received from the remote station queried. If no message is received in this time, the answer to (6), "Has .5–1 second elapsed?" changes to YES and the programmer proceeds to (8). If a message is received, but the code check operation reveals an error, then (5) remains NO and the answer to (6) is jumped to YES immediately.

When (6) becomes YES, the programmer proceeds to (8), "Is this the third try?" Assuming that this is the first .5–1 second interval since the master station queried the remote, the answer to (8) is NO. The NO answer tells the programmer to check a counter which keeps track of the number of times no reply, or a faulty reply, is received to a given request for data and status from a remote. Three tries are permitted and, since this is only the first, the answer to (8) is NO. On receiving a NO answer from (8), the master programmer causes the same station address to be selected again (11) and a remote station lockout signal (39) to be sent just ahead of the request for update. This lockout signal is necessary because it must be assumed that the remote station is partially through its sequence and must, therefore, be instructed to start over.

Except that a record is kept of the unsuccessful trial, the normal message exchange starts over and the timer is started as before. If an error free message is received, the record of the unsuccessful try is erased and the normal data and status update is completed. However, if either no reply or an erroneous code is again received, a YES answer to (6) occurs after .5–1 second. The programmer again checks the try counter (8) to see if this is the third try. This is only the second try, so (11) and (39) cause the master station to again request an update from the same remote. The try counter records the fact that this is the second try.

For the third time, it is assumed, no reply or an erroneous code is received and, for the third time, a YES answer is obtained from (6). This time, however, (8) indicates that this is the third try and a YES answer is obtained from (8). In response, the programmer causes the no reply lamp to light (9) and a remote station lockout signal is sent (10). The programmer then scans to the next station (1). See "NO-reply" lamps 272 . . . 273 FIGURE 2 for the ninety-nine "no reply" lamps for the stations 01–99.

Lighting of the no-reply lamp presents a visual indication to the operating personnel that the data and status shown on the control panel are not up to date. The next time around the loop, the master station requests an update, goes through three tries again, sends a remote station lockout signal and the scan proceeds to the next station. So long as no reply or a faulty reply is received from that remote, the no reply lamp remains lit. When a good message is finally received the master station programmer causes the reply lamp to be extinguished, and normal scan of that remote station resumes. The lamp is extinguished by a YES answer from (5).

Command logical flow

The command operation is a control operation initiated by depressing a command point pushbutton on the master station control panel. Whenever a pushbutton is operated, the master station command point scanner, such as 216, stops and produces an output on a command request lead, such as 219, which indicates that a command is to be carried out. In the master station logical flow diagram (FIGURE 28) blocks (3), (16) and (23) represent the points in the program at which the master programmer checks the command point scanner. If the answer is YES, the progression is to blocks 36, 37, and 38 respectively, each of which directs to block 31. This subsection describes the logical flow of the program when a command is initiated. The master and remote station sequences are described separately.

Master station

When a command button is pressed, the master programmer 260 receives a YES answer from (3), (16) or (23) (FIGURE 28), depending on where it is in the program sequence. The YES answer tells the programmer to proceed to (31). As a result, a remote station lockout signal (31) is sent to all remote stations. The lockout signal resets any remote station which may be in the process of sending data or status to the master and readies it to receive a message from the master station.

The programmer 260 proceeds to (32), "Generate and transmit selective address command message." The address of the remote station, the function code, the code for the command point in the remote station and the command code are obtained from the command point scanner and assembled in LSR–1. In addition, the master station identification bit is supplied by the master station programmer to LSR–1 to complete the 25 bit block of the message. The function code is a so-called selective address command code, which instructs the remote station to prepare to perform a command function, instead of sending back data and status update information. The message is transmitted and the programmer steps to (33).

At (33), the programmer is set to the address of the remote station to which the command was just addressed. The master station sequence then stops for 1–2 seconds, as instructed by (34) of the program sequence. This 1–2 second wait is sufficient to expect a data and update message from the remote to indicate that the command operation has begun. At the end of the wait, the programmer causes a remote station lockout signal (i.e., INTERRUPT signal) to be sent and proceeds to (2) and, using the address set in the programmer, sends a request for data and status update to the remote. The programmer resumes the normal sequence of operation, scanning each remote in the loop in turn, beginning with the next remote station after the one to which the command was sent.

Remote station

The effect of a command on the remote stations begins when the master station transmits the remote station lockout signal (31) (FIGURE 28). Only one of the remote stations can be in the process of performing the data and status update function. All other remotes are at (1) in the remote station program (FIGURE 29). On receiving the remote lockout signal, the active remote is reset, by the sequence of (15) and (16), so that it, too, stops at (1). All remotes are then ready to receive the command message which is to follow.

Assuming that the command is addressed to the typical remote station shown in FIGURE 3, the message is processed in the normal manner, and at (4) the function code is analyzed. The function code of this message is recognized as being a selective address command, instead of the usual data and status update request, and the programmer proceeds to (11), "Analyze command instructions."

As indicated in block 12, the addressed command point is actuated as a result of the analyzed command instructions including the operation determined by the particular function code.

Having performed the command on the selected point, the remote programmer 395 goes back to (1) in the program. It is noted that a 1–2 second wait was included in the program of the master station and during this time, the pipeline control equipment either completes its operation or is in the process. In either case, a data and status update message to the master station will indicate a response to the command. Accordingly, at the end of 1–2 seconds, the master station transmits a request for an update to the remote station which received the command. The remote station processes it in the normal manner, and returns to (1) to await the next message.

DETAILED DESCRIPTION

A more detailed description of the operation of the system is now set forth.

Power turned on at master station

When power is turned on at the power station by means not shown, the 50 kc. oscillator 1814 (FIGURE 18) is energized to emit a one microsecond wide pulse every 20 microseconds, which pulses feed amplifier 1815 and division circuit 1816. The output of amplifier 1815 is distributed to all the clock signal points indicated by the legend "C" in the various figures at the master station. Circuit 1816 divides the 50 kc. by the factor 3 to give a 16⅔ kc. signal to amplifier 1817. The output of amplifier 1817 is distributed to all points indicated by the legend "Y" in the master station shift register MSR. The Y signal pulses are each 1 microsecond wide and occur every 60 microseconds.

Also, when power is turned on, the free-running multivibrator 1812 (FIGURE 18) starts automatically and gives out a square wave signal having a one second period to amplifier 1812A. The output of amplifier 1812A is distributed to those points in the master station schematics indicated by the word FLASH.

Additionally, when power is turned on, the various flip-flops may not all be in the proper starting condition. Therefore, a manual reset is accomplished by pressing and releasing a reset button, not shown, but included in test panel 1813, FIGURE 18. As a result of pushing of the reset button, a 20 microsecond pulse of ground constituting the logic 1 signal is placed on master reset lead MR1 to all points in the drawings having the legend MR1 to operate the flip-flops in the correct initial condition. Upon releasing the button, a 20 microsecond pulse of ground constituting the logic 1 signal is placed on the master reset lead MR2 to all points in the drawings having the legend MR2. In FIGURE 18C, for example the signal on reset lead MR2 causes OR gates 18C2 to give out the logic 1 signal which sets flip-flop 18C3.

Referring to FIGURE 8, in the master station line shift register 800–900, ground is normally connected to TTO lead 890. Accordingly, when power is turned on, flip-flop 891 is set to give out the logic 1 signal on lead 208A which can be traced through FIGURE 9 to the "turn transmitter on" lead TTO. As noted above and shown in FIGURE 2, lead 208A is connected to tone transmitter 206 which accordingly is normally turned on to transmit the lower frequency signal via hybrid 205 to the remote stations.

*Request for data and status update*

It will be recalled that the master station sends an interrupt signal at the beginning of each transmission.

Referring now to master station programmer (MSP) (FIGURES 14–20) having designation 260 in FIGURE 2, and more specifically to FIGURES 18C, 18D, 18F, 19B, and 19C, the circuits there shown generate the interrupt signal which is provided by the master station.

It will be recalled that the MR2 pulse which occurs when power is turned on to the station, set flip-flop 18C3 which gives out a logic "1" signal from the 1 output thereof to gate amplifier 18C4 to pass clock signals to the input of the ring counter (FIGURE 18D).

*Ring counter, FIGURE 18D*

A chain comprised of thirty-two flip-flops 18D1–18D32 constitutes a ring counter having the home position being 18D1. As the MR1 reset signal from FIGURE 18 was transmitted via the rectifiers, as noted above, thirty-one flip-flops 18D2–18D32 were placed in the reset condition, and the first flip-flop 18D1 was placed in the set condition. The input for the ring counter is connected to the output of amplifier 18C4 and is stepped by amplified pulses received from 18C4. As the ring counter advances through a cycle it sequentially gives out program count pulses over leads PC1–PC32. The PC32 pulse path can be traced starting in FIGURE 18 with the PC32 lead, Program Control Cable (out) 1809 which enters FIGURE 17, the PC32 lead into the program control cable (IN) 1808, FIGURE 18, and out of cable 1808 as lead PC32 to the program control circuit 1802. The logic of the circuit is shown in FIGURE 18C. It should be observed that the PC32 pulse input (FIGURE 18C) is transmitted to AND gate 18C5.

As the system is not in the command mode, logic 1 will be found on the M5 input to this gate. Also, as no command button has been pressed, logic 1 will be found on the command register lead input to this gate. With all inputs at logic 1, gate 18C5 presents a logic 1 to OR gate 18C1 which presents a logic 1 to the reset R terminal of flip-flop 18C3 resetting flip-flop 18C3, which removes the gating signal from amplifier 18C3 to stop the ring counter of FIGURE 18D in its PC1 position. Initially, the MR2 signal initiates certain logic sequences which cause the counter to start stepping from the PC1 position.

The interrupt signal is generated when the ring counter, FIGURE 18D, steps to the second stage to energize conductor PC2, the signal being extended thereover to AND gate 19B5 (FIGURE 19B), over a circuit which extends from the lead 1 side of flip-flop 18D2 (FIG. 18D), over lead PC2, (FIG. 18D). With reference to FIG. 18, PC2 is indicated as issuing from the stage count 1803 (FIG. 18), into cable 1809, then through FIGURE 18 into FIGURE 16, out of cable 1809 as part of the cable labeled PC2, PC30, PC32 into FIGURE 19, out of this cable as lead PC2 into circuit 1901 (as show in more detail in FIG. 19B), and thence as input to AND gate 19B5. The input is "anded" with the M1 signal which originates from FIGURE 18F. It should be appreciated that the MR1 pulse caused OR gate 18F1 to set 18F7 and reset 18F8–18F11 whereby the logic 1 is obtained on lead M1. Other circuits which extend between FIGURES 14A and 20C through the cables shown in FIGURES 14–20 will be apparent from such showing. It should be appreciated that although the cabling patterns shown in FIGURES 14–20 enable the reader to trace the circuit paths, in implementing the circuitry, the particular wiring and cabling from a physical standpoint may not be grouped as shown, and may comprise single conductors, twisted pairs, cables, coaxial cables, etc.

The resultant logic 1 output from gate 19 5B sets flip-flop 19B10; and causes OR gate 19B11 to place a logic 1 signal on the start timing lead STT to gate 18C1 in the program control (FIG. 18C) which in turn resets gate 18C3 to stop the ring counter 18D at PC3 count.

The signal on the INT lead 263 (incoming to FIGURE 19C) triggers the one shot multivibrator 19C10. After an interval of 9.38 milliseconds, a pulse is fed out of multivibrator 19C10 to OR gate 19C11 to cause gate 19C11 to present logic 1 to AND gate 19C12. The logic 1 signal on the INT lead input to OR gate 19C13 causes this gate to present the logic 1 signal to the other input of gate 19C12, and this gate 19C12 places logic 1 on the stop timing lead. The resultant signal incoming to OR gate 19B7 causes this gate to present the logic 1 signal to reset flip-flop 19B10 removing the INT signal.

By reference to FIGURES 2 and 19, it can be seen that this signal on lead 263 goes from the master station programmer (MSP) to the shift register 800 (FIGURE 8) in line shift register circuit 399. With reference to FIGURE 8, the signal incoming thereto, passes over conductor 819 to OR gate 927, causing the gate to give out a logic 1 signal on the frequency shift lead (FS) 208. By reference to FIGURE 2, this signal causes tone transmitter 206 to shift to its higher frequency for 9.38 milliseconds to provide the interrupt signal which is transmitted to all remote stations.

The STOP timing signal (FIG. 19C) which resets the interrupt flip-flop as described, also goes to circuit 18C2 (FIG. 18C) to set flip-flop 18C3 and start the 32-stage ring counter circuit. As previously described, the ring counter starting from count PC3 will then move down to PC32 and back to PC1.

The action of these pulses in controlling the data request generator circuit (FIG. 19A) to generate the data for the line shift register is now set forth.

As the ring counter steps from a count of PC3 to PC4, the signal is sent to flip-flop 19A5, setting that flip-flop, and flip-flop 19A8 sends a logic 1 over the shift lead to line shift register to activate the data register of the line shift register. The 32-stage ring counter now steps to PC5 putting a logic 1 on PC5 to circuit 19A3. Circuit 19A3 sends a logic 1 to 19A4, which in conjunction with logic 1 on M1, sends a signal out of 19A4 circuit to be presented to the line shift register. The signal out of 19A4 and the signal from flip-flop 19A8 will then store the master bit in the line shift register.

The PC counter 18D in advancing from PC5 to PC6 will put a logic 1 on PC6 to enable circuit 19A1.

*Station address counter*

With reference to FIG. 18B, it will again be recalled that when power is turned on, the main reset button is pushed. The MR1 lead comes into FIGURE 18B. The logic 1 on MR1 as presented to FIGURE 18B will reset this counter to the station address count 01, thus giving a logic 1 signal out on the S1 lead and logic zeros out on S2 through S8 to circuits 19A1 through 19A2 (FIG. 19A). This is the BCD code for station address 01.

In that the counter has advanced and PC6 is now a logic 1 and S8 is a logic 0, circuit 19A1 does not activate, and a logic 0 is transmitted thereby to gate 19A3. The output of 19A3 presents a logic 0 to 19A4. This, in conjunction with the logic 1 on M1 presents a logic 0 out of 19A4 to the line shift register. This is the first bit and most significant bit of the station address being presented to the line shift register.

The ring counter continues sequentially strobing gates 19A1 through 19A2, the PC counts 6 through 13 presenting to 19A3 a series of logic 1 and 0's to be presented to 19A4. This same series of signals, in conjunction with logic 1 of M1, will control circuit 19A4 to provide a series of logic 1's and 0's corresponding to the station address code 01.

The 32-stage ring counter (FIG. 18D) now proceeds to PC15 and logic 1 is presented over PC15 to 19A3 which is activated to present a logic 1 to 19A4. The logic 1 presented to 19A4 in conjunction with the logic 1 on M1 presents a logic 1 out of circuit 19A4 to the line shift register. This bit corresponds to the $2^2$ bit of the function code for a data request message. When the PC counter continues to PC17, a logic 1 is presented to circuit 19A3, which present a logic 1 to circuit 19A4. This signal in conjunction with M1 presents $2^0$ bit of the function code to the LSR. The $2^2$ bit and $2^0$ bit correspond to a function code of 5.

The PC counter now continues down each step and at the count of PC29 presents a logic 1 on lead PC29 to circuit 19A6 which responsively presents a logic 1 to circuit 19A7. 19A7 then, in turn, presents a logic 1 to flip-flop circuit 19A8 to reset 19A8. The removal of the logic 1 from the shift lead of 19A8 flip-flop stops the line shift register from entering the data request message, with master bit, station address, and function code, is now in the line shift register ready to be transmitted out on to the line.

The 32-stage ring counter stepping from a PC count of 29 to 30 presents a logic 1 on PC30 to circuit 19A9. In conjunction with the logic 1 on M1, circuit 19A9 presents a transmit signal to the line shift register, which transmits the message over the line.

At this point the description sets forth in more detail the operation of the master station line shift register circuit LRS–1.

*Operation of the line shift register circuit in transmitting request for data and status update*

Initially, the LSR–1 circuit is at rest. Specifically flip-flops 951 (FIG. 9) (transmit) 1337 (receive) (FIG. 13) and 1009 (FIG. 10) are reset, flip-flop 1012 (FIG. 10) is set and counter 1003 is reset. The proper setting of the flip-flops is first accomplished by the MR1 signal, which was previously described, being applied through gate 1311 to the circuits mentioned. Subsequent operation insures that these conditions will be maintained, as will be apparent from later discussion.

As previously stated, flip-flop 19A8 was set. Accordingly, a logic 1 control signal from flip-flop 19A8 is presented at input 262 (FIG. 8) at the same time that data from gate 19A4 is presented at input 217. The control input is applied over conductor 814 through OR gate 1002 to turn on the gated clock amplifier 1001 which supplies clock pulses for the register 800. The control input is also transmitted over inverter 865 to remove the inhibit from gates 828 and 829. The data (and its complement on conductor 821) are applied to the first stage 834 of data register 800.

The operation of a shift register is well known. As long as the control signal is present on input 262, clock pulses will be applied to the data register and the data at input 217 will be shifted into the register. In this manner, 25 bits of information are shifted into the register 800.

By way of example, if the particular message to be transmitted is the message shown in FIGURE 27E, the master bit is placed in flip-flop 905, the station address is placed in the 8 flip-flops 903 to 904, the function code is placed in the 4 flip-flops 839 to 840, and zeros are placed in the last 12 flip-flops 834 through 838.

At this time, it should be noted that the pulse width detector and counter 1300 (FIG. 13) operates continuously. The pulse width detector and counter circuit includes a seven stage binary counter 1336 and a binary to decimal decoder 1325. The ouputs of this circuit measure the input pulses in a manner to be described later. The output 889 labeled 62Y occurs 3.75 ms. after counter 1336 is reset and is used during the transmit cycle to generate the sync pulse.

After the message to be transmitted has been transferred into the register 800, a transmit signal from gate 19A9 is applied at input 262 which sets flip-flop 847 in the sync pulse generator 802 to start the transmit sequence in which the request for data and status update is transmitted from the main station to the substation.

More specifically, the 0 output of flip-flop 874 enables gates 885 and 879 so that when a pulse appears on signal lead 889 and 876 from the binary to decimal decoder 1325, it will pass through gate 879 over conductor 880 to set flip-flop 943. This marks the start of the sync pulse which will occur between 60 $\mu$s. and 7.68 ms. after the transmit pulse 814. The pulse on signal lead 889 will also pass through NOR gate 885, be delayed one clock time through flip-flop 887, and pass over conductor 888 and gate 1324 to reset the seven stage binary counter 1336. After 3.75 ms. another pulse will appear on signal lead 889. This pulse will pass through gate 881 to set flip-flop 948 and reset flip-flop 943. It will also pass through gate 885, as before, to eventually reset the seven stage binary counter 1336. Again, after another 3.75 ms. a pulse will appear on signal lead 889 which will reset flip-flops 948 and 847 and also set flip-flop 951 all through gate 950.

The purpose of the previous sequence is now explained. Following the transmit signal on input 817, the flip-flop 943 was set for 3.75 ms. and then reset for 3.75 ms. The 1 output of this flip-flop is applied through gate 927 to the FS output 208, and eventually to the tone transmitter 206. This signal forms the first 7.50 ms. of the sync pulse signal as shown in FIGURE 27B. During the time that flip-flop 943 is set the 0 output is inverted and used to force reset flip-flop 906 in the register 800. While flip-flop 874 is set, the 1 output is applied through gate 871 to reset the flip-flops 850, 851, 852, 856, 935 and 936. The 0 data bit forced into flip-flop 906 will eventually form the final 2.50 ms. portion of the sync pulse.

At this point the operation of the shift pulse generator 1006 will be explained. The shift pulse generator is a feedback shift counter. This type of counter is known in the art and has been described in the various publications (Heath, F. G., Gribble, M. W.: Chain Codes and Their Electronic Applications, IEE Monograph No. 392 M, July 1960, pp. 50–67) (Bailey, J. S., Epstein, G.: Single Function Shifting Counters of Given Periods, J. Assn. Comp. Mach., 1962, 9, pp. 375–8). The two gates 1021 and 1022 provide feedback for the normal counting sequence. Gate 1015 modifies the feedback to provide a counting cycle of 42 counts. Gate 1016 insures that the counter will not lock up in the count 111111.

The shift pulse generator will complete one cycle in 42 clock times, or 2.5 ms., which is the time duration of one bit as shown in FIGURES 27C and 27D. Gate 1019 will provide an output once per cycle of the counter. Gate 1017 will have an output at the same time as gate 1019 unless the gate is inhibited by the output of flip-flop 1009. Gate 1020 will have an output 21 counts or 1.25 ms. after gate 1019. Gate 1018 will have an output 12 counts or 0.75 ms. after gate 1019 unless the gate is inhibited by the 0 output of the receive flip-flop 1337. The outputs of gates 1019 and 1020 are applied to flip-flop 1012, causing the flip-flop to generate a symmetrical square wave with a period of 2.5 ms. The use of these timing signals will be made clear in subsequent discussion.

It will be recalled that the transmit flip-flop 951 was set at the conclusion of the sync pulse generator 802 operating cycle, and that initially flip-flop 1009 was reset and flip-flop 1012 was set. Gates 1017 and 913 are then enabled and gate 914 is inhibited. Because flip-flop 951 is set, gates 921, 922, are enabled and gated clock amplifier 1029 will be enabled.

The output of the register 800 (the 0 output of flip-flop 906) is applied through gates 913 and 921 to present a logic 1 through gate 927 to the FS output 208. After this signal has been present for 1.25 ms., a pulse out of gate 1020 will cause flip-flop 1012 to reset, as previously shown. The 0 output on lead 919 will then inhibit gate 921 to effectively remove the logic 1 output on lead 208. The 1 output on lead 920 will enable gate 922, but the output of gate 915 is a logic 1, so there will be no logic 1 output from gate 922. The result is a logic 0 on the FS output 208.

After another 1.25 ms. a pulse out of gate 1017 in the shift pulse generator 1006 passes through the trigger circuit 1014 and gate 1002 to allow one clock pulse to pass through the gated clock amplifier 1001. This clock pulse, via lead 833, causes the register 800 to shift its information one step. Specifically the master bit which was previously stored in flip-flop 905 is now stored in flip-flop 906. It will be recalled that this bit is logic 1. At the same time that the shift pulse was generated, a pulse out of gate 1019 caused flip-flop 1012 to be set. The 1 output on lead 920 inhibits gate 922 and the 0 output on lead 919 enables gate 921. The output of flip-flop 906 on lead 908 is a logic 0, so the output of gate 913 will inhibit gate 921. The FS output will then be a logic 0. After another 1.25 ms. a pulse out of gate 1020 will reset flip-flop 1012, which in turn will inhibit gate 921 and enable gate 922. Since the output of gate 913 is a logic 1, the output of inverter 915 will be a logic 0, and the output of gate 922 will be a logic 1. This will cause the FS output 208 to be a logic 1.

After another 1.25 ms. a pulse out of gate 1017 will cause the reister 800 to shift its information one step, and the cycle described in the previous paragraph will be repeated. The cycle will continue to repeat until a control sinal, to be described, indicates that all information has been shifted out.

It may be seen that the FS output on conductor FS generated during the two cycles described in detail correspond to the last 2.5 ms. of the sync pulse and the master bit as shown in FIGURES 27B, 27D and 27E. In general, if the flip-flop 906 is set, the switching of flip-flop 1012 and the associated inhibits will cause the pattern shown in FIGURE 27D to appear at the FS output. If the flip-flop 906 is reset, the pattern shown in FIGURE 27C will be generated. The composite result, in the present example, will be the waveform shown in FIGURE 27E.

Each pulse at the output of gate 1019 is applied to the gated clock amplifier 1011, resulting in a clock pulse out of the amplifier coincident with the shift pulses to the register 800 from gated clock amplifier 1001. These clock pulses are used to shift the error check circuit 801 and the shift pulse counter 1000 in the manner now described.

Initially the binary counter 1003 in the shift pulse counter 1000 is reset. Each clock pulse from gated clock amplifier 1011 is applied via signal lead 849 to the step input, causing the counter to advance one count. When the count of 26 has been decoded in the binary to decimal decoder 1008 the flip-flop 1009 is set. The 1 output of the flip-flop will then inhibit gate 1017, preventing further shift pulses to the register 800. The flip-flop output also, via signal lead 909, inhibits gate 913 and via signal lead 910 enables gate 914.

When the count 32 has been decoded a logic 1 signal will be applied to signal lead 1046. This signal passes through inverter 1010 to NOR gate 869. Signal lead 870 to the gate is also at logic 0, resulting in a pulse out of gate 869 on end of transmit lead 266 (EOT).

The logic 1 signal on lead 1046 also passes through OR gate 1333 (FIGURE 13) to reset the transmit flip-flop 951, and through the delay flip-flop 1007 (FIG. 10) and gate 1004 to reset the binary counter 1003. Thus, count 32 marks the end of the transmission sequence during which the error checking circuit 801 calculated the error checking bits as will now be described.

The mathematical theory and general implementation of the error checking circuit 801 has been described in the publication of Peterson, W. W., entitled "Error Correcting Codes," 1961, MIT Press, particularly chapter 8, and more particularly section 8.5. The circuit basically comprises storage flip-flops connected by exclusive OR gates in a pattern determined by a generator polynomial. A gate circuit is included in the general circuit.

In the present form of the error checking circuit, the exclusive OR gates are constructed with two NOR gates and an inverter such as Exclusive OR gate 864. The common output of NOR gates 853 and 854 will be at logic 0 if the logic level on the input conductor 848 is the same as logic level output of the flip-flop 852. If the logic levels are different, one or the other of the NOR gates 853 and 854 will cause a logic 1 at the common output. The inverter 855 provides the complement of the common output to control the succeeding flip-flop 856. Signal lead 847 is the logic complement of the input signal lead 848.

The gate circuit, previously mentioned as a part of the general error checking circuit, is provided by inhibit inputs to the input Exclusive OR gates. Signal leads 909 and 870 provide inhibits for gate 940 which is used in the transmit sequence. Signal lead 825 provides the inhibit for gate 843 which is used in the receive sequence. Inverter 842 is common for both gates 841 and 843.

It will be recalled that in the transmit mode flip-flop 1009 is reset and flip-flop 951 is set. These conditions provide logic 0 signals on leads 909 and 870 respectively which remove the inhibits from Exclusive OR gate 940. It will also be recalled that shift pulses for the error checking circuit are generated by the output of gate 1019 in conjunction with gated clock amplifier 1011. It will also be recalled that flip-flops 850, 851, 852, 856, 935 and 936 are reset.

The operation of the error checking circuit 801–901 from the time that transmit flip-flop 951 is set is now described. The outputs of flip-flops 906 and 936 are compared in gate 940. In the present example, flip-flop 906 is reset, so the output of gate 940 is logic 0. The output of gate 940 is compared with flip-flop 852 in gate 864 and with flip-flop 856 in gate 929. In both cases, both inputs are logic 0, so the outputs are logic 0. When the first shift pulse occurs all signals are logic 0 so no change takes place in the circuit.

After the first shift pulse the output of flip-flop 906 is a logic 1. Since flip-flop 936 is still logic 0, the output of gate 940 is logic 1. When this signal is compared with flip-flops 852 and 856, the outputs of gates 864 and 929 respectively are logic 1. When the second shift pulse occurs, flip-flops 850, 856 and 935 are set. Flip-flops 851, 852 and 936 remain reset. This procedure continues for each of the 26 bits originally stored in the register 800. The following table shows, step by step, the operation of the error checking circuit for the message of FIGURE 27E.

| | Input (FLF 906) | Gate Outputs | | | Flip-Flop Outputs | | | | | |
|---|---|---|---|---|---|---|---|---|---|---|
| | | 940 | 864 | 929 | 850 | 851 | 852 | 856 | 935 | 936 |
| Before Shift | | | | | | | | | | |
| 1 | 0 | 0 | 0 | 0 | 0 | 0 | 0 | 0 | 0 | 0 |
| After Shift | | | | | | | | | | |
| 1 | 1 | 1 | 1 | 1 | 0 | 0 | 0 | 0 | 0 | 0 |
| 2 | 0 | 0 | 0 | 1 | 1 | 0 | 0 | 0 | 1 | 0 |
| 3 | 0 | 1 | 1 | 1 | 0 | 1 | 0 | 0 | 1 | 1 |
| 4 | 0 | 1 | 0 | 0 | 1 | 0 | 1 | 0 | 1 | 1 |
| 5 | 0 | 1 | 1 | 1 | 1 | 1 | 0 | 1 | 0 | 1 |
| 6 | 0 | 0 | 1 | 1 | 1 | 1 | 1 | 0 | 1 | 0 |
| 7 | 0 | 1 | 0 | 1 | 0 | 1 | 1 | 1 | 1 | 1 |
| 8 | 0 | 1 | 0 | 1 | 1 | 0 | 1 | 1 | 0 | 1 |
| 9 | 1 | 1 | 1 | 1 | 1 | 1 | 0 | 1 | 1 | 0 |
| 10 | 0 | 1 | 0 | 0 | 1 | 1 | 1 | 0 | 1 | 1 |
| 11 | 0 | 0 | 1 | 0 | 1 | 1 | 1 | 1 | 0 | 1 |
| 12 | 0 | 0 | 1 | 1 | 0 | 1 | 1 | 1 | 0 | 0 |
| 13 | 1 | 0 | 1 | 0 | 0 | 0 | 1 | 1 | 1 | 0 |
| 14 | 0 | 1 | 1 | 1 | 1 | 0 | 0 | 0 | 0 | 1 |
| 15 | 0 | 0 | 0 | 1 | 1 | 1 | 0 | 1 | 1 | 0 |
| 16 | 0 | 1 | 0 | 1 | 0 | 1 | 1 | 0 | 1 | 1 |
| 17 | 0 | 1 | 0 | 1 | 1 | 0 | 1 | 0 | 1 | 1 |
| 18 | 0 | 1 | 1 | 1 | 1 | 1 | 0 | 0 | 1 | 1 |
| 19 | 0 | 1 | 0 | 0 | 1 | 1 | 1 | 1 | 1 | 1 |
| 20 | 0 | 1 | 0 | 1 | 1 | 1 | 1 | 0 | 0 | 1 |
| 21 | 0 | 0 | 1 | 0 | 1 | 1 | 0 | 0 | 1 | 0 |
| 22 | 0 | 1 | 0 | 0 | 0 | 1 | 1 | 1 | 0 | 1 |
| 23 | 0 | 0 | 1 | 0 | 1 | 0 | 1 | 0 | 0 | 0 |
| 24 | 0 | 0 | 0 | 1 | 0 | 1 | 0 | 1 | 0 | 0 |
| 25 | 0 | 0 | 1 | 0 | 0 | 0 | 1 | 0 | 1 | 0 |
| 26 | | | | | 0 | 0 | 0 | 1 | 0 | 1 |
| 27 | | | | | | 0 | 0 | 0 | 1 | 0 |
| 28 | | | | | | | 0 | 0 | 0 | 1 |
| 29 | | | | | | | | 0 | 0 | 0 |
| 30 | | | | | | | | | 0 | 0 |
| 31 | | | | | | | | | | 0 |
| 32 | | | | | | | | | | |

It will be recalled that after 26 shift pulses, the setting of flip-flop 1009 causes gate 913 to be inhibited and gate 914 to be enabled. This same action inhibits gate 940. At this time, which corresponds to the line in the above table labeled "after shift 26," the error checking bits have been calculated and are stored in the error checking circuit flip-flops 935, 936, etc. The first error check bit in this example is a logic 1 and is stored in flip-flop 936. The second error check bit, a logic 0, is stored in flip-flop 935, and so forth.

The 0 output of flip-flop 936 is applied through gate 914 to the output circuit where it is encoded, as previously described, by the action of flip-flop 1012, and appears on the FS output signal lead 208. The output of gate 940 is a logic 0, so the output of gates 864 and 929 will be logic 0 and logic 1 respectively, corresponding to the states of flip-flops 852 and 856 respectively. The next shift pulse, which is shift pulse 27, will effectively shift the six error checking bits one step so that the second error checking bit will be stored in flip-flop 936. Again, the 0 output of flip-flop 936 is applied through gate 914 to the output circuit where the bit is encoded. This process continues until all six error checking bits have been encoded and presented on the FS output signal lead 208.

Recalling that the 32-stage ring counter circuit (FIG. 18D) was in a PC count of 30, as the counter advances to PC32, the logic 1 on lead PC32 is presented to circuit 18C1. The logic 1 out of 18C1 is then presented to reset side of flip-flop 18C3 resetting 18C3 and allowing the ring counter to circle around to PC1 and stop. That is, the signal on PC32 is presented to FIGURE 19B timing control and in conjunction with the logic 1 on the M1 lead activates circuit 19B2. Circuit 19B2 then presents a logic 1 to the set lead of flip-flop 19B9 setting 19B9, and also presents a signal to circuit 19B11 which sends a start timing signal over conductor STT to the program control, FIGURE 18C1. Circuit 18C1 presents a logic 1 to flip-flop 18C3 resetting that flip-flop and the 32-stage ring counter stops in a count of PC1.

The logic 1, on no-reply timing lead, is presented to circuit 19C3. Recalling the main reset, flip-flops 19C5 and 19C6 are in the reset condition. With 19C6 in the reset condition, a logic 1 is presented to circuit 19C3, and a delay of ½-second occurs before the signal out of 19C9 (which presents a logic 1) is received.

The manner in which the ½-second pulses are generated and provided out of 19C9 is now set forth. The flash signal which is generated from the master clock, as previously described is square wave with a period of one second. This signal is presented to circuits 19C7 and 19C8 which are trailing edge triggers and leading edge triggers respectively. Thus as the signal goes from a logic 0 to a logic 1, the trailing edge circuit 19C7 will put out a pulse on its output. When the flash signal goes from a logic 1 to a logic 0, circuit 19C8 puts out a pulse on its output. These two pulses are then "ORED" together in circuit 19C9 so that the output of 19C9 will then give a pulse every half-second or a frequency of two pulses per second.

Circuit 19C3 now has two of its input signals at a logic 1 waiting for a logic 1 to come from circuit 19C9. When this pulse arrives, circuit 19C3 will present a logic 1 to circuit 19C6 setting flip-flop 19C6. With flip-flop 19C6 set, a logic 1 is presented to circuit 19C4. Once more the circuit waits for circuit 19C9 to present a logic 1 to 19C4. This pulse will occur one-half second later than the pulse that activated circuit 19C3. When this occurs 19C4 will present a logic 1 to the reset lead of flip-flop 19C6, resetting that flip-flop. It will also present a signal to circuit 19C11. Circuit 19C11 presents a logic 1 to circuit 19C12.

Recalling that flip-flop 19C9 was previously set and presents a logic 1 on no-reply timing lead, this lead is presented to circuit 19C13, which in turn presents a logic 1 signal to circuit 19C12. This signal in conjunction with the logic 1 from circuit 19C11 presents a stop-timing signal out from the no-reply timing. Had this process been allowed to occur in the manner described, the system would have timed out, and subsequently have generated the data request message because the remote station did not reply in the half-second interval alloted it. However, the normal operation is to receive a good word received from the line shift register as a result of a remote sending of a message on the line to the line shift register.

The logic 1 on PC32 is presented to circuit 18E5. This signal in conjunction with the logic 1 on M1 presents a logic 1 on set M2 lead. This logic 1 is presented to flip-flop 18F8, and OR gates 18F2, 18F4 through 18F6. Thus, flip-flop 18F8 sets and 18F7 resets. Hence at the same time the PC counter stops at PC1, the mode register switches to mode 2. This presents a logic 1 on MZ.

At this point the sequence is being interrupted for the purpose of setting forth in more detail the operation of the master station line shift register circuit LRS–1 in receiving data and status words from the remote station.

*Operation of the line shift register circuit in receiving*

It will be recalled from the previous description of register LSR–1 that the pulse width detector 1300 (FIG. 13) operates continuously. Whenever a pulse of any characteristic is received, it is tested by the pulse width detector to determine if the pulse is a valid part of a message.

For purposes of example, the receive (REC) input 209 (FIG. 13) is initially assumed to be a logic 0. With this logic 0 input to the set terminal "S" of flip-flop 1302 and this input via inverter 1301 producing a logic "1" input to the reset terminal "R" of flip-flop 1302, then flip-flop 1302 will be reset. The 0 lead output of flip-flop 1302 which, in the reset condition of 1302 is logic "1," inhibits NOR gate 1303 which then gives out logic 0, and the "1" lead output of flip-flop 1302 gives out logic 0 which enables gate 1304 which gives out logic 1. With 0 input to the set terminal S of flip-flop 1305 and "1" input to the reset side R thereof, flip-flop 1305 will be reset also. The 0 output of flip-flop 1305 inhibits gate 1304. When the RC input changes to a logic 1, flip-flop 1302 is set. Lead 1312 will then be at logic 0, so the output of gate 1303 will be a logic 1. On the next clock pulse flip-flop 1305 will set, and the 1 output on lead 1316 will inhibit gate 1303. If the RC input (conductor 209) then returns to logic 0, flip-flop 1302 will be reset. Lead 1313 will then be at logic 0, so the output of gate 1304 will be a logic 1. On the next clock pulse, flip-flop 1305 will reset, and the 0 output lead 1317 will inhibit gate 1304.

The overall result of this sequence is to generate a logic 1 pulse on signal lead 1314 whenever the level on input conductor 209 changes from logic 0 to logic 1, and a logic 1 pulse on signal lead 1315 when the level on input conductor 209 changes from a logic 1 to a logic 0. Each logic 1 pulse on lead 1314 or 1315 will be applied through gate 1324 to reset the seven stage binary counter 1336. This creates a zero time reference to measure the characteristics of the input pulses.

At this point certain characteristics of the binary to decimal decoder 1325 must be explained. The output 62Y of the decoder 1325 and its use were previously described. The remaining outputs are used to measure the width of various inputs in a manner to be described. The inputs labeled strobe 1, strobe 2 and strobe 3 enable combinations of these outputs depending on the particular measurement to be performed. Strobe 1 enables outputs 50Y, 25Y, 34Y, 16Y and 110Y when flip-flop 1302 is set. These outputs measure logic 1 pulses. Strobe 2 enables outputs 58Y and 67Y when flip-flop 1302 is reset. These outputs measure pulses at logic 0. Strobe 3 enables outputs 50Y, 25Y, 34Y and 16Y when the receive flip-flop 1337 is set, that is, while the shift register LSR is receiving data.

It can be seen from FIGURE 27E that, aside from the interrupt signal and sync signal, there are two possible pulse widths of 1.25 ms. and 2.50 ms. These pulses will be accepted within ±20% of the nominal value. That is, between 1.0 ms. (16Y) and 1.5 ms. (25Y) for the 1.25 ms. pulse and between 2.0 ms. (34Y) and 3.0 ms. (50Y) for the 2.50 ms. pulse. According to FIGURE 27B, the sync signal contains a 3.75 ms. logic 0 pulse. This will be accepted between 3.5 ms. (58Y) and 4.0 ms. (67Y). The final pulse to be checked is the interrupt signal which is 9.38 ms. long (FIGURE 27A). This is a reset signal, so the exact pulse width is unimportant. If any pulse is longer than 6.6 ms. (110Y) it is interpreted as an interrupt signal.

It has been shown that each time the input signal on conductor 209 changes logic level, the seven stage binary counter 1336 is reset. Suppose that the message shown in FIGURE 27F is applied at the RC input 209. When the sync signal first returns from the logic 1 level to the logic 0 level a pulse on signal lead 1315 will pass through gate 1324 and reset counter 1336. After 3.5 ms. a pulse from decoder output 58Y will set sync flip-flip 1331. The 0 output of flip-flop 1331 will enable gate 1334 so that when input 209 returns to the logic 1 level, the pulse on signal lead 1314 will pass through gates 1306 and 1334 to set receive flip-flop 1337. If the input pulse had been wider than 3.5 ms., at 3.5 ms. a pulse from decoder output 67Y would reset flip-flop 1331 which in turn would inhibit gate 1334, preventing the eventual pulse on lead 1314 from setting flip-flop 1337. The pulse out of gate 1334 will also jam reset the shift pulse generator 1006, binary counter 1003 and, through gate 871, error checking circuit 801.

The method of decoding data received from the transmission facility is now described. It can be seen from FIGURE 27C that a 0 data bit contains a logic 1 to logic 0 transition, and from FIGURE 27D that a 1 data bit contains a logic 0 to logic 1 transition. It can also be seen from FIGURE 27F that a transition may or may not occur between data bits. The decoding method is to detect the sense of the transition at the center of the data bit, which also requires some means to disregard the transition which may occur between data bits. To accomplish this end, a gate is inhibited during the time an undesired transition might occur. When a desired transition is detected, a gate is inhibited until the expected end of the bit has safely passed. When 25% of the next data bit time has elapsed, the gate is uninhibited until the next desired transition is detected, at which time the gate is again inhibited.

The operation and timing of the shift pulse generator 1006 will be recalled from previous discussion. Recall also that the same pulse that set the receive flip-flop 1337 preset the shift pulse generator to the state 100001. This is 1 count beyond outputs from gates 1017 and 1019 which, it will be recalled, generate shift pulses for the register 800 and the error checking circuit 801. The 1 output of flip-flop 1337 is applied through gate 1030 to enable gated clock amplifier 1029 which supplies clock pulses for the shift pulse generator.

After flip-flop 1337 has been set, succeeding pulses should be data pulses. The 0 output of flip-flop 1337 provides strobe 3 to the binary to decimal decoder which enables outputs 50Y, 25Y, 34Y and 16Y as stated previously. When the input on conductor 209 moves to logic 1 level, the pulse on signal lead 1314 will pass through gates 1306 and 1328 to set flip-flop 1332. After another 0.5 ms. a pulse from decoder output 32Y will reset flip-flop 1332. Finally, after another 1.0 ms. a pulse from decoder output 50Y will set flip-flop 1332. When the input on conductor 209 returns to the logic 0 level, the pulse on signal lead 1315 will pass through gate 1307 to the input of gate 1335. If the input pulse is of the proper width within the previously given tolerances, flip-flop 1332 will be reset, and gate 1335 will be inhibited. However, if the width of the input pulse is not within the previously given tolerances, flip-flop 1332 will be set, gate 1335 will be enabled, and flip-flop 1338 will be set. The use of this error signal will be described later.

After 0.75 ms. an output from gate 1018 will set decoder flip-flop 1336. The 0 output of flip-flop 1336 enables gates 1308 and 1309. Some time later (which should be 0.50 ms. according to the timing shown in FIGURE 27), a logic 1 to logic 0 transition will occur on the FS input conductor 209, causing a pulse on signal lead 1315 which will pass through gates 1307 and 1309 to cause a logic 1 pulse on signal lead 1323. This signal should occur 0.50 ms. after the output from gate 1018 (according to FIGURE 27) but this time may change due to errors in the physical system. Two sources of this error may be distortion on the transmission facility and differences in the clock frequency at the transmitting and receiving equipment.

The logic 1 pulse on signal lead 1323 will reset flip-flop 1310, indicating a decoded bit value of logic 0. It will also pass through gate 1339 to reset flip-flop 1336, which will inhibit gates 1308 and 1309. It will also, through gate 1339, preset the shift pulse generator 1006 to the state 100010. After 1.25 ms., which corresponds in time to the end of the first data bit, outputs from gates 1017 and 1019 will shift the register 800 and the error checking circuit 802 in the manner previously described. The outputs 831 and 832 of flip-flop 1310 are connected to the input of the register 800 and to the Exclusive OR gate 863 input of the error checking circuit 801, so that the decoded data bit will be shifted into these circuits in the manner previously described.

Again, after 0.75 ms. an output from gate 1018 will set decoder flip-flop 1336, enabling gates 1308 and 1309, and the decoding cycle will be repeated. Each time a 0 bit is received, a pulse on signal lead 1315 will cause flip-flop 1310 to be reset, and each time a 1 bit is received, a pulse on signal lead 1314 will cause flip-flop 1310 to be set. On each shift pulse the logic state of flip-flop 1310 will be shifted into both the data register and the error checking circuit.

It will be recalled that the shift pulse counter 1000 counts each shift pulse, and that after twenty-six shift pulses, flip-flop 1009 is set. This inhibits gate 1017 to effectively stop shifting the register 800 while the error checking circuit 801 receives an additional six shift pulses.

The operation of the error checking circuit has been described in the transmit sequence. Its operation is identical in the receive sequence except that the input is not inhibited after twenty-six shift pulses in order that the received error check bits might be entered. After thirty-two shift pulses all bits have been received and operated upon by the error check circuit 801. If no error has been made in transmission or decoding, the six flip-flops 850, 851, 852, 856, 935 and 936 will be reset. If an error has been detected, one or more of these flip-flops will be set. The following table shows, step by step, the receiving and error checking of the message shown in FIGURE 27F.

| | Input (FLF 1310) | Gate Outputs | | | Flip-Flop Outputs | | | | | |
|---|---|---|---|---|---|---|---|---|---|---|
| | | 863 | 864 | 929 | 850 | 851 | 852 | 856 | 935 | 936 |
| Before Shift 1 | 0 | 0 | 0 | 0 | 0 | 0 | 0 | 0 | 0 | 0 |
| After Shift | | | | | | | | | | |
| 1 | 0 | 0 | 0 | 0 | 0 | 0 | 0 | 0 | 0 | 0 |
| 2 | 0 | 0 | 0 | 0 | 0 | 0 | 0 | 0 | 0 | 0 |
| 3 | 0 | 0 | 0 | 0 | 0 | 0 | 0 | 0 | 0 | 0 |
| 4 | 0 | 0 | 0 | 0 | 0 | 0 | 0 | 0 | 0 | 0 |
| 5 | 0 | 0 | 0 | 0 | 0 | 0 | 0 | 0 | 0 | 0 |
| 6 | 0 | 0 | 0 | 0 | 0 | 0 | 0 | 0 | 0 | 0 |
| 7 | 0 | 0 | 0 | 0 | 0 | 0 | 0 | 0 | 0 | 0 |
| 8 | 0 | 0 | 0 | 0 | 0 | 0 | 0 | 0 | 0 | 0 |
| 9 | 1 | 1 | 1 | 1 | 0 | 0 | 0 | 0 | 0 | 0 |
| 10 | 0 | 0 | 0 | 1 | 1 | 0 | 0 | 1 | 1 | 0 |
| 11 | 1 | 0 | 0 | 0 | 0 | 1 | 0 | 0 | 1 | 1 |
| 12 | 0 | 1 | 0 | 1 | 0 | 0 | 1 | 0 | 0 | 1 |
| 13 | 0 | 0 | 0 | 0 | 1 | 0 | 0 | 0 | 1 | 0 |
| 14 | 0 | 1 | 1 | 1 | 0 | 1 | 0 | 0 | 0 | 1 |
| 15 | 0 | 0 | 1 | 1 | 1 | 0 | 1 | 1 | 1 | 0 |
| 16 | 0 | 1 | 1 | 0 | 0 | 1 | 0 | 1 | 1 | 1 |
| 17 | 1 | 0 | 1 | 1 | 1 | 0 | 1 | 1 | 0 | 1 |
| 18 | 0 | 0 | 0 | 1 | 0 | 1 | 0 | 1 | 1 | 0 |
| 19 | 0 | 1 | 0 | 1 | 0 | 0 | 1 | 0 | 1 | 1 |
| 20 | 1 | 0 | 0 | 0 | 1 | 0 | 0 | 0 | 1 | 1 |
| 21 | 1 | 0 | 0 | 0 | 0 | 1 | 0 | 0 | 0 | 1 |
| 22 | 0 | 0 | 1 | 0 | 0 | 0 | 1 | 0 | 0 | 0 |
| 23 | 1 | 1 | 1 | 0 | 0 | 0 | 0 | 1 | 0 | 0 |
| 24 | 1 | 1 | 1 | 0 | 1 | 0 | 0 | 1 | 0 | 0 |
| 25 | 1 | 1 | 1 | 0 | 1 | 1 | 0 | 1 | 0 | 0 |
| 26 | 0 | 0 | 1 | 1 | 1 | 1 | 1 | 1 | 0 | 0 |
| 27 | 0 | 0 | 1 | 1 | 0 | 1 | 1 | 1 | 1 | 0 |
| 28 | 1 | 0 | 1 | 1 | 0 | 0 | 1 | 1 | 1 | 1 |
| 29 | 1 | 0 | 0 | 1 | 0 | 0 | 0 | 1 | 1 | 1 |
| 30 | 1 | 0 | 0 | 0 | 0 | 0 | 0 | 0 | 1 | 1 |
| 31 | 1 | 0 | 0 | 0 | 0 | 0 | 0 | 0 | 0 | 1 |
| After Shift 32 | | | | | 0 | 0 | 0 | 0 | 0 | 0 |

The outputs of flip-flops 850, 851, 852, 856, 906, 935, 936 and 1338 are applied to gate 866. Count 32 from the binary to decimal decoder 1008 is inverted through gate 1010 and applied over conductor 844 as an enabling pulse to gates 866 and 867. If all eight of the above listed flip-flops in error checking circuit 801 are reset when the enabling pulse is presented, an output pulse will appear on signal lead 264, GWR. If any one of the eight above listed flip-flops are set when the enabling pulse is presented, an output will appear on signal lead 265, BWR. An output on either 264 or 265 indicates the complete reception of a message.

It will be recalled that a logic 1 control signal on input lead 262 will cause the data register 800 to shift at the clock rate. This same logic 1 signal through inverter 865 enables gate 822. The output of flip-flop 905 is applied through gate 822 to the data output 235. In this manner, the data stored in the register 800 is transferred serially on output 235 to the programmer.

When a logic 1 is presented on the good word received lead from the line shift register 800 to the master station programmer, this signal activates circuit 19B7 presenting a reset lead to flip-flop 19B9 resetting 19B9 and stopping the no-reply timing. The good word received signal coming from the line shift register 800 is also presented to circuit 18C2 (FIGURE 18C) setting flip-flop 18C3. This once more starts the 32-stage ring counter.

When the 32-stage ring counter advances to PC4, the logic 1 signal presented on this lead is transmitted to flip-flop 19A8 (FIGURE 19A) to set flip-flop 19A8 and present a logic 1 on the shift lead to the line shift register 800. This lead will start the information out of the line shift register 800 that was put there by the remote station. PC4 also goes to circuit 20A1 (FIG. 20A). This signal in conjunction with the logic 1 on M2 presents a logic 1 to flip-flop 20A4 setting the flip-flop. The logic 1 signal coming from flip-flop 20A4 is then sent to circuit 20A5. The other logic signal coming into 20A5 is the data lead coming from the line shift register 800. The information appearing on the data lead is the information that is coming out of the line shift register caused by the shift signal from flip-flop 19A8 (FIG. 19A).

As the remote bit and station address come from the line shift register 800, the 32-stage ring counter (FIGURE 18D) will continue from PC5 to PC13. The leads S1 through S8 (FIG. 20A) are connected to the station address counter, and present to circuits 20A6 and 20A7 the station address pattern for station 01. The logic 1 on S1 and the logic zeros on S2 through S8 are the exact pattern required to generate 01. This bit pattern is the information used in the data request generator circuit (FIG. 19A). These signal leads are now compared with the incoming data from the line shift register 800, and when the signals are different, flip-flop 20A12 is set.

The first information bit from the line shift register is the remote bit which presents logic 0 on the data lead to circuit 20A5. This circuit then is not activated, and presents a logic 0 on leads to circuits 20A9 and 20A8.

Since PC5 is not presented to circuits 20A6 through 20A7 a logic 0 is presented to circuits 20A10 and 20A15. Since the logic 0 from 20A5 and 20A6 are presented to 20A8 and 20A15 respectively, neither of these circuits are activated and hence there is no set lead activated on flip-flop 20A12, (i.e., there is no "miscompare"—a term to be more fully disclosed later herein).

The next signal coming from the line shift register 800 over the data lead is the most significant bit of the hundred digit which is a logic 0. This does not activate 20A5 so that the output of 20A5 is a logic 0. When the PC count is 6, the logic signal over S8 is a 0, hence this gate is not activated. Therefore, the inputs again to 20A8 and 20A15 are both 0, and these circuits are not activated. This logic 0 is fed to flip-flop 20A12 which does not set the flip-flop. Hence there still is no miscompare.

The succeeding circuits in the 20A6 series are not activated by virtue of the logic 0 being presented to them from the S2 through S8 leads. However, when the PC counter reaches a count of 13 we find that a logic 1 is being presented on S1 lead to activate circuit 20A7. At this same time, the line shift register should be presenting to circuit 20A5 a logic 1 to activate circuit 20A5. Since both circuits 20A5 and 20A7 are activated, a logic 1 is presented to circuits 20A9 and 20A10.

The outputs of circuits 20A9 and 20A10 will now be a logic 0, presenting a logic 0 to both 20A8 and 20A15. Again these circuits are not activated and the output will be a logic 0. This logic 0 is presented to flip-flop 20A14 which does not set that flip-flop.

This process then has taken the remote bit and station address and compared them to see whether or not they were correct. In this particular description, the assumption was made that everything was correct and circuits 20A8 or 20A15 were never activated. If there was a discrepancy, a difference in the signal input from the line shift register 800 and the input from S1 through S8 would have appeared as a logic 1 output from either 20A8 or 20A15. In this case, circuits 20A8 or 20A15 would have been activated and presented a logic 1 to flip-flop 20A12 setting this flip-flop and reporting a miscompare.

Assuming no error has occurred, flip-flop 20A12 is not set and the sequencing of the circuit continues. It should be noted that when the PC counter was in a count of 12, a logic 1 was presented to circuit 20A2. This signal in conjunction with the logic 1 on M2 presents a logic 1 to circuit 20A3. This in turn resets flip-flop 20A4. A logic 0 is then presented to circuits 20A5 to 20A7 to stop the compare operation.

Remembering that flip-flop 19A8 is presenting a logic 1 on the shift lead to the shift register 800, the information is still coming from the line shift register 800.

At this time, however, it is assumed that the function code that the remote station had sent is being received. Since the remote station can only send a function code of 4 or 6 it is only necessary to look at the one bit which distinguishes between a 4 and 6. This bit occurs at PC16.

Assuming that the remote station has sent back the data information, the data lead from the shift register 800 will be keyed by presenting a logic 0 to circuit 18E3. The output of 18E3 will then be a logic 1. The PC counter at this time has gone to PC16, logic 1 is presented on PC16. It will also be remembered that the system is in mode 2 and therefore logic 1 is on the M2 lead.

The data leads, PC16 and M2, are all presented to circuit 18E6 along with word 1 to generate a signal set M3.

*Word counter*

At this time digression is in order for the purpose of determining why the word "1" should be in the word counter.

Referring to FIGURE 15A it will be noted that MR1 is presented to circuit 15A3 in the word counter control circuit 1503 (FIG. 15A), and circuit 15A3 then presents a logic 1 on the set lead going to circuit 15A7, which in turn resets the 10-stage ring counter 1502 (FIG. 15B) over the reset lead which sets flip-flop 15B1 and resets flip-flop 15B2 through 15B4. Hence we have a logic 1 being presented from 15B1 over the signal lead "word 01" (circuit 18E6—FIG. 18E). All other signals on circuit 18E6 have now been satisfied and a logic 1 obtains on the ouput lead set M3. The set M3 lead goes to circuit 18F9, 18F2, 18F3, 18F5 and 18F6 (FIG. 18F) to accomplish the reset of flip-flop 18F8 which removes the logic 1 from M2, and to accomplish the set of flip-flop 18F9 putting a logic 1 on signal lead M3. The system is now in mode 3.

The set M3 signal from FIGURE 18E goes to FIGURE 15D and presents a logic 1 to set flip-flop 15D4. The output of 15D4 is presented to circuit 15D5 putting a logic 1 on that lead. Since word 1 has previously been shown to have a logic 1, circuit 15D5 is now activated, and presents an output logic 1 on the data word 01 lead.

The data word 01 lead, the group 2 lead, the station address 01 lead and the data lead from the shift register 800 drive the station register and select gates (FIG. 6) to load the information into the register for display as will be shown.

*Group counter*

Referring to FIGURE 15F it will be noted that signals PC17 and PC29 are presented to circuit 15F1 in group counter circuit 1505. Each time the 32-stage ring counter (FIG. 18D) goes through these counts, a logic 1 is presented on PC17 and then a logic 1 later is presented PC29. The output of 15F1 then gates 15F2 through the clock amplifier, and a clock pulse is presented to flip-flop 15F3 at PC17 time and PC27 time.

It should also be noted that MR1 resets flip-flop 15F3 to the reset condition. At this time a logic 1 is presented on group 01 lead. When, as a result of PC17, the first clock pulse is presented to the flip-flop 15F3, the flip-flop will go to the set condition and a logic 1 will then be presented on the group 02 lead. As the PC counter progresses to PC29, a clock pulse is again presented to flip-flop 15F3 and this time the flip-flop switches state and presents a logic 1 on group 02. Each time the PC counter goes through these counts, this action is recorded. Group 1 marks the first half of the word; group 2 marks the second half of the word.

BCD to decimal decoding

In the BCD to decimal decoding circuit 1404 (FIG. 14F), leads S1 through S8 from the station address counter are presented to the decoding circuits.

Since the station address in the present example is 01, there will be a logic 1 on S1 and a logic 0 on S2 through S8. S1 presents a logic 1 to circuit 14F9. S2 presents logic 0 to circuit 14F2, where it is inverted, and 14F2 presents a logic 1 on S2 bar to circuit 14F9. The S3 signal is presented to circuit 14F3, where it is inverted, and a logic 1 is presented on the S3 bar lead to circuit 14F9. The successive circuits S4 through S8 each present logic 1 to circuit 14F9, and accordingly circuit 14F9 presents a logic 1 on lead SA01.

At this time, as shown above, SA01 lead is activated, data word 01 lead is activated, group 2 lead is activated and data information is being presented to the register select gates, (such as shown in FIGURE 6). These four signals now combine to store the information in the BCD register as will be shown.

The 32-stage ring counter (FIG. 18D) continues down through its PC counts until reaching PC29 at which point PC29 presents a logic 1 on its lead to circuit 19A7 (FIG. 19A) which presents a logic 1 to the reset side of flip-flop 19A8 resetting flip-flop 19A8. The shift signal presented to the shift register 800 now returns to logic 0, and no more information will be provided by register 800.

PC29 also presents logic 1 to circuit 15F1 in the group counter circuit 1505 (FIG. 15F) to jump the group counter back to a group count of 1. PC29 is additionally presented to circuit 15D2 in the store data circuit 1501 (FIG. 15D), and since the system is in mode 3 (FIG. 18F) logic 1 is on the M3 lead to 15D2 (FIG. 15D). These two signals activate circuit 15D2 and present a logic 1 to circuit 15D3 and reset 15D4 flip-flop. The logic 1 from the one side of flip-flop 15D4 is then removed and a logic 0 is presented to 15D5 which removes the logic 1 on the data word 01 lead going to the register select gates. The 32-stage ring counter (FIG. 18D) then proceeds to count 32, and presents a logic 1 over PC32 to circuit 15A7 (FIG. 15A).

Since the system is in mode 3, there is logic 1 on the M3 lead activating circuit 15A6 which presents the signal to circuit 15A7, and in conjunction with PC32 activates 15A7 and gating circuit 15A5. A clock pulse is then allowed through circuit 15A5 and over advance word lead to circuit 15B1 (FIG. 15B) to advance the word counter from word 1 to word 2 in the fashion of a ring counter. Flip-flop 15B1 resets and flip-flop 15B2 will set.

PC32 also presents logic 1 to circuit 19B3 in timing control circuit 1901 (FIG. 19B). Since the system is in mode 3, circuit 19B3 is activated, and a logic 1 is presented to set flip-flop 19B9. Circuit 19B3 also presents the output logic 1 to circuit 19B11 activating that circuit to present a logic 1 on the start timing lead STT.

Since there is a logic 1 on the no-reply timing lead, which is output from circuit 19B9, the timing circuit functions once more as described previously.

The logic 1 which is presented on the start timing lead is presented to circuit 18C1 which then presents a logic 1 to the reset side of flip-flop 18C3 to reset the flip-flop. The 32-stage ring counter (FIG. 18D) now is stopped in a count of PC1. Since the master station programmer expects more data words, the mode register remains in a mode of 3.

The remote station, now knowing that it has more data words to send, will be sending the second data word to the master station. When the shift register 800 receives that information, and the information is correct, a "good-word received" signal is provided by the line shift register.

Register and select gates

A set of register and select gates are shown in FIGURE 7, and as there shown data word 01, group 02 and station address 01 are all presented to gate 704. As a result gate 704 is activated, and a ground is presented to circuit 706, which is activated for the time duration needed to store this set of information in the twelve stage shift register circuit 707.

At the exact same time that gates 704 and 706 are activated, the logic information on the data lead is being presented to the input of the 12-stage shift register circuit 707.

The operation of the 12-stage shift register 707 is conventional, the register accepting the serial information received over data lead 235 for storage. Once the information is in the register 707 the twelve flip-flops feed three BCD decoders 708–710 in parallel, the BCD decoders 708–710 taking each digit and changing it to a one out of ten configuration to drive a set of lamps 236 in a digital display. In a like manner, gate 711 will be activated by data word 02, group 01 and station address 01. Gate 711 then sends a logic 1 to circuit 713 supplying clock pulses to another 12-stage shift register circuit 714. Again the data information on the data lead 235 is presented serially to register 714 at the same time the clock pulses hit the 12-stage shift register 714.

In sequence the information from the remote station including data word 1 and group 1 and 2 to data word 2, group 1 and 2, is sequentially stored in the successive registers and converted to display information.

The "good word received" signal is presented to circuit 19B7 in the timing control circuit 1901 and circuit 19B7 then presents a reset signal to flip-flop 19B9 resetting the no-reply timing flip-flop 19B9.

The good-word received signal is also presented to circuit 18C2 in the program control circuit 1802 (FIG. 18C) which presents a logic 1 to set flip-flop 18C3 and cause the 32-stage ring counter (FIG. 18D) to proceed in another count.

When the PC counter reaches a count of 4, the logic 1 is presented to circuit 15D1 in store data circuit 1501 (FIG. 15D). Since the system is in mode 3, a logic 1 obtains on the M3 lead, and circuit 15D1 is now activated to present logic 1 to set flip-flop 15D4. The output of flip-flop 15D4 presents logic 1 to the gate "data word 02." Since the word counter previously stepped from word 01 to word 02, the word 02 lead has a logic 1 presented. The data word 02 gate is then activated, and is presented to the register select gates (FIGURE 7).

PC4 is also presented to circuit 19A8 in the data request generator 1900 (FIG. 19A) and flip-flop 19A8 is then set, and the shift signal is presented to the shift register 800 to control the register to present the second data word to the register select gates (FIG. 7).

At this time, the data word 02 signal, group 01 signal, a shift signal for bringing data out of the line shift register, and the SA01 signal from the decoding circuit 1404 combine to store the second word of data in the storage registers such as 722.

With this information being presented to the register and select gates, the first half of the second word is stored.

As the ring counter 1803 advances to count PC17, the group count is jumped from group 1 to group 2, and the second half of the second word is stored. As the counter advances to count PC32, a no-reply timing to time the reply from the remote station is initiated, and PC32 steps the word counter to word 3 in the manner previously described.

The remote station sends back the third word of data to the shift register 800 and, if this word is a good word received, the system will proceed to store word 3 in the same manner word 02 was stored and so on until all data words are received from the remote station.

Since the system is still in mode 3, and has just stored the last word of data, the PC counter goes down to a count of thirty-two, and the logic 1 on PC32 is presented to circuit 18E2 in the mode control circuit 1804 (FIG. 18E). Since the system is mode 3, logic 1 is presented on the M3 lead to circuit 18E2. The third lead to consider is the STR lead from circuit 14E1 (FIG. 14E).

*Status to report*

Referring to FIGURE 14E, a patching arrangement is shown into circuit 14E1. If in a particular system, station 01 address 01 is determined to have status, then the SA01 lead, which has been activated by circuit 14F9 (FIG. 14F) will have a 1 on it and will be patched via patching panel to circuit 14E1 in the "status to report" circuit 1405. In this case, circuit 14E1 presents a logic 1 on signal lead STR (status to report) which is sent to circuit 18E2 in mode control circuit 1804 (FIG. 18E). If this is the last word, logic 1 is on the last word signal lead LWD, and circuit 18E2 is activated.

*Last word*

The last word signal on lead LWD is obtained from last word circuit 1504 (FIG. 15E). If it is determined that station 01 has nine words of data to report, then via a patching panel the word count of 9 will be patched to circuit 15E3 in the last word data circuit 1504. This logic 1, along with station address 01, being a logic 1, and also being in mode 3, activates circuit 15E3 and a logic 1 is placed on the last word of data lead LWD.

This signal is presented to circuit 18E2 in mode control circuit 1804 and all signals available to activate circuit 18E2 are now present whereby a logic 1 obtains on set M2 lead. The logic 1 on set M2 lead presents a signal to the set side of 18F8 and to the circuit 18F4 which presents a reset signal to flip-flop 18F9. Therefore, when this signal occurs, flip-flop 18F8 sets to put a logic 1 on M2, and flip-flop 18F9 resets to put a logic 0 on M3.

With a logic 1 on the last word lead LWD, circuit 15A1 in the word counter circuit 1503 is activated. At the end of storing this word PC32 will activate circuit 15A2 sending a reset pulse to the word counter via circuit 15A3.

It is noted here that the system is going back to mode 2 in an attempt to receive the next word which will be the first status word from the remote station. In mode 2 the system compares the remote bit and station address code, and analyzes the function code to determine what type of information is being reported.

When a "good word received" signal obtains from the line shift register, the same operation occurs as did before in mode 2 when the first data word was received.

This time, however, as long as the comparison is good, the system proceeds to analyze the function code, but in this case activates a different circuit, and instead of jumping to mode 3 the system jumps to mode 4.

It should be recalled that while the PC counter (FIG. 18D) is counting down, and arrived at a count of PC16, the PC16 signal was operative to strobe out a particular bit within the function code to determine whether that function code was of data or status. Now, however, the information is a logic 1, since our function code is a 6, and a logic 1 will be presented on the data lead to circuit 18E7 in the mode control circuit 1804 (FIG. 18E). The system is now in word 1, in mode 2 and is receiving PC16. A1 inputs to 18E7 are therefore satisfied, and the output will be a logic 1 to set M4, which is applied to circuit 18F10 and circuit 18F3 in mode register circuit 1805. Flip-flop 18F10 will set, and flip-flop 18F8 will reset via circuit 18F3.

The set M4 signal also goes to the store status circuit 1500 (FIG. 15C) and specifically to the set side of flip-flop 15C4.

Since the system is in word 1, and 15C4 is set, circuit 15C5 will be activated and a logic 1 obtains on "status word 1" conductor 233.

The station address counter is still in the count of 01, and circuit 14F9 is still satisfied so that a logic 1 signal appears on SA01.

The status word 1 signal, the station address 01 signal and the data information coming out of the shift register 800, as a result of the shift signal, will all be presented to the register and select gates for the status points (FIG. 6).

*Register and select gate for status*

Referring now to FIGURE 6, register and select gates for status points, circuit 605 has station address lead 01 and status word 1 lead presented on the input lead. When these two signals are present, the circuit 605 will be activated and a logic 1 will be presented to circuit 607 which in turn presents clock pulses to the 12-stage shift register 608 for status word 1.

At the same time, the status information from the shift register 800 is being presented on the data lead to the input of the 12-stage shift register which operates in the manner of the data register set forth above.

The 12-stage shift register for the status word in addition to being a shift register also comprises logic for each stage of the register connected to operate an audible alarm and light the point indicator lamps.

*Point indicator card*

The manner in which the point indicator circuit operates is now set forth in detail.

Referring to FIGURE 6A, it can be seen that the data lead is fed to circuit 6A5, which comprises the first flip-flop of the 12-stage shift register for status word 1. It is also presented through an inverter to the reset side of the same flip-flop 6A5. As the data is being presented to the first stage, it is being clocked by the data clock amplifier, and shifted down through all stages to flip-flop 6A16. Once the information is in its right place, the clock pulses stop, the status information ceases and the word is in the register.

Assuming an initial condition of all status point cards of 0, circuits 6A5 through 6A16 and circuits 6A4 through 6A15 are all in the 0 state.

If the new status word coming in presents new information to any individual stage, then a different logic would be set up to cause an audible alarm to sound and the lamp to flash. As a specific example for stage 1, it is assumed that 6A4 was logic 0 or reset, and 6A5 was reset initially before the new word was shifted in. When the new information was shifted in, circuit 6A5 is now a 1 and 6A is a 0, and will result in enablement of an audible alarm and flashing of the lamp, as now shown.

With flip-flop 6A4 reset, logic 1 is on the 0 lead which is presented to 6A11. This logic 1 acts as an inhibit circuit to the NOR gate and its output is therefore a logic 0 which is presented to 6A12. Conversely, flip-flop 6A5, being in the set condition, presents a logic 1 to circuit 6A10, this lead inhibiting NOR gate 6A10 and its output also being a logic 0. Hence, both circuits 6A10 and and 6A11 present logic 0's to circuit 6A12, and both logic zeros then in a NOR gate present a logic 1 output to the audible alarm and the alarm will sound.

With a logic 0 out of 6A10, this signal is also presented to circuit 6A13, and the flash signal coming in to 6A13 is a square wave signal with a period of one second. Thus, for a half a second the logic signal on the circuit 6A13 will be logic 0; then for the next half second will be a logic 1. When it is a logic 0, since 6A10 is presenting a constant logic 0, 6A13 will present a logic 1 for a half second; then a logic 0 for a half second. This signal is presented to circuit lamp amplifier 6A14 which goes out and flashes lamp 223. As long as the states of 6A4 and 6A5 remain in the reset and set condition respectively, this condition will exist.

To silence the alarm, the operator of the system must walk up to the panel or console and operate the alarm silence key.

This signal is presented to all stages but more specifically to circuits 6A8 and 6A9 in stage one. This circuit transfers the state of 6A5 flip-flop to the 6A4 flip-flop. Since flip-flop 6A5 is in the set condition, a logic 0 will be presented to circuit 6A6 and the output of 6A6 will be a logic 1 which is fed to circuit 6A8. This circuit, in conjunction with the alarm silence key, which presents a logic 1 to 6A8, gives a logic 1 to the output of circuit 6A8 and forces the flip-flop 6A4 to the set condition. Both flip-flops 6A4, 6A5 are now in the set condition.

With both flip-flops in the set condition, flip-flop 6A5 presents a logic 0 to circuit 6A11 and circuit 6A4 presents a logic 0 to 6A11. Hence, circuit 6A11 is activated and a logic 1 appears at the input of 6A12 which turns off the audible alarm. Logic 1 out of 6A11 also goes through a rectifier to circuit 6A14 forcing a constant logic 1 to the input of 6A14. This constant logic 1 is amplified through the lamp driver and over conductor 615 to the lamp 223, and lamp 223 for point number 01 is on steady.

If at some later date, the new data which comes in changes flip-flop 6A5 to a zero, a difference exists between the new status and old status.

Since 6A5 is reset, then a logic 1 is presented on the 0 side of flip-flop 6A5 to circuit 6A11 deactivating that circuit and presenting a logic 0 on the output of that circuit. Flip-flop 6A4, being set, presents a logic 1 on the one side of the flip-flop to circuit 6A10 deactivating circuit 6A10 and putting a logic 0 on its output. With two logic 0's being presented to 6A12, the output thereof is activated to drive the audible alarm 6A3.

The output of 6A10, which is a logic 0, is presented to circuit 6A13 and the flash signal is also presented to 6A13, and the output of 6A13 will be a flashing signal which drives the lamp driver circuit 6A14 and flashes the lamp. The alarm will ring and the lamp will flash until an operator walks up and manually pushes the alarm silence key.

When the alarm silence key is depressed, a logic 1 will be presented to circuit 6A8 and 6A9. This time, however, since 6A5 is in the reset condition and a logic 0 is presented to circuit 6A7 which in turn presents a logic 1 to circuit 6A9, the circuit 6A9 in conjunction with the alarm silence key, presents a logic 1 on its output and forces flip-flop 6A4 to be reset. Both flip-flops 6A5 and 6A4 are now in the reset condition. With this condition of the flip-flops 6A4, 6A5, flip-flop 6A5 presents a logic 0 out on the one lead to circuit 6A10, and flip-flop 6A4 presents a logic 0 to circuit 6A10. This activates 6A10 and a logic 1 is presented to 6A12 to turn off the audible alarm.

Since the output of circuit 6A10 is a logic 1, circuit 6A13 is inhibited and the lamp will not flash. With flip-flop 6A5 in the reset condition, the 0 side is a logic 1. This logic 1 forces circuit 6A11 to a logic 0 and 6A14 will not be activated through the diode. With flip-flops 6A5 and 6A4 in the reset condition, there is no signal out of 6A14 and the lamp is off.

The system has now returned to the original starting condition, and all possible operations of flip-flop 6A5 and 6A4 and all possible soundings of the audible alarm and lighting and flashing of the lamps have been described.

A like operation occurs in each of the other stages. Depending on the old and new status, the audible alarm will either sound or not sound; the lamp will flash or not flash; and depending on the state of the flip-flops, the lamp will be either on or off.

As each status word reports from the remote station and is routed to the status registers, the point indicator circuit 608 will analyze the bits coming in and drive the lamps as set forth above.

Referring back now to the description in which the status registers are being loaded with the status information bits, the PC counter 1803 (FIG. 18D) continues on to PC count 29. The logic 1 on PC29, in conjunction with the logic 1 on lead M4, is presented to circuit 15C2 in the store status circuit 1500 (FIGURE 15C). The output of circuit 15C2 is presented to circuit 15C3, which presents a logic 1 to the reset side of flip-flop 15C4 and flip-flop 15C4 resets. A logic 0 is now presented to circuit 15C5 removing the status word 01 signal to the 12-stage status shift register.

At the same time, a logic 1 on lead PC29 is presented to circuit 19A7 in data required generator circuit 1900. A logic 1 is then presented to flip-flop 19A8 resetting that flip-flop and removing the shift signal from the conductor SH to the shift register 800. The storage of the first status word in the first status register is now complete.

The 32-stage ring counter 1803 (FIG. 18D) then proceeds to PC count 32 and a logic 1 on PC32 is presented to circuit 19B4 in the timing control circuit 1901 (FIG. 19B). Here, in conjunction with a logic 1 on M4, circuit 19B4 presents a logic 1 to the set side of flip-flop 19B9, setting the no reply timing flip-flop 19B9. The no reply timing circuit proceeds as described above.

The output of circuit 19B4 also presents a logic 1 to circuit 19B11, placing a logic 1 on the start timing lead. This logic 1 is presented to circuit 18C1 in the program control circuit 1802 which resets flip-flop 18C3 to stop the 32-stage ring counter at the count of PC1.

The logic 1 on PC32 is also presented to circuit 15A7 in the word counter control circuit 1503 (FIG. 15A) This, in conjunction with the M4 lead presented to 15A6 is routed to 15A7 to put a gate on circuit 15A5 which allows a clock pulse to be presented on the advance word signal. This clock pulse is presented to the ten stage ring counter circuit 1502 (FIGURE 15B) where the word countersteps from a count of 1 to a count of 2 to prepare the system for receipt of the next word.

The remote station should now be sending back the second word of status.

When the shift register 800 receives this word, and receives it correctly, it will present a logic 1 on the "good word received" line to the master station.

This logic 1 is then presented to the program control circuit 1802 and circuit 18C2 (FIG. 18C) and the output of circuit 18C2 presents a logic 1 to set flip-flop 18C3 which in turn, gates a clock pulse out of 18C4 to the 32-stage ring counter 1803 (FIG. 18D) to start the counter.

When the counter 1803 reaches a count of PC4, it presents a logic 1 to the flip-flop 19A8 in the data request generator circuit 1900 to flip-flop 19A8 which presents a logic 1 over the shift lead SH to the shift register 800 to bring out the status information to be stored in the status registers.

At the same time the logic 1 on PC4 is presented to circuit 15C1 in the store status circuit 1500 (FIG. 15C) which in conjunction with the logic 1 on M4 provides a logic 1 out of circuit 15C1 to the set side of flip-flop 15C4 setting that flip-flop. This output, in conjunction with the logic 1 on word 02 lead sends a signal status word 02 to the status registers.

With the station address 01 signal, the word 02 signal, and the data information from the line shift register, circuit 604 (FIG. 6) in the register and select gates for status points is now actuated to present a logic 1 to circuit 609 presenting twenty-four clock pulses to a twenty-four stage shift register for word 02.

When the PC counter reaches a count of 29, a logic 1 is presented on that lead to circuit 19A7 in the data request generator circuit 1900 (FIG. 19A). The output of circuit 19A7 then sends a logic 1 to the reset side of flip-flop 19A8 resetting that flip-flop which removes the shift signal from lead SH to the shift register 800 and no more status information will be provided.

The logic 1 on PC29 is also presented to circuit 15C2 in store status circuit 1500 and, in conjunction with a logic 1 on M4, presents a logic 1 to circuit 15C3 which in turn presents a logic 1 to the reset side of flip-flop 15C4 resetting that flip-flop and removing the status word 02 signal.

When the PC counter reaches a count of 32, a logic 1 is presented over lead PC32 to circuit 19B4 in the timing control circuit 1901. In conjunction with the logic 1 on M4, circuit 19B4 presents a logic 1 to the set side of flip-flop 19B9 setting that flip-flop to start the no reply timing.

It should be remembered that when each "good word received" signal is provided by the shift register 800 a logic 1 is provided to circuit 19B7 to reset flip-flop 19B9. The logic 1 on PC32 is also presented to circuit 18C1 in the program control circuit 1802 sending a logic 1 to the reset side of flip-flop 18C3 to reset that flip-flop and stop the 32-stage ring counter 1803.

As each succeeding status word is brought in from the remote station, the same process is repeated until all words have been received. The word counter is stepped once for each of those words.

Assuming that the last status word for this station 01 is word 10, the conductor word 10″ is patched to one input of "last word of status" circuit 15E1.

Since logic 1 is present on SA01 and M4, circuit 15E1 presents a logic 1 on the last word of status conductor (LWS).

The logic 1 presented on the last word of status conductor LWS is presented to circuit 18A3. Since the last word of status is being handled, the count on the PC counter 1803 advances to PC32 and the last word of status is stored.

*Station address counter circuit (FIGS. 18A, 18B)*

At this time, the station address counter, 1801 (FIG. 18B) is advanced. More specifically, the output of circuit 18A3 in the station address control circuit 1800 (FIG. 18A) presents a logic 1 to circuit 18A4 when the last word of status conductor LWD and the PC32 conductors are marked with a logic 1. The action of this pulse in the station address counter circuit 1801 and the manner in which succeeding pulses count this circuit down from addresses 01 to 99 is now set forth.

The logic 1 on advanced station address lead is presented to flip-flop 18B9 (FIG. 18B) which is in the set condition. A logic 1 is being presented on the one side to the reset side of this flip-flop, and accordingly the action of the clock and the logic 1 on the reset side will reset flip-flop 18B9.

As the logic 1 from the one side of flip-flop 18B9 goes to a logic 0, a clock pulse or a logic 1 is presented to flip-flop 18B13. Since this flip-flop is reset, a logic 1 is presented out of 0 lead to the set side of flip-flop 18B3. Hence, the action of the clock and the set lead is to set flip-flop 18B3.

Since the 18B13 flip-flop has now gone from a logic 0 to a logic 1 on the 1 output, there is no action on the clock lead of flop-flop lead 18B17.

This is the extent of the action of the advance station address pulse as presented to the address counter.

With reference to the bit patterns on the leads S1 through S8, it is noted that S1, S3, S4, S5, S6, S7, and S8 all have a logic 0 and S2 now has a logic 1. In the code of the system, therefore, the signals represent a station address count of 2.

After station 02 has been routined in the manner of station 01, a further advance station address pulse is received which is presented to flip-flop 18B9.

Since this flip-flop is in the reset condition, the logic 1 will be presented out of the 0 side of flip-flop 18B9 to the set side of the flip-flop 18B9 and the action of the clock pulse and the set lead is to set the flip-flop 18B9.

Since the action of the logic 1 lead was to move from a logic 0 to a logic 1, there is no effective clock pulse to flip-flop 18B13.

As a result of the step by flip-flop 18B9 alone, the code on conductors S1 through S8 indicates a count of 3.

If the system now receives four more "advance station address" pulses, the counter will advance to a count of 7 setting flip-flops 18B9, 18B13, and 18B17. The next pulse received on advance station address lead will, by the same action previously described, reset flip-flops 18B9, 18B13 and 18B17. The logic 1 on flip-flop 18B17 goes to a logic 0 presenting a pulse to the set side of flip-flop 18B21 to set this flip-flop.

Upon examining leads S1 through S8, we will note that the counter 1801 is now in the count of station address 08. The next pulse on the advance station address lead will set flip-flop 18B9 to put the station address counter 1801 into a count of 9.

Finally, as the tenth pulse on advance station address lead is received, flip-flop 18B9 is reset and will attempt to set flip-flop 18B13. However, a logic 1 is presented from the one side of flip-flop 18B21 to circuit 18B23. A logic 1 is then passed through that rectifier back to the 0 side of flip-flop 18B13 forcing a jam reset condition onto flip-flop 18B13 and holding it in the off condition. Hence, the action of the pulse to set flip-flop 18B13 will be lost. However, that same pulse out of 18B12 is also presented to the reset side of flip-flop 18B21 and this is the only action required to reset flip-flop 18B21.

Leads S1 through S4 are now all in the 0 condition, and the counter has gone from a count of 9 to 0. However, the action of flip-flop 18B21 to go to a reset condition presents a logic level change from 1 to 0 out of circuit 18B23 which then presents a clock pulse to circuit 18B24 forcing that flip-flop from the reset condition to the set condition. The logic levels on leads S1, S2, S3, S4, S6, S7, and S8 are all 0 while the logic level on S5 is a logic 1. It will be noted that this is a BCD count of 10.

As the further advance station address pulses are received, the counter steps through count 11, 12, 13, etc., to 19 and then to 20. The action of the station address counter circuit 1801 will continue in such manner until it reaches a count of 99.

The next advance station address pulse will step the station address counter 1801 from a count of 99 to a count of 01. The station address counter 1801 proceeds as previously described resetting flip-flops 18B9, 18B21, 18B24, and 18B36. However, since 18B36 is going from a logic 1 to a logic 0, a pulse out of circuit 18B40 is presented to OR circuit 18B41. This sets flip-flop 18B9 forcing the station address counter to a count of 01.

The logic 1 presented from circuit 18A3 as it advanced the station address counter 1801, is also presented to circuit 18E4 in the mode control circuit 1804 (FIG. 18E) which presents a logic 1 on the set M1 lead. This lead M1 then presents a logic 1 to OR 18F1 in the five bit mode register 1805 (FIG. 18F) which presents a logic 1 to flip-flop 18F7, and a logic 1 to circuit 18F5. Flip-flop 18F7 will set and flip-flop 18F10 will reset putting the system back to mode 1.

With mode 1 operating, the system is at the starting point for doing a data request for station 02.

With this in mind, everything that has been described above with the system at the starting point in mode 1 will again be repeated, but this time station address 02 will be presented and sent to the remote stations instead of station address 01.

Since the master station is in mode 1 and station address 2, a data request message is sent to all remote stations. This time a station address code 2 is sent. As previously described, mode 1 sends an interrupt signal and then loads the shift register 800 with the data request word and sends that word to the shift register 800.

Also in mode 1, as before, a transmit signal is sent to the shift register 800 which then sets the shift register 800 in motion to put such information out on the line.

The remote station, if it responds properly, will send back the first data word from that station. When the line shift register has received that data word and received it correctly, a "good word received" will be presented to the master station programmer 260, starting the master station programmer in mode 2. The master station programmer 260 compares the remote bit station address, as previously described, and analyzes the function code and at the proper point jumps to mode 3 to store the first data word.

*Command scanner circuit*

It is now assumed that the remote station has initiated transmission of data word 2 and while this data word is coming in, the operator walks up to the control panel and depresses the pump #1 "ON" which presents a logic 1 to the circuit station address command point scanner (FIGS. 4 and 5).

The command point scanner logic is performed by the inhibit core logic instead of the conventional AND or NOR gate logic. The cores used in this circuit are cores which have the property of a square hysteresis loop, and are threaded with leads such as bias, read, sense, and several inhibit leads. It is the combination of these leads which supply a net current in either one direction or the other direction. The normal state of the core is such that the current sets it to the 0 or rest condition.

With appropriate currents reversed through this core, the core then switches causing a flux change. The sense winding picks up current from that flux change and feeds a sense amplifier which indicates that a particular core has been switched. Once the core has been switched, it is returned to the zero or rest position by the application of inhibit currents. The sense amplifier is polarized so as not to be triggered when the core switches from the logic 1 or set condition to the logic 0 or reset condition.

Detailed descriptions of square loop magnetic core operations are set forth in "Computers and How They Work," J. Fahnestock, Ziff-Davis Publishing Company, New York, 1959, pages 147 through 165; "Logical Design and Digital Computers," P. Montgomery, Jr., John Wiley & Sons, Inc., 5th printing, 1960, pages 195–199. Symbolic core notation as used in this patent application will be found in U.S. 2,973,506; "Pulse Switching Circuits Using Magnetic Cores," by Karnaugh appearing in Proceedings of IRE, vol. 43 of May 1955, and references showing the us of inhibit winding is shown in U.S. 2,937,385 and 3,141,155.

With reference to FIGURE 4, the idle state of the command point scanner is now described. A first bias circuit provides the bias for cores 1 through 198 to guarantee that while all other inhibits are removed from a core, such core is in the zero and rest condition. Such circuit extends from +12 over resistors 404B and through all of the 198 cores to diode 404A and ground.

Assuming that circuits 526 and 527 are reset, logic 1 on the lead 0 (406) of circuit 527 to circuit 400 supply a logic 1 to that circuit, which provides a clock pulses to the 9-stage binary counter circuit 401. This is a standard binary counter which has a capability of counting from a count of 0 to 511 and then returning back to 0.

The first eight stages of this binary counter correspond directly to the point address of the command button which was depressed. The ninth stage corresponds to whether or not the button that was depressed was an ON or OFF command.

Assuming the counter is in a count of 0, a logic 1 obtains on current driver one bar through nine bar and a logic 0 is obtained out of current drivers 1 through 9. Where there is a logic 1 out of the current driver, current will flow through this lead to +12 volts.

To demonstrate that a core does not switch, it is only necessary to show that at least one current driver presents an inhibit current through that one core. It can easily be observed that for the core shown, core 1, 2, and 198 that there are inhibit currents flowing through each of these cores. Hence, in a count of 0 none of these three cores will switch. Irrespective of whether a command button was pushed or not, cores 1 through 198 will all be inhibited in a count of 0.

The next clock pulse through circuit 400 will step the 9-stage binary counter to a count 1. With the binary counter in a count of 1, there is a logic 1 out of circuit 1 and two bar through nine bar. It is then easily seen there are no inhibit currents going through core 1 from the 9-stage binary counter. The only inhibit current present at this time is the bias current. This bias current will not allow the core to switch.

It is assumed now for exemplary purposes that the "pump ON" button at point one is depressed. The 9-stage binary counter may be any count at the time switch is pressed. However, not until that counter reaches a count of 1 will all of the inhibits be removed from core number 1.

However, since the command button for point 01 (pump on) is depressed, the current flowing from +12 volts through resistor 404B to the rectifier 404A is compensated by the current flowing from +12 volts, resistor 404B through the right hand contacts of the command button to circuit 402A to −12 volts. These two currents go through the cores in opposite direction cancelling each other removing all inhibits from this core. Hence, when a read pulse occurs, the core number 1 will switch, the sense amplifier 406 will detect a core switch and present a logic 1 to circuit 525.

It should be noted that the clock pulse which drives the 9-stage binary counter also drives delay circuit 517. Delay circuit 517 and multivibrator circuit 518 generate a read pulse to the core package which is delayed by circuit 517 to guarantee that the 9-stage binary counter has settled down before a read pulse goes through the cores.

The output of the multivibrator circuit 518 also feeds delay circuit 521. The delay of circuit 521 and the one shot circuit 522 are provided to compensate for the core delay from the time beginning with the leading edge of the read pulse to the output of the sense amplifier 406. Hence, if all the timing is proper, circuit 525 will be activated by the one-shot multivibrator circuit 522 and by sense amplifier circuit 406. The logic 1 presented at the output of circuit 525 goes to circuit 527 and jams that flip-flop to a set condition. Flip-flop 527 remembers that a pulse had occurred and sends a continual command request to master station programmer 260.

At the same time a logic zero is presented out of circuit 527 up to current driver circuit 400, taking the logic 1 off of the gated clock amplifier and stopping the 9-stage binary counter 401 in count 1, the count which is associated with the point number 1 pump ON.

Since a command request signal has been sent to the master station programmer 260, the master station programmer will send a readout signal to readout the information from the command point scanner.

The readout signal is applied over conductor 220 to circuit 501 which then presents clock pulses to a 5-stage binary counter circuit 503. Assuming that this counter is in a count of 0, it will now sequentially address cores MB through CC1. With the 5-stage binary counter in the count of 0, a logic 1 is presented on current drivers one bar through five bar and logic 0's are presented on current drivers one through five. Thus, all cores to which the signals from the current driver one bar through five bar are transmitted are inhibited with an inhibit current, and it is easily recognized that all cores are inhibited.

The next clock pulse from circuit 501 will count the 5-stage binary counter to a count of 1, and logic 1 is on current driver one and two bar through five bar.

Looking at core MB it will be noted that no inhibit current is going through this core from the 5-stage binary counter. There is also no inhibit currents flowing through the MB core from the 9-stage binary counter. Hence, when a read pulse occurs out of circuit 520, core MB will switch to trigger sense amplifier 515, putting a logic 1 to circuit 524. The same timing noted above allows the core to switch and the sense amplifier to detect and strobe with the pulse out of circuit 522. A logic 1 will then be presented to circuit 524 which then in turn jams flip-flop 526 to the set condition providing a logic 0 to NOR gate 528. Since a logic 0 is being presented from flip-flop 527, the NOR gate is satisfied and a logic 1 will be presented out of circuit 528 to the data lead which corresponds to the logic 1 of the master bit which must be presented to the line shift register 800.

Since the logic 1 output out of flip-flop 526 is presented to the reset side of flip-flop 526 the next clock pulse will reset that flip-flop to the 0 state. At the same time a clock pulse will hit circuit 501 counting the 5-stage binary counter to a count of 2. There are no inhibit currents presented to core SA80 by way of the 5-stage binary counter. However, the 9-stage binary counter is in a count of 1. There is a logic 1 out of current driver nine bar which presents an inhibit current to core SA80. When a read pulse occurs, the core will not switch, the sense amplifier will not sense a core pulse and a logic 0 will be presented to circuit 524. A logic 0 will be presented to 526 leaving the flip-flop 526 in the reset condition. Hence, circuit 528 presents a logic 0 out on the data leads. This signal corresponds to the most significant bit of the tens digit of the station address which is a 0.

It can be easily demonstrated that the 5-stage binary counter now proceeds through cores SA40, SA20, SA10, SA8, SA4, SA2 and SA1. The 5-stage binary counter addresses each of these cores sequentially and attempts to switch that core with a read pulse. Depending on the condition of the 9-stage binary counter, either that core is switched or not switched. In this particular case for station address 01, switch cores SA80 through SA2 are not switched. Core SA1 is switched because there are no inhibits presented to it by the 9-stage counter. As the core switches, the sense amplifier 515 will sense the core pulse and put a logic 1 on circuit 524 which presents a logic 1 to flip-flop 526.

Flip-flop 526 then presents a logic 0 to circuit 528 satisfying circuit 528 and putting a logic 1 out on the data lead. This logic 1 corresponds to the least significant bit of the least significant digit of the station address 01. The master bit and station address have now been read out of the core package.

As the 5-stage counter 503 continues down through its count, it will address cores FC8 through FC1. It will be noted that FC4 and FC2 have inhibit currents flowing through them so that there will be no switching of those cores. FC8 and FC1 will switch. This presents a code of nine to the shift register 800 which is the command code for the remote station.

The 5-stage binary counter 503 now proceeds to address core PA80. It will be noted that if current driver eight bar has a logic 1 on it, this core will be inhibited. In the particular example here set forth the 9-stage binary counter being in a count of 1, eight bar does have a logic 1 on it, and inhibit current is put through core PA80 and the core will not switch.

The counter 503 progressively advances down through PA40, PA20, PA10, PA8, PA4 and PA2 effecting a similar operation. When the 5-stage counter 503 addresses PA1, since the 9-stage counter 401 is in the count of 1 there is no inhibit current flowing through PA1 and core PA1 is allowed to switch putting logic 1 on the data lead. This logic 1 corresponds to the least significant bit of the least significant digit of the point address for this point command 01.

The 5-stage binary counter 503 now continues and addresses cores CC8 through CC1. It should be noted that with a logic 1 on nine bar that only core CC1 will switch. This will then present a series code 0001 to the line shift register which is the command code for ON.

At this point the master station programmer 260, realizing that it has loaded all the information out of the command point scanner, removes the readout signal and stops circuit 501 from stepping the 5-stage counter 503. The master station programmer 260 then sends a release signal which resets flip-flop 527, putting it in the reset condition and removing the command request from the master station programmer 260. It also reestablishes a logic 1 to circut 400 starting the 9-stage binary counter 401 up again to sequentially scan for a command button which may be depressed.

The sequence of the illustration is interrupted briefly to consider further the operation of the command point scanner with use of the following chart:

COUNTING OF 9-STAGE BINARY COUNTER (FIG. 4)

| Count (Binary) | Flip-Flops | | | | | | | | Count (BCD) | Position |
|---|---|---|---|---|---|---|---|---|---|---|
| | Units | | | | Tens | | | | Position | | |
| | 1 | 2 | 3 | 4 | 5 | 6 | 7 | 8 | 9 | | |
| | $2^0$ | $2^1$ | $2^2$ | $2^3$ | $2^4$ | $2^5$ | $2^6$ | $2^7$ | $2^8$ | | |
| 0 | 0 | 0 | 0 | 0 | 0 | 0 | 0 | 0 | 0 | 00 | |
| 1 | 1 | 0 | 0 | 0 | 0 | 0 | 0 | 0 | 0 | 01 | ON |
| 2 | 0 | 1 | 0 | 0 | 0 | 0 | 0 | 0 | 0 | 02 | ON |
| 3 | 1 | 1 | 0 | 0 | 0 | 0 | 0 | 0 | 0 | 03 | ON |
| 4 | 0 | 0 | 1 | 0 | 0 | 0 | 0 | 0 | 0 | 04 | ON |
| 5 | 1 | 0 | 1 | 0 | 0 | 0 | 0 | 0 | 0 | 05 | ON |
| 6 | 0 | 1 | 1 | 0 | 0 | 0 | 0 | 0 | 0 | 06 | ON |
| 7 | 1 | 1 | 1 | 0 | 0 | 0 | 0 | 0 | 0 | 07 | ON |
| 8 | 0 | 0 | 0 | 1 | 0 | 0 | 0 | 0 | 0 | 08 | ON |
| 9 | 1 | 0 | 0 | 1 | 0 | 0 | 0 | 0 | 0 | 09 | ON |
| 10 | 0 | 1 | 0 | 1 | 0 | 0 | 0 | 0 | 0 | NOT USED | |
| 11 | 1 | 1 | 0 | 1 | 0 | 0 | 0 | 0 | 0 | | |
| 12 | 0 | 0 | 1 | 1 | 0 | 0 | 0 | 0 | 0 | | |
| 13 | 1 | 0 | 1 | 1 | 0 | 0 | 0 | 0 | 0 | | |
| 14 | 0 | 1 | 1 | 1 | 0 | 0 | 0 | 0 | 0 | | |
| 15 | 1 | 1 | 1 | 1 | 0 | 0 | 0 | 0 | 0 | | |
| 16 | 0 | 0 | 0 | 0 | 1 | 0 | 0 | 0 | 0 | 10 | ON |
| 17 | 1 | 0 | 0 | 0 | 1 | 0 | 0 | 0 | 0 | 11 | ON |
| 18 | 0 | 1 | 0 | 0 | 1 | 0 | 0 | 0 | 0 | 12 | ON |
| 19 | 1 | 1 | 0 | 0 | 1 | 0 | 0 | 0 | 0 | 13 | ON |
| 20 | 0 | 0 | 1 | 0 | 1 | 0 | 0 | 0 | 0 | 14 | ON |
| 21 | 1 | 0 | 1 | 0 | 1 | 0 | 0 | 0 | 0 | 15 | ON |
| 22 | 0 | 1 | 1 | 0 | 1 | 0 | 0 | 0 | 0 | 16 | ON |
| 23 | 1 | 1 | 1 | 0 | 1 | 0 | 0 | 0 | 0 | 17 | ON |
| 24 | 0 | 0 | 0 | 1 | 1 | 0 | 0 | 0 | 0 | 18 | ON |
| 25 | 1 | 0 | 0 | 1 | 1 | 0 | 0 | 0 | 0 | 19 | ON |
| 26 | 0 | 1 | 0 | 1 | 1 | 0 | 0 | 0 | 0 | NOT USED | |
| 27 | 1 | 1 | 0 | 1 | 1 | 0 | 0 | 0 | 0 | | |
| 28 | 0 | 0 | 1 | 1 | 1 | 0 | 0 | 0 | 0 | | |
| 29 | 1 | 0 | 1 | 1 | 1 | 0 | 0 | 0 | 0 | | |
| 30 | 0 | 1 | 1 | 1 | 1 | 0 | 0 | 0 | 0 | | |
| 31 | 1 | 1 | 1 | 1 | 1 | 0 | 0 | 0 | 0 | | |
| 32 | 0 | 0 | 0 | 0 | 0 | 1 | 0 | 0 | 0 | 20 | ON |
| ⋮ | | | | | | | | | | | |
| 153 | 1 | 0 | 0 | 1 | 1 | 0 | 0 | 1 | 0 | 99 | ON |
| 154 | 0 | 1 | 0 | 1 | 1 | 0 | 0 | 1 | 0 | NOT USED | |
| ⋮ | | | | | | | | | | | |
| 255 | 1 | 1 | 1 | 1 | 1 | 1 | 1 | 1 | 0 | | |
| 256 | 0 | 0 | 0 | 0 | 0 | 0 | 0 | 0 | 1 | 00 | |
| 257 | 1 | 0 | 0 | 0 | 0 | 0 | 0 | 0 | 1 | 01 | OFF |
| ⋮ | | | | | | | | | | ⋮ | ⋮ |
| 400 | 0 | 0 | 0 | 0 | 1 | 0 | 0 | 1 | 1 | 90 | OFF |
| ⋮ | | | | | | | | | | ⋮ | ⋮ |
| 409 | 1 | 0 | 0 | 1 | 1 | 0 | 0 | 1 | 1 | 99 | OFF |
| 410 | 0 | 1 | 0 | 1 | 1 | 0 | 0 | 1 | 1 | NOT USED | |
| ⋮ | | | | | | | | | | | |
| 511 | 1 | 1 | 1 | 1 | 1 | 1 | 1 | 1 | 0 | | |
| 0 | 0 | 0 | 0 | 0 | 0 | 0 | 0 | 0 | 0 | 00 | |
| 1 | 1 | 0 | 0 | 0 | 0 | 0 | 0 | 0 | 0 | 01 | ON |

The command point scanner is made up of two counters; a 9-stage binary counter and a 5-stage binary counter. The 9-stage binary counter sequentially interrogates cores 1 through 198, shown or indicated in FIGURE 4, When a command button is pushed, the nine-stage counter 401 steps in an appropriate count and conditions the leads through the other twenty-five cores, shown in FIGURE 5, and labeled MB–CC1. Later when the master station reads out the command point scanner, the 5-stage binary counter 503 sequentially addresses the twenty-five cores MS–CC1 in that order, causing a serial output on the data lead according to the command button that was pushed.

The particular threading used on the twenty-five cores, MB through CC1, is determined by the 9-stage binary counter. It should be noted that an 8-stage binary counter is sufficient to sequentially interrogate 198 cores. However, this presents a problem in that a binary number must be decoded into a BCD point address and point command. By the simple addition of the 9th flip-flop, this problem is eliminated. The first 8 stages of the 9-stage binary counter contain the point address. The 9th stage contains the information of "ON" or "OFF."

It is easily seen that for any core associated with a point address, "ON" or "OFF" will be threaded with only those states which have a legitimate BCD code.

Referring to the chart, it is demonstrated that binary counts 10 through 15 are not used, and, hence, that pattern would not be associated with any core. Whenever the first four stages are greater than 1001 or 9 the codes are not used. Stages 5 through 8 are similarly arranged.

Even though the command code "ON" and "OFF" are BCD codes, only two of the conditions of the BCD code are required. Therefore, it is necessary to have only one stage generate this BCD code.

Upon close examination of the chart, it is recognized that point 01 to 99 are scanned for the "ON" condition, and thereafter points 01 to 99 are scanned for the "OFF" condition.

Using a 9-stage binary counter generates 252 positions or counts, of which only 198 are used herein. In this manner, it is possible to use the decoding technique on cores MB through CC1. Cores PA80 to PA1 merely detect the state or the first eight stages in the 9-stage binary counter 401. Cores CC8 to CC1 detect and decode stage nine to generate command codes. Cores SA80 through SA1 are wired for a particular station address.

*Mode 5*

Since the operator has now manually depressed point 1 "ON" for station 1, command point scanner provides a logic 1 on lead CR01. This logic 1 is presented, command control circuit 1400 (FIG. 14A) and circuit 14A1 which presents a logic 1 on the CR lead. The logic 1 on the CR lead is presented to circuit 18E8 in the mode control circuit 1804 and logic 1 will remain on circuit 18E8 until a count of PC 32 is presented.

If the remote station has now sent its second word of data and the line shift register receives this word with a correct error code, the shift register 800 will present a "good word received" to the master station programmer 260. This will again, as previously described, start up the 32-stage ring counter 1803 (FIG. 18D) to effect storage of the second word.

At the end of the count by the 32-stage ring counter 183, a logic 1 is presented on the PC32 to circuit 18E8 in mode control circuit 1804. With a command request signal on lead CR circuit 18E8 presents a logic 1 on lead set M5.

Normally the system would not have changed modes at this time. However, since a command button has been pressed, the system now jumps to mode 5 and generates a command code represented by this button.

The logic 1 on set M5 lead is presented to circuit 18F11 and circuit 18F4 in the five bit mode register 1805 and flip-flop 18F11 is set and flip-flop 18F9 is reset.

The signal on PC32 of ring counter 1803 is also presented to circuit 18C5 in program control circuit 1802 (FIG. 18C). Referring to FIGURE 14A there is a logic 1 on command request conductor CR which is presented to 14A6. The output 14A6 is then a logic 0 ($\overline{CR}$) and this logic 0 is presented to circuit 18C5 (FIG. 18C). Since a logic 0 is on this gate, the logic 1 on PC32 is not allowed to pass through circuit 18C5 and hence flip-flop 18C3 is not reset and the counter will continue to count from PC32 to PC1 and PC2 without stopping.

It should be noted that PC1 is set at the same time mode 5 is set. Since the system is now in mode 5, a logic 1 is presented to circuit 19B6 in the timing control circuit 1901 (FIG. 19B). The logic 1 on PC2 is presented when the PC counter steps from a count of PC1 and presents a logic 1 to circuit 19B6. This circuit then presents a logic 1 to set flip-flop 19B10. It also presents a signal to 19B11 which presents a logic 1 on the start timing lead STT which extends to circuit 18C1 in the program control circuit 1802 (FIG. 18C). A logic 1 is presented to flip-flop 18C3, resetting that flip-flop and stopping the 32-stage ring counter 1803.

Since flip-flop 19B10 in the timing control circuit 1901 is set, a logic 1 is presented to one shot multivibrator 1910. The interrupt timing proceeds as previously described, and 9.38 ms. later circuits 19C12 and 19C1 present a logic 1 on the stop timing lead to circuit 18C2 in the program control circuit 1802 which sets flip-flop 18C3 and starts the PC counter 1803 counting.

The logic 1 on the stop timing lead is also presented to circuit 19B7 in the timing control circuit 1901 which presents a logic 1 to the reset side of flip-flop 19B10 resetting the flip-flop and stopping the interrupt timing. This interrupt signal out of 19B10 was presented to the shift register 800 and sent out onto the line as previously described.

The logic 1 on the stop timing lead is also presented to circuit 14A5 in the command control circuit 1400. Again, since the system is in mode 5, a logic 1 is presented on lead M5 satisfying circuit 14A5 which presents a logic 1 to the set side of flip-flop 14A4 setting that flip-flop. A logic 1 is presented on the one lead of flip-flop 14A4 to circuits 14A2 and 14A3.

Since the operator had pressed a button for station address 01, a logic 1 is presented on CR01 to circuit 14A2, presenting a logic 1 out on readout conductor ROD1 for station 01 which is presented to the command point scanner to readout the command message from the core logic.

The 32-stage ring counter 1803 (FIG. 18D) has now started again and as the PC counter advances from 3 to 4, a logic 1 presented on PC4 will be presented to flip-flop 19A8 in the data generator request circuit 1900 setting that flip-flop. This presents a shift signal to the shift register to prepare the shift register 800 to receive the command message from the core logic. The 32-stage ring counter 1803 continues through the counter to PC28, presenting a logic 1 on PC28 to reset flip-flop 14A4 in the command control circuit 1400 (FIG. 14A). This presents a logic 0 on the one output of flip-flop 14A4 removing the signal from readout conductor 01.

When the PC counter 1803 steps from PC28 to PC29, a logic 1 is presented on PC29 to circuit 19A7 in the data request generator 1900 (FIG. 19) which presents a logic 1 to the flip-flop 19A8 resetting that flip-flop and stopping the shift signal over conductor SH to the shift register 800.

It should be noted that flip-flop 14A4 (FIG. 14A) was started one PC count earlier than flip-flop 19A8, and that flip-flop 14A4 was stopped one PC count earlier than 19A8. Since there is an inherent delay in the core package, this particular timing is required to properly load up the shift register 800.

The next data query message which the master station 100 will send out will be a data request message for the particular station which has just commanded. To accomplish this, the system being in mode 5, as the counter 1803 advances to a count of PC2 a logic 1 is provided out of circuit 18A4 over the reset conductor to the station address counter circuit 1801 resetting the counter into a station address count of 00.

The PC counter 1803 then continues to PC count 4 and a logic 1 is presented to circuits 18A5 through 18A6 (FIG. 18A) presenting a logic pattern on leads "set S1" through "set S8." Since these leads are used with the input leads "CA1" through "SA8" to control gates 18A5–18A6, reference is made to FIGURE 14B and a description of the generation of signals for conductors CA1–CA8 is set forth.

*Command address decoder*

With the command request coming from the particular command scanner which has an address of 01 (the present example) a logic 1 will be presented CR01 lead to circuit 14B1 in the command address decoder circuit 1401 (FIG. 14B). This circuit then places a logic 1 on circuit 14B4 which presents a logic 1 on the CA1 lead.

It should be noted that the output of circuit 14B1 is not presented to any other circuit in FIGURE 14B. Hence, logic 0's are presented on leads CA2 through CA8.

If the command scanner for station address 99 had been activated, a logic 1 would have been on CR99, and a logic 1 would have been presented to circuits 14B2 and 14B3. The logic 1 out of circuit 14B3 would be presented to circuit 14B7 and 14B18 to provide a logic 1 on CA1 and CA4. The output of circuit 14B2 would present a logic 1 on circuit 14B22 and 14B33 and a logic 1 would be provided on leads CA5 and CA8. Such pattern of logic 1's on CA1, CA4, CA5, CA8 is the BCD code for station address 99.

Since the example assumed a command from station 1, the particular bit pattern presented on CA1 through CA8 represents the pattern for station 01, and a logic 1 on CA1 and logic 0 on CA2 through CA8 will be extended to the circuits 18A5 through 18A6 in the station address control circuit 1800 (FIG. 18A). Gate 18A4 provides a logic 1 on S1 and the remaining gate provides logic 0's on S2 through S8. This pattern goes to station address counter 1801 (FIG. 18B) strobing in the station address count for station 01 into the station address counter which had been previously set to 00. Hence, flip-flop 18B9 will set through circuit 18B1.

The PC counter 1803 now steps from PC29 to PC30 placing a logic 1 on circuit 19A5 in the data request generator circuit 1900 (FIG. 19A). This, in conjunction with the logic 1 on M5, activates circuit 19A5 and presents a transmit signal over conductor TR to the shift register 800.

The PC30 signal is also presented to circuit 19B1 in the timing control circuit 1901 (FIG. 19B) and again in conjunction with M5 signal presents a logic 1 to the flip-flop 19B8 setting that flip-flop. It also presents a logic 1 to circuit 19B11 generating a start timing signal which is presented to circuit 18C1 in the program control circuit 1802 (FIG. 18C), resetting flip-flop 18C3, and stopping the PC counter 1803 in a count of PC31.

Flip-flop 19B8 presents a logic 1 to circuit 19C1. Since flip-flop 19C5 in timer circuit 1902 has been put into the reset condition by MR1, a logic 1 is presented to 19C1 from flip-flop 19C5. Circuit 19C1 is now alerted waiting for the one pulse per second signal coming from the trailing edge trigger of circuit 19C7. The previous description of the no reply timing set forth the manner in which one pulse per second was provided.

When the logic 1 is presented on the one pulse per second lead, circuit 19C1 is satisfied and presents a logic 1 to set flip-flop 19C5. Flip-flop 19C5 now presents a logic 1 to circuit 19C1. One second later a logic 1 is received on the one pulse per second lead and presents the pulse to circuit 19C2. The output of 19C2 will then present a logic 1 to flip-flop 19C5 resetting that flip-flop. It also presents a logic 1 to circuit 19C11 which in turn presents a logic to circuit 19C12.

Since 19B8 flip-flop is still set, a logic 1 is presented to circuit 19C3 which in turn presents a logic 1 to 19C12 allowing the logic 1 to be presented on the stop timing lead. The logic 1 on the stop timing lead is presented to circuit 19B7 which in turn presents a logic 1 to the reset side of flip-flop 19B8 resetting that flip-flop. At the same time a logic 1 is presented to circuit 18C2 in the program control circuit 1802 (FIG. 18C) which presents a logic 1 to flip-flop 18C3 setting that flip-flop.

This once more starts the 32-stage ring counter 1803 through a count of 32 and then to a count of 1. However, since the system is in mode 5, the PC32 signal which is presented to circuit 18C5, is not allowed to pass through circuit 18C5 because of the M5 bar signal which is a logic 0. The timing counter is not stopped and the 32-stage ring counter 1803 provides another 32 counts.

At the same time that signal PC32 is not allowed to reset flip-flop 18C3, it is also presented to circuit 18E9 in the mode control circuit 1804. Here in conjunction with the logic 1 on mode 5 conductor circuit 18E9 presents a logic 1 to circuit 18E4 which in turn present a logic 1 to the set M1 lead. This signal is presented to flip-flop 18F7 and circuit 18F6 in the five bit mode register 1805 (FIG. 18F) which reset flip-flop 18F11 and set flip-flop 18F7 putting the system in mode 1.

At this time the description has disclosed how a command may be initiated, how the master station programmer processes this command, how the station address counter has been jumped to the station address of the commanded station, how the master station programmer waits one second for the operation of this command to be completed, and finally how it steps to mode 1 to then generate a data request message for the commanded station. The station address counter will then proceed from that station and pick up the scan of all 99 stations.

The description has further set forth the normal operation of the master station to sequentially scan each of the remote stations in turn, and periodically, as indicated by a command button, to generate a command message and control the remote station.

There are three things that can destroy this continuous scanning operation: (1) If the remote station replies but the station address code is different from the code which was transmitted; (2) If the remote replies but the message does not pass the primitive polynomial check, (i.e., a bad word received); and (3) When the remote station does not reply at all and the system times out. Each of these three conditions steps the try-counter and the master station will attempt that station again.

*Try counter*

Referring now to "try counter" control circuit (FIG. 20B), three signals are input to circuit 20B1: (a) miscompare, (b) bad word received, and (c) time out, which signal is generated by circuit 20B2 for a "no reply" timing signal or a "stop timing" signal. Any one of these three signals will send a logic 1 to circuit 20B3, gating a clock pulse out on to advance try counter lead and circuit 20C1 in the two stage binary try counter 2000. Flip-flop 20C1 is in the reset condition, and the logic 1 on the output of the zero side is presented to the set side of flip-flop 20C1. The advance try counter pulse, in conjunction with this lead, sets flip-flop 20C1.

The master station programmer 260 now tries by sending a data request message to the same station and again waiting for a response. If a "bad word received," a "miscompare" or a "no-reply" signal is received the system provides a logic 1 to circuit 20B3 to advance the try counter one step. Since flip-flop 20C1 is set, a logic 1 is presented from the one side of that flip-flop to the reset side of 20C1 and this signal in conjunction with the advance try counter resets flip-flop 20C1. However, at the same time the logic 1 out of the one side of flip-flop 20C1 presents a logic 1 to circuits 20C4 and 20C5. Since flip-flop 20C6 is in the reset condition, a logic 1 is presented to circuit 20C5. 20C5 is then activated and presents a logic 1 to flip-flop 20C6 setting flip-flop 20C6. The master station 101 then tries a third time in an attempt to obtain a response from the particular station that is failing. If a "bad word received," "miscompare" or "no-reply" is received a third time, the try counter is advanced another count. This time the advance try counter pulse sets flip-flop 20C1. A logic 1 is then presented from flip-flops 20C1 and 20C6 to circuit 20C7 and a logic 1 output obtains on the third try lead.

This logic 1 is presented to circuit 20B4 in try counter control circuit 2000 and in conjunction with the advance station address pulse satisfies circuit 20B4 setting flip-flop 20B5 which presents a reset pulse to the two stage binary ten counter circuit 2000 (FIG. 20C) resetting the 2-stage binary try counter. At the same time, it presents a reset lead to flip-flop 20B5 in circuit 2001 resetting that flip-flop.

The logic 1 on the third try is also presented to circuit 18A1 on station address control circuit 1800 (FIG. 18A). If there is no command request, an advance station address pulse will be sent to the station address counter 1801. This advance pulse will step the counter 1801 to the next station so that the master station may send a data request to that remote station.

When the system failed three times on any three of these counts, the try counter will have stepped to three, and the station address counter is advanced and the no-reply light for that station is set.

The set no reply circuit 1402 (FIG. 14C) is signalled by the logic 1 on the third try signal lead. Since the system is in station address 01 (SA1 marked with logic 1), a logic 1 will be presented on the set no-reply station 01 lead. The logic 1 on this lead is presented to a flip-flop which is then set and lights a light on the control panel to indicate to the operator that this station had been tried three times and did not respond.

If on the next scan cycle, conditions changed and a "good word received" signal is obtained from this particular remote station, a logic 1 on the good word received lead will be presented to circuit 14D1. This, in conjunction with station address 1 (SA1) presents a logic 1 on reset no-reply lead for station 01. This goes to a flip-flop and resets the flip-flop turning out the no-reply light for station address 01.

Miscompare

A miscompare occurs in mode 2 from PC count 5 to 13. That is, at any point during that time, flip-flop 20A12 in the comparator circuit 2002 (FIG. 20A) may set. When this occurs a signal will be presented on miscompare lead 1. Miscompare 1 is presented to circuit 18E4 in mode control circuit 1804 which presents a logic 1 on set M lead. This changes the system from mode 2 to mode 1 during the period the 32-stage ring counter is being driven.

Miscompare 1 is also presented to circuit 18D55 (FIG. 18D) which resets the PC counter 1803 to a count of PC1. Miscompare 1 is also presented to circuit 18C1 in the program control circuit 1802 (FIG. 18C) which presents a logic 1 to reset circuit 18C3. This action puts the system back in mode 1 and the counter at PC1, the starting condition for generating a new data and status update message for a remote station.

The logic 1 presented from flip-flop 20A12 in the comparator circuit 2002 (FIG. 20A) is also presented to circuit 20A13 and the trailing edge triggers to 20A13 to generate miscompare 2. Miscompare 2 is presented to circuit 18C2 in the program control circuit 1802 which presents a logic 1 to flip-flop 18C3 setting that flip-flop.

This action generates the data and status request message for the same station as was previously queried but from which a miscompare was obtained. The try counter circuit 2006 (FIG. 20C) would also be driven by a count of one, and if this condition were to continue, would finally go to a count of three, whereby the no-reply would light, and the station address counter 1801 would advance and the system would send out a data query for the next station as described above.

Remote station

The manner in which the master station processes data and status request messages to the remote stations has been set forth above and demonstrated by answering the receipt of signals from the remote station. The description now sets forth the manner in which the remote station receives these particular messages, and the manner in which the remote station generates the response messages which the master station received.

The message sent by the master station was the request for data and status update, FIGURE 27E. The first part of this message is the interrupt signal comprising a 9.38 ms. pulse. The input signal is applied to the line shift register on REC input 309, and sets flip-flop 1302. The output of flip-flop 1302 will cause a logic 1 at the output of gate 1303. This signal is applied through gate 1324 to reset the seven stage binary counter 1336, in the pulse width detector circuit 1300. The operation of the pulse width detector was defined previously. After 6.6 ms. a pulse from 110Y output of binary to decimal decoder 1325 will be applied to the input of gate 1311. This input will cause a logic 1 pulse on the RS output 1200. It will also pass through gate 1333 to reset flip-flops 1337, 1338, 951, 948, 943, 874, 1009, 1012, and through gate 1004 to reset counter 1003. This reset assures the proper conditions for the line shift register to receive a message.

For a detailed description of the shift register reference is made to the operation of shift register in the master station above, since operation of the line shift register in the master station is substantially identical to the operation of the line shift register in the remote station. Only minor differences to be disclosed exist in the manner that the signals at the master and at the remote stations are used.

The logic 1 on the RS lead is presented to the remote station programmer and the remote station point scanner to reset the remote station programmer and point scanner to an idle state preparing it for the transmission of the words of information to the master station.

The remote station receives the interrupt pulse from the master station followed by the sync pulse and message which the master station is sending to all remote stations. Each remote station receives the message and stores it in its data register.

If the error checking is correct, a "good word received" will be presented to the remote station programmer 395 (FIGS. 3 and 23). The logic 1 of the "good word received" lead is presented to circuit 2313 in the programmer (FIG. 39J). Circuit 2313 looks for a correct master bit; proper station address and function code before it will present a logic 1 to flip-flop 2306.

Since this is a message from the master station, a logic 1 will be presented on MB25 lead to circuit 2313. There will also be a logic 1 on the station address 17 lead which is presented to circuit 2313. The logic 0 on station address 2 through station address 8 are presented to inverters which invert these logic 0's to logic 1's and presents them to circuit 2313. Also the logic 1 on function code 15 conductor is presented to circuit 2313. This lead corresponds to the function code 5. Hence, all inputs to circuit 2313 are a logic 1, and a logic 1 will then be presented to flip-flop 2306.

If the system had not received a "good word received" signal, or had the master bit been incorrect, or had this been a message for a different station, or had this been the function code 9, gate 2313 would have had at least one 0 presented at its input, and no signal would have been given to flip-flop 2306. In this manner, gate 2313 determines whether or not a particular message on the line is for its particular station.

The logic 1 presented to flip-flop 2306 is also presented back over conductor 890 to the line shift register to turn on the solid state tone transmitter 206. With the logic 1 presented to flip-flop 2306, that flip-flop will set. A logic 1 is then presented to circuit 2301 enabling the gated clock amplifier to allow clock pulses to be distributed through the 27-stage ring counter. It should be remembered that when an interrupt pulse was received from the master station 100, logic 1 was presented on the RS lead. This logic 1 is also presented to the 27-stage ring counter 2303 forcing this counter into a count of 1, setting the first flop thereof and resetting flip-flops 2 through 27. The operation of this ring counter will then proceed in the manner of a standard ring counter.

When the 27-stage ring counter steps to a count of 2, a logic 1 is presented on lead 1 to flip-flop 2305 setting that flip-flop. Flip-flop 2305 then presents a logic 1 on the shift lead SH to the shift register. This shift signal controls the shift register in the same manner previously described in the master station.

In conjunction with this shift signal, data information will be presented to the line shift register by way of lead 346 (FIG. 24). Circuits 2403 through 2410 will generate the proper remote bit, station address and function code for the first word of data or the first word of status. Since this is station 01, there will be data to report and these circuits will generate the data function code.

When the 27-stage ring counter steps to a count of 3, the remote bit is presented to the line shift register. However, since the remote bit is a logic 0, none of the gates 2403 to 2410 will be satisfied and a logic 0 will be presented out on the data lead 346 to provide a logic 0 remote bit.

When the ring counter 2302 steps to a count of four, the information bit corresponding to the most significant bit of the most significant digit of station address is to be provided. However, again, this is 0 and no gate will be satisfied, and therefore, a logic 0 will be presented on the data lead 346. This operation continues until the ring counter 2302 steps down through a count eleven and presents a logic 1 on lead 10. This lead is patched to circuit 2403 and presents a logic 1 to that circuit. The other signal required to satisfy this circuit is the "word 1" signal on conductor 350 of the 11-stage shift register 2401.

Again, since the RS signal was received from the line shift register as a result of the interrupt pulse, the 11-stage shift register is set to a count of word 1. This logic 1 is then presented to circuit 2403 satisfying this circuit in conjunction with the count of 11 from the 27-stage ring counter. The logic 1 presented from circuit 2403 over conductor "1" to the data lead 346 corresponds to the least significant bit of the least significant digit of station address.

When the ring counter 2401 steps to a count of twelve, that signal is not presented to circuits 2403 to 2410, hence, a logic 0 is presented on the data lead 346 which corresponds to the most significant bit of function code.

When the ring counter 2302 steps to a count of thirteen, the logic 1 on that lead is patched to circuit 2404 satisfying that circuit in conjunction with the "word 1" signal from the 11-stage shift register. The logic 1 is presented by circuit 2404 over the data lead 346 to the shift register 800. This logic 1 corresponds to the 2² bit of the function code.

In this manner the data lead 346 presents the remote bit, station address and function code of the first data word to the line shift register for transmission to the master station.

The logic 1 on lead 15 from the ring counter 2302 is also presented to circuit 2315 which in turn presents a logic 1 to circuit 2316. The clock pulse output of circuit 2316 switches flip-flop 2317. The 1 lead of flip-flop 2317 is presented to circuit 2320. In conjunction with the 0 side of 2417 provides a logic 1 on group 2 lead.

The flip-flop 2317 had previously given a logic 1 to circuit 2321 for lead group 2. However, since this was the first word of data, "group 1" position in the word contains station address and function code and not any digital information, and the logic 1 on group 2 lead will now enable circuits 356 to 357 (FIG. 3).

Since the 11-stage shift register 2401 is in a count of 1, a logic 1 is presented on "word 1" conductor to circuit 356. The group 2 and word 1 signal presented to circuits 356 through 357 allow the DATEX code presented by point 09 to pass to the DATEX translator circuit 382A.

Referring to the general description of the remote station in receiving, analyzing and sending information to the master station, the description of the operation of the DATEX translator and serializer in presenting the information to the line shift register has been set forth. Briefly, the data information from the remote station programmer and from the translator is presented to the line shift register, and, in conjunction, with the shift signal loads the data register in the line shift register in preparation for transmitting that information.

At the same time the last data bit of information is presented to the line shift register, a logic 1 is presented on lead 27 of the 27-stage ring counter 2302. This logic 1 is presented to 2305 and 2306 resetting both flip-flops.

The output of flip-flop 2305 now removes the shift signal from conductor SH to the shift register to stop the loading of the register. The resetting of the flip-flop 2306 removes the logic 1 from circuit 2301 to stop the 27-stage ring counter 2302 in a count of 1. At the same time the logic 1 is being presented to circuit 2400, which allows a clock pulse to be presented to 11-stage shift register, stepping that counter to a count of 2. This logic 1 presents a "word 2" signal to the remote station circuits.

The logic 1 on lead 27 is also presented to circuit 2315. The output of this circuit enables a clock out of gate 2316 to switch flip-flop 2317 to the reset condition and provide a logic 1 on the group 1 lead in preparation for the next word. The logic 1 on lead 27 is also presented to circuit 2325. The output of this circuit regenerates the input 10 milliseconds later to present a transmit signal to the line shift register. This delay is inserted so as to allow the tone equipment time to properly orient the line from the time of turn on.

At this point, the line shift register sends the first data word to the master station in the same manner as previously described in the master station line shift register. When the line shift register has completed the transmission of the first word of data to the master station it presents a logic 1 on the end of transmit lead 378 (FIG. 23) to circuit 2311.

Since flip-flop 2417 has been previously reset from the RS signal, a logic 0 is presented to circuit 2412A presenting a logic 0 over conductor 2309 to circuit 2314A, which in turn presents a logic 1 to circuit 2311. The logic 1 presented on the output of circuit 2311 is presented to flip-flop 2306 setting that flip-flop. It is also sent over conductor 890 to the shift register to turn on the transmitter TT.

It should be recalled from the previous shift register description that the end of transmit signal EOT had turned off the tone equipment. The turn on of the tone equipment is now reestablished since the last word is not sent. The logic 1 presented on the output of flip-flop 2306 to circuit 2301 starts the 27-stage ring counter 2302 to count. When the 27-stage ring counter steps to a count of 2, it presents a logic 1 to the flip-flop 2305 setting that flip-flop. The logic 1 presented from the one lead of flip-flop 2305 is sent to the shift register in preparation for the loading of the data register of the shift register.

The logic 1 on "data word 2" lead and the logic 1 on the "group 1" lead is presented to circuit 352 (FIG. 3) pulling in relay 353, which connects the point 1 suction transducer by way of lead 353A to the A to D converter 382.

The analog to digital converter 382 converts the analog signal to a BCD code presenting a pattern of 12 bits to circuits 382–1 to 382–12. As the 27-stage ring counter 2302 (FIG. 23) proceeds to count 4 and through count 16, it sequentially provides a logic 1 to strobe 1 through strobe 12 which are presented to circuits 382–1 through 382–12.

The serial information presented on the data lead 346 to the shift register 800 will be generated according to the bit pattern supplied by the analog to digital converter 382.

When the 27-stage ring counter 2302 proceeds to a count of fifteen, it presents a logic 1 to circuit 2315 which allows a clock pulse to switch flip-flop 2317 to the set condition putting a logic 1 on the "group 2" signal lead. The group 2 signal is presented to circuits 356 to 359 (FIG. 3) allowing the next DATEX code to be multiplexed to the translator 382A. The translator 382A operates in the manner previously described to present the BCD code of the DATEX information to the line shift register.

The logic 1 presented on lead 27 of counter 2302 (FIG. 23) is presented to flip-flop 2305 and 2306 resetting those flip-flops. Flip-flop 2305 removes the shift signal from the shift lead SH to the shift register 800 to stop the information from going to that register. Flip-flop 2306 stops the 27-stage ring counter 2302 in a count of 1. The logic 1 is also presented to circuit 2315 flipping flip-flop 2317 to the reset condition to put a logic 1 on group 1. This signal is also presented to circuit 2400 to step the word counter 2401 from word count of 2 to 3.

The signal on lead 27 of counter 2302 is also presented to the 10 ms. delay circuit 2325 and conductor 396 to provide a transmit signal to the shift register. The shift register will then send out the second word of data to the master station.

Since this is station 01 and there are 10 words to send, the process previously described for "word 2" will repeat until the 11-stage shift register 2401 steps to a count of 11. Thus, having processed ten data words, the logic 1 presented on lead 11 from the word counter 2401 is sent to circuit 2412A. However, since flip-flop 2417 is in the reset condition the other signal presented to circuit 2412A is a logic 0. Therefore the last word signal is 0.

The logic 1 on lead 11 of word counter 2401 is also presented to circuit 2417A. Since flip-flop 2417 is reset, the 0 output of flip-flop 2417 is presented to 2417A. This then activates circuit 2417A presenting a logic 1 to flip-flop 2417 setting that flip-flop.

The logic 1 out of circuit 2417A is also presented to circuit 2403 which presents a reset signal to the 11-stage shift register 2401 forcing the register back to a word count of 1.

When the shift register has sent the last data word to the master station, it will present a logic 1 on the end of transmit lead EOT to circuit 2311.

Again, since the last word signal is a logic 1, the output of 2311 will be presented to flip-flop 2306 which starts the 27-stage ring counter 2302 counting. When the ring counter goes to a count of 2, it presents a logic 1 to the set lead of flip-flop 2305 setting that flip-flop which in turn presents a logic 1 on the shift lead SH to the shift register to load the shift register with the first word of status.

As previously described in the first word of data, the PC counter by way of circuits 2403 to 2410 presents the remote bit, station address and function code to the shift register. However, this time, circuit 2410 will present the additional bit in the function code to provide a BCD code of six to the shift register.

When the 27-stage ring counter has gone to a count of fourteen it presents a logic 1 to circuit 2411. Since flip-flop 2417 is set, a logic 1 is presented to circuit 2411. This, in conjunction with the logic 1 on word 1 presents a logic 1 to flip-flop 2415. When flip-flop 2415 sets, a logic 1 will be presented on the alert lead to the remote point scanner.

When the 27-stage ring counter is in a count of fourteen, and the 1 output of flip-flop 2417 is a logic 1, and the 11-stage word counter is in word 1, all inputs to circuit 2410 are satisfied. A logic 1 is then presented to the line shift register. This bit corresponds to the $2^1$ bit of the function code for status. This in conjunction with circuit 2404, as previously described presents a function code of 6 to the line shift register.

When the ring counter 2302 reaches a count of 26, it presents a logic 1 to circuit 2414. This, again, in conjunction with the logic 1 from 2417 presents a logic 1 to the reset side of flip-flop 2415 removing the alert signal to the remote point scanner.

When the ring counter steps to a count of 27, flip-flop 2305 and 2306 are reset, as before, and a transmit signal is presented over conductor 396 to the shift register. The logic 1 on lead 27 of counter 2302 also steps the 11-stage shift register 2401 to count from word 1 to word 2. The remote station shift register then transmits the first status word to the master station as previously described. Since group 1 and 2 signals are blocked by flip-flop 2417 no data information can come from there.

*Remote point scanner*

The operation of the point scanner at the remote station is now set forth. When the shift register detected an interrupt signal from the master station 100, it, in turn, presented a reset signal to the point scanner 344 (FIG. 22) to reset the 8-stage binary counter 2202 to a count of 0. The point scanner 344 uses inhibit logic such as that included and described in the command point scanner (FIGS. 4 and 5).

The object of the remote point scanner 344 is to sample the customer's contacts, and present serial information out of the point scanner to the shift register. The remote point scanner has 225 cores corresponding to the maximum capability of ten words of status.

Core #1 is threaded with the appropriate code for binary code of 1, core #2 is threaded with the appropriate leads corresponding to a binary code of 2, etc., core #225 being threaded with the binary code for 225. When the 8-stage binary counter 2202 is in a count of 0, cores 1 through 225 all have at least one inhibit current flowing through them.

Since the output of stage 1 is 0 in the present example, a logic 1 is presented to circuit 2212 which causes current flow on lead 2228. This lead is shown threaded through core #1 and core 225. Hence, neither core can switch. Also, since lead #2 has a logic 0, it presents this logic 0 to circuit 2204 which, in turn, presents a logic 1 to circuit 2214. This presents a logic 1 on lead 2230 causing an inhibit current to flow. It is easily recognized that core 2 and core 198 are threaded with this inhibit current; hence, they cannot switch. It can further be demonstrated for any other core of the 225 cores that at least one inhibit current is flowing through them when the 8-stage binary counter 2202 is in a count of 0.

The clock pulse presented to circuit 2248 is delayed and then presented to a one-shot multivibrator circuit 2249 which presents a read pulse through amplifier 2252 and through all cores.

Since our counter is in a count of 0, no core can switch even though read pulses are continually interrogating all 225 cores. The output of the one-shot multivibrator 2249 is again delayed by circuit 2250 and presented to circuit 2251 which provides strobing for gates 2253.

The output of circuit 2251 presents a logic 1 to circuit 2253, waiting for sense amplifier 2247 to present a logic 1 from a core switch.

When the remote station programmer 395 determines that it needs information from the remote point scanner 344, it presents a signal over the "alert" conductor to circuit 2201. Circuit 2201 then presents clock pulses to the 8-stage binary counter 2202 forcing the counter to sequentially address the cores in a binary fashion. When the 8-stage binary counter 2202 receives the first pulse, it steps to a count of 1, and a logic 1 is presented on lead 1 and a logic 0 on the leads 2 through 8. The logic 1 presented to circuit 2203 from lead 1 forces current driver 2212 to present a logic 0 on lead 2228, thus presenting no inhibit current to core 1 by way of this current driver.

In the same manner it can be demonstrated that current drivers 2213, 2215, 2217, 2219, 2221, 2223, and 2225 present no inhibit current to core #1. At this time, all the inhibits are removed from core 1 from the input 8-stage binary counter 2202.

Assuming that point 1 is not pulled in, relay 2257 is not energized and that an inhibit current is placed through core 1 from ground through resistor 2262, the normally closed contact of relay 2257 through core 1 and sequentially through contacts on relays 2258, etc., down the line to the +12 voltage. Hence, if any relay is not operating, an inhibit current is placed through the core preventing that core from switching.

When the read pulse is presented to cores 1 through 225, core 1 will not switch because of the inhibit current placed in that core by the closed contacts on relay 2257. When the 8-stage binary counter steps to a count of 2, it can be observed that all inhibits that could be presented to core 2 by the 8-stage binary circuit 2202 are removed.

If, now, point #1 pump OFF is operated, relay 2258 will be pulled in. The action of this relay is to remove the current through core 2. Hence, with all inhibit currents removed and the read pulse applied, core #2 will be allowed to switch. When this core switches, it presents a sense current to sense amplifier 2247 which in turn presents a logic 1 to circuit 2253. Since circuit 2253 is continuously being strobed by circuit 2251, and since the sense amplifier has presented a logic 1, the output of circuit 2253 will set flip-flop 2254.

Flip-flop 2254 presents a logic 1 to circuit 2256. This logic 1, in conjunction with the logic 1 on the shift lead (the shift signal which is presented to the line shift register) controls circuit 2256 to present a logic 1 to the data lead, and the shift register.

The 8-stage binary counter 2202 proceeds to count in a binary fashion until the alert signal is removed from conductor 347. The 8-stage binary counter 2202 is now in the proper condition to address point 7 which corresponds to core 13.

When the remote station programmer determines that the next status word is to be sent to the master station, it will again present an alert signal starting the 8-stage binary counter 2202 and sequentially reading out the cores according to the configuration of point relays 2257, etc.

After the shift register has completed its transmission to the master station, a logic 1 will appear on the end of transmit lead EOT. This, as previously described, activates circuit 2311 in the remote station programmer 395 (FIG. 23) setting flip-flop 2306. A logic 1 is presented on lead 2308 to circuit 2412, and a logic 1 is also presented from flip-flop 2417 to circuit 2412.

Since the 27-stage ring counter 2302 is in a count of 1, a logic 1 is presented to circuit 2412 to activate circuit 2412 and set flip-flop 2415. A logic 1 is then presented to the remote point scanner 344 (FIG. 22) on the alert lead 347. When the counter 2302 reaches a count of 2, flip-flop 2305 sets and sends a shift signal to the shift register. Hence, it can be observed that flip-flop 2305 and flip-flop 2415 are set at the same time. Due to the inherent delay of the remote point scanner 344 no information will be presented from the point scanner 344 until one clock time later. The logic 0 presented on the data lead to the shift register at this time forces a 0 to be stored in the shift register corresponding to the remote bit.

The next 24 bits of information presented to the shift register will be the information that it receives from the remote point scanner 344. When the twenty-seven stage ring-counter 2302 reaches a count of 26, a logic 1 is presented to circuit 2414. Since flip-flop 2417 is set, circuit 2414 is satisfied and presents a logic 1 to reset flip-flop.

Even though the alert signal is removed from the alert conductor 347 at this time, the last bit of data to the shift register is still to be stored. When the PC counter reaches a count of 27, flip-flop 2305 resets to terminate the shift signal to the line shift register. The line shift register has now been loaded with the second status word.

It should be recalled that the logic 1 on lead 27 steps the 11-stage ring counter 2401 from word count 2 to word count 3. In this manner the remote station programmer sequentially sends the status words back to the master station. Since this is station 01, there are 10 words of status to report. After handling the tenth word of status, the 11-stage shift register counter 2401 is stepped to a count of eleven and the logic 1 on this lead is presented to lead 2412A via patching.

Since flip-flop 2417 is set, circuit 2412A is now satisfied and the "last word" signal will be presented over conductor 2309 to 2314A. The logic 0 from this circuit is presented to circuit 2311. When the shift register is through transmitting the last status word to the master station, it will present a logic 1 on the end of transmit lead EOT. This logic 1 is presented to circuit 2311 which, because of the "last word" signal being presented as a logic 0 does not set flip-flop 2306.

*Command point operation*

In the previous example, command point 01, pump ON was operated at the master station, and the manner in which the command message was generated and sent to the remote station was described above. The manner in which this command message is received and operates the selected point is now set forth.

Just prior to the transmission of the command message, an interrupt signal is sent to all remote stations which activates the RS lead to the remote station. If any remote station were in the process of operating, this signal would clear it out, preparing it for the receipt of the next message.

When the shift register receives the command message, and it is error-free, a logic 1 will be presented on the "good word received" lead which is presented to the command point decoder and control circuit (FIG. 21). The logic 1 on the "good word received" lead GWR is presented to circuit 2103. The MB lead from the line shift register is also presented to circuit 2103. If the message received has a master bit, a logic 1 will be presented on the MB lead. The other eight inputs to circuit 2103 are patched via station address leads 1 through 8.

Accordingly, if this particular station is patched for a code of 01, then all eight leads will have a logic 1. The logic 1 output from circuit 2103 presents a logic 1 to circuit 2118 and the output of circuit 2118 presents a logic 1 for one-half second on lead 2104. This logic 1 is presented to circuits 2115 through 2117 preparing all relays for operation.

Referring to circuit 2107, it is observed that the four function code leads from the shift register are presented to gate 2107. Since function codes 1 and 4 are logic 1's, these are presented directly to circuit 2107. Function codes 2 and 3 are presented to circuits 2106 and 2105, and each of these are a logic 0. The output of 2106 and 2105 are both logic 1's. Hence, with a function code of 9, circuit 2107 is activated and a logic 1 is presented on lead 2108.

This logic 1 is also presented to circuit 2115 through 2117. Since the point address of this command code is point 1, a logic 1 is presented on PA1, and logic 0's are presented on PA2 through PA8. PA1 is presented directly to circuit 2115 presenting a logic 1 to that circuit. PA2 through PA8 are presented to inverters PA2A through PA8A. All these logic 0's are inverted to a logic 1 and presented to circuits 2115 and 2116.

Since this is a command code ON, command 1 lead presents a logic 1 to circuit 2113. Command 2, 3, and 4 present logic 0's to inverters 2112, 2112A, and 2112B. All these 0's are inverted and presented to circuit 2113 as logic 1's. Hence, circuit 2113 presents a logic 1 on lead 2114 which in turn presents a logic 1 to circuit 2115.

It has now been shown that circuit 2115 has all logic 1's and therefore will present a logic 1 to relay 310 to operate that relay and close contacts 310A. Since circuit 2118 output lasts only for one-half second, a logic 0 will then be placed on circuit 2115, placing a logic 0 to relay 310 deactivating that relay and opening the contacts.

It has been shown that according to the pattern presented to the command point decoder and control circuit by the shift register, and in conjunction with receiving a "good word received," circuit 2115 operates point #1 pump ON for control of that unit. It may be similarly shown for another point and another command code that a correspondingly different one of the relays will be operated.

If, for instance, the command point were 99, valve closed, it could be shown that circuit 2117 would have operated and closed the valve.

System patching

In the detailed description of the master station address counter circuit 1801 (FIG. 18B) it was demonstrated how the counter counted from a count of 1 to 99. However, if a particular system does not require 99 stations, the station address counter can be made to jump over the station positions not equipped, thus to query only the stations equipped.

If, for instance, this system were designated to query 34 stations, a patching strap could be added to the master station programmer 260. After master station programmer had queried station 34 and received all the words from that station, an advance station address pulse would advance the station address counter 1001 to a count of 35.

Referring to FIGURE 14F, the output of gate labeled station address 35 would now be patched to flip-flop 14F10. When flip-flop 14F10 sets, a logic 1 will be presented over conductor LS to circuit 18B44 (FIG. 18B) which in turn resets the station address counter 1801 to a count of 01. It should be noted that the station address counter was at station 35 only for a period of 20 microseconds. It was then immediately reset to station 01 to continue on with the scanning of the system. In this manner, any station address lead may be patched to flip-flop 14F10 causing the station address counter 1801 to jump back to 01 after querying the last actual station.

In the detailed explanation of the system, station 01 was equipped for nine words of data and ten words of status. Referring to the last word data circuit (FIG. 15E) the word 9 was patched to circuit 15E3, and word 10 was patched to circuit 15E1. For all succeeding stations, this circuit may be patched in a different configuration, such that any other station may have any number words of data and status from 1 to 10. For example, word 4 may be patched to circuit 15E4 which is the circuit for station address 99. When the word counter has counted to word 4, circuit 15E4 will present a logic word on the "last word of data" conductor LWD.

As was set forth in the detailed description, this signal causes the master station programmer 260 to stop receiving data words and to proceed to the next sequence. Not only does the master station know how many words of data and status a remote station is going to send, but additionally the remote station knows how many words to send.

Referring to the remote station programmer (FIG. 24), register circuit 2401 presents the word signals to the cross-connect for station 01. In the described arrangement "word 10" was patched to the S lead to set flip-flop 2417 so that the remote station was informed that word 9 was the "last data word" to be sent. If this were any other station with fewer words, another word signal would have been patched to the S lead stopping the data report to that count. Since status is always last to report, and since station 1 had 10 status words to report, word count 11 was patched to circuit 2412A and stopped the programmer after sending 10 words of status. If there were fewer words of status, another lead from the word counter would have been patched to this circuit.

The normal sequence for the remote station reporting is data first, then status. If a remote station has no data to report, then when that remote station reports it will send back a function code for status not data. The master station will decode this status function code and jump to the appropriate mode handling status and then after handling status will go to the next station.

Referring again to the remote station programmer (FIG. 24B), circuit 2417B provides the logic for determining whether or not there is data to report. If data is to report, there is no wire patch on the cross-connect to circuit 2417B; hence, circuit 2417B is not activated and logic 0 will be presented to flip-flop 2417. Thus the operation of this system will be the same as described for station 1. However, if station 2 did not have any data, the strap would have been put in presenting a logic 1 to circuit 2417B. When this particular remote station receives a data request message from the master station and it is for station 2, a logic 1 will be observed on lead 890. This logic 1 is also presented to circuit 2417B which sends a logic 1 to flip-flop 2417 setting that flip-flop immediately. Thus, when this flip-flop is set, only status will report.

Conversely, another remote station may not have any status to report. The remote station will then respond normally (since it does not have the patch to circuit 2417B) and will send back data first. However, circuit 2412A will not be patched with the one output of flip-flop 2417, but will be patched to the 0 output of flip-flop 2417. This tells the remote station that when it has sent the "last word of data" to the master, this is the final word to be sent.

The master station programmer, FIGURE 14E, tells the master station whether or not status is to be reported. For example, if station 3 had no status to report, station address 03 would not be patched to circuit 14E1. This would present a logic 1 on the STR bar lead to circuit 18A2 in station address control circuit 1800. The master station, also knowing that this is the last word of data, presents a logic 1 to circuit 18A2 which in turn presents a station address advance signal to the station address counter 1801. At the same time, circuit 18E1 in the mode control circuit 1804 is satisfied and presents a logic 1 on the set M1 lead. This will set flip-flop 18S7 to generate the data request message for the next station.

Therefore, with the patching facility at the master station and at the remote station, the system can be made to query any number of stations with any configuration of status words and data words.

Although only certain particular embodiments of the invention has been shown and described, it is apparent that modifications and alterations may be made therein.

What is claimed is:

1. In a remote supervisory and control system for a master and at least one remote station including command means at the master station for transmitting composite word messages to the remote station requesting execution of a command thereat, a first plurality of core members, stepping means including selector means for selecting different ones of said plurality of core members for switching, said stepping means being operable to different steps to effect selection of a different one of said cores by said selector means, separate command switch means for each core including means for preparing its associated core for switching, readout means for switching a prepared core responsive to selection thereof by said stepping means, circuit means responsive to switching of one of said first plurality of cores to stop the advance of said stepping means, a second plurality of cores, said selection means being connected to prepare a different set of said second plurality of cores for switching with advance of said stepping means to different steps, and further stepping means for successively selecting the ones of the cores of said second plurality which have been prepared by said first stepping means for operation.

2. A system as set forth in claim 1 which includes signal means for generating a command request signal for said remote station, and in which said circuit means includes sense means responsive to switching of a core of said first plurality to energize said signal means.

3. A system as set forth in claim 1 in which each of said cores in said second plurality is switched to provide a different bit for said composite word message including a group of cores connected to provide bits in a binary code which represent a remote station address.

4. A system as set forth in claim 1 in which each of said cores in said second plurality is switched to provide a different bit of said composite word message including a group of point address cores, different ones of which are connected to provide different bits of a point address for said message, the selector means energized by said first stepping means being operative to select the ones of said point address cores to be switched for each message.

5. A system as set forth in claim 1 in which different groups of said second plurality of cores are connected to represent different information in each word message, and each of said second cores of a group is operative as switched, to provide a different bit of said information in said word message, and in which said readout means is connected to switch the ones of said cores prepared by said first stepping means as selected by said further stepping means, and sense means for providing an outgoing signal bit for each core which is switched.

6. In a remote supervisory and control system for a master and at least one remote station including command means at the master station for transmitting composite word messages to the remote station requesting execution of a command thereat, a first plurality of core members, a plurality of selector means for selecting different ones of said plurality of core members for switching, stepping means operable to different steps to condition said selector means to select a different one of said core members, separate command switch means for each core including means for preparing its associated core for switching, readout means for switching a prepared core to responsive to selection thereof by said stepping means, circuit means responsive to switching of one of said first plurality of cores to stop the advance of said stepping means, a second plurality of cores, said selection means being connected to prepare a different set of said second plurality of cores for switching with advance of said stepping means to different steps, and further stepping means for successively selecting the ones of the cores of said second plurality which have been prepared by said first stepping means for operation, and means for energizing said readout means to switch each prepared core as selected by said second stepping means.

7. A system as set forth in claim 6 which includes sense means connected to said second plurality of cores for providing a signal responsive to switching of a core, and bit generator means responsive to each signal to generate a bit for said composite message.

8. In a remote supervisory and control system for a master and at least one remote station including command means at the master station for transmitting composite word messages to the remote station requesting execution of a command thereat, a first plurality of core members each of which is threaded by a plurality of inhibit leads and a bias lead to prevent switching of said core member, stepping means operable to different steps to remove the inhibit current from correspondingly different ones of said inhibit leads, separate command switch means for each core including means for providing a current in opposition to the bias current for its associated core, readout means for switching a core responsive to selection thereof by said stepping means and operation of its associated switch means, circuit means responsive to switching of one of said first plurality of cores to stop the advance of said stepping means, a second plurality of cores, said inhibit leads being connected to prepare a different set of said second plurality of cores for switching with advance of said stepping means to different steps, and further stepping means for successively selecting the ones of the cores of said second plurality for operation which have been prepared by said first stepping means.

9. In a remote supervisory and control system a master station and at least one remote station interconnected by channel means including means at one station for providing a composite word message, first and second counter means each having output inhibit leads selectively deenergized at the successive steps of the associated counter, first and second sets of cores of square loop material, said first set of cores being selectively threaded by the output inhibit leads of the first counter, said second set of cores being selectively threaded by the output leads of both counters, inhibit current on any inhibit lead unless counteracted being sufficient to prevent switching of any core through which it is threaded, the first set of cores being threaded also by a common biasing conductor which constitutes another inhibit lead and by a first common sense conductor, the second set of cores being threaded also by a second common sense conductor, the cores of both sets being threaded by a readout conductor common to both sets of cores, individual switch means for each core of said first set for energizing a conductor threaded through its associated core in such manner as to counteract said bias inhibit when said switch is closed, clock means for driving the first counter in a scanning mode over all cores of said first set by selectively removing its inhibits from different ones of said leads at different steps of the scan, means for applying a readout circuit to said readout conductor during each step of said first counter to switch the core selected by the stepping means whenever said switch means for the core are operated, each core as switched providing an output on the common sense conductor, bit signal generator circuitry responsive to said output on said common sense lead to generate a command request signal and a stop signal for said first counter, message start means for enabling said second counter to selectively remove its inhibit currents from different ones of said second group of cores at different steps of its count including means for energizing said readout conductor at each step of said second counter, the switching of each core in the second set being conditioned upon selection thereof by said stepping means and by the pattern of inhibits on the inhibit leads of the first counter as determined by the position in which the first counter stopped, and means controlled by switching of a core to provide a different one of the bit signals of the command request message.

References Cited

UNITED STATES PATENTS 3,110,013   11/1963   Breese _____ 340—163

JOHN W. CALDWELL, *Primary Examiner.*

D. J. YUSKO, *Assistant Examiner.*